US011208514B2

(12) United States Patent
McDaniel et al.

(10) Patent No.: US 11,208,514 B2
(45) Date of Patent: *Dec. 28, 2021

(54) SILICA-COATED ALUMINA ACTIVATOR-SUPPORTS FOR METALLOCENE CATALYST COMPOSITIONS

(71) Applicant: Chevron Phillips Chemical Company LP, The Woodlands, TX (US)

(72) Inventors: Max P. McDaniel, Bartlesville, OK (US); Qing Yang, Bartlesville, OK (US); Randy S. Muninger, Dewey, OK (US); Elizabeth A. Benham, Spring, TX (US); Kathy S. Clear, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/124,605

(22) Filed: Dec. 17, 2020

(65) Prior Publication Data

US 2021/0102018 A1    Apr. 8, 2021

Related U.S. Application Data

(60) Continuation of application No. 16/812,496, filed on Mar. 9, 2020, now Pat. No. 10,919,996, which is a
(Continued)

(51) Int. Cl.
    *C08F 210/16*    (2006.01)
    *C08F 10/02*    (2006.01)
(Continued)

(52) U.S. Cl.
    CPC ........... *C08F 210/16* (2013.01); *C08F 10/02* (2013.01); *C08F 110/02* (2013.01);
(Continued)

(58) Field of Classification Search
    None
    See application file for complete search history.

(56) References Cited

U.S. PATENT DOCUMENTS 3,242,099 A    3/1966    Manyik
3,248,179 A    4/1966    Norwood
(Continued)

FOREIGN PATENT DOCUMENTS

CA    2116259 A1    8/1994
DE    19641141 A1    4/1998
(Continued)

OTHER PUBLICATIONS

Arnett, et al., "Zero-Shear Viscosity of Some Ethyl Branched Paraffinic Model Polymers," J. Phys. Chem., vol. 84, 1980, pp. 649-652.
(Continued)

*Primary Examiner* — Fred M Teskin
(74) *Attorney, Agent, or Firm* — Merchant & Gould P.C.

(57) ABSTRACT

Silica-coated alumina activator-supports, and catalyst compositions containing these activator-supports, are disclosed. Methods also are provided for preparing silica-coated alumina activator-supports, for preparing catalyst compositions, and for using the catalyst compositions to polymerize olefins.

24 Claims, 7 Drawing Sheets

Related U.S. Application Data continuation of application No. 16/266,176, filed on Feb. 4, 2019, now Pat. No. 10,676,553, which is a division of application No. 15/494,674, filed on Apr. 24, 2017, now Pat. No. 10,239,975, which is a continuation of application No. 15/097,355, filed on Apr. 13, 2016, now Pat. No. 9,670,296, which is a continuation of application No. 12/980,415, filed on Dec. 29, 2010, now Pat. No. 9,346,896, which is a division of application No. 12/565,257, filed on Sep. 23, 2009, now Pat. No. 7,884,163, which is a continuation-in-part of application No. 12/052,620, filed on Mar. 20, 2008, now abandoned.

(51) Int. Cl.

| | | |
|---|---|---|
| *C08F 110/02* | (2006.01) | |
| *C08F 210/06* | (2006.01) | |
| *C08F 210/08* | (2006.01) | |
| *B01J 27/00* | (2006.01) | |
| *B01J 27/12* | (2006.01) | |
| *B01J 27/16* | (2006.01) | |
| *B01J 31/14* | (2006.01) | |
| *B01J 31/16* | (2006.01) | |
| *B01J 31/18* | (2006.01) | |
| *B01J 31/22* | (2006.01) | |
| *B01J 35/00* | (2006.01) | |
| *C08F 4/6592* | (2006.01) | |
| *B01J 27/053* | (2006.01) | |
| *B01J 27/10* | (2006.01) | |
| *C08F 4/659* | (2006.01) | |

(52) U.S. Cl.
CPC .......... *C08F 210/06* (2013.01); *C08F 210/08* (2013.01); *B01J 27/00* (2013.01); *B01J 27/053* (2013.01); *B01J 27/10* (2013.01); *B01J 27/12* (2013.01); *B01J 27/16* (2013.01); *B01J 31/143* (2013.01); *B01J 31/1608* (2013.01); *B01J 31/1616* (2013.01); *B01J 31/1805* (2013.01); *B01J 31/2226* (2013.01); *B01J 31/2295* (2013.01); *B01J 35/0006* (2013.01); *B01J 2531/0225* (2013.01); *C08F 4/65912* (2013.01); *C08F 4/65925* (2013.01); *C08F 4/65927* (2013.01); *C08F 2420/01* (2013.01); *Y02P 20/52* (2015.11)

(56) References Cited

U.S. PATENT DOCUMENTS

| | | |
|---|---|---|
| 3,533,738 A | 10/1970 | Rundell |
| 3,946,020 A | 3/1976 | Minato |
| 4,060,480 A | 11/1977 | Reed |
| 4,070,272 A | 1/1978 | Rausch |
| 4,452,910 A | 6/1984 | Hopkins |
| 4,501,885 A | 2/1985 | Sherk |
| 4,588,790 A | 5/1986 | Jenkins, III |
| 4,596,862 A | 6/1986 | McDaniel |
| 4,665,263 A | 5/1987 | Smith |
| 4,794,096 A | 12/1988 | Ewen |
| 4,806,513 A | 2/1989 | McDaniel |
| 4,808,561 A | 2/1989 | Welborn, Jr. |
| 4,855,271 A | 8/1989 | McDaniel |
| 5,010,152 A | 4/1991 | McDaniel |
| 5,032,651 A | 7/1991 | McDaniel |
| 5,037,911 A | 8/1991 | McDaniel |
| 5,045,519 A | 9/1991 | Meyer |
| 5,085,705 A | 2/1992 | Withiam |
| 5,104,841 A | 4/1992 | Conroy |
| 5,171,801 A | 12/1992 | Martin |
| 5,352,749 A | 10/1994 | Dechellis |
| 5,376,611 A | 12/1994 | Shveima |
| 5,393,408 A | 2/1995 | Ziemer |
| 5,401,820 A | 3/1995 | McDaniel |
| 5,436,304 A | 7/1995 | Griffin |
| 5,455,314 A | 10/1995 | Burns |
| 5,498,581 A | 3/1996 | Welch |
| 5,527,867 A | 6/1996 | Bergmeister |
| 5,543,035 A | 8/1996 | Ziemer |
| 5,565,175 A | 10/1996 | Hottovy |
| 5,575,979 A | 11/1996 | Hanson |
| 5,576,259 A | 11/1996 | Hasegawa |
| 5,719,241 A | 2/1998 | Razavi |
| 5,739,220 A | 4/1998 | Shamshoum |
| 5,807,938 A | 9/1998 | Kaneko |
| 5,849,255 A | 12/1998 | Sawyer |
| 5,883,036 A | 3/1999 | Fujie |
| 5,919,983 A | 7/1999 | Rosen |
| 6,015,930 A | 1/2000 | Santilli |
| 6,030,921 A | 2/2000 | Ziemer |
| 6,034,186 A | 3/2000 | Martin |
| 6,096,677 A | 8/2000 | Wilson, Jr. |
| 6,107,230 A | 8/2000 | McDaniel |
| 6,136,181 A | 10/2000 | Ziemer |
| 6,165,929 A | 12/2000 | McDaniel |
| 6,239,235 B1 | 5/2001 | Hottovy |
| 6,245,310 B1 | 6/2001 | Brasch |
| 6,262,191 B1 | 7/2001 | Hottovy |
| 6,264,826 B1 | 7/2001 | Xiao |
| 6,294,494 B1 | 9/2001 | McDaniel |
| 6,300,271 B1 | 10/2001 | McDaniel |
| 6,316,553 B1 | 11/2001 | McDaniel |
| 6,329,475 B1 | 12/2001 | Kelly |
| 6,329,476 B1 | 12/2001 | Martin |
| 6,355,594 B1 | 3/2002 | McDaniel |
| 6,376,415 B1 | 4/2002 | McDaniel |
| 6,388,017 B1 | 5/2002 | McDaniel |
| 6,391,816 B1 | 5/2002 | McDaniel |
| 6,395,666 B1 | 5/2002 | McDaniel |
| 6,524,987 B1 | 2/2003 | Collins |
| 6,548,441 B1 | 4/2003 | McDaniel |
| 6,548,442 B1 | 4/2003 | McDaniel |
| 6,576,583 B1 | 6/2003 | McDaniel |
| 6,613,712 B1 | 9/2003 | McDaniel |
| 6,632,894 B1 | 10/2003 | McDaniel |
| 6,667,274 B1 | 12/2003 | Hawley |
| 6,750,302 B1 | 6/2004 | McDaniel |
| 6,831,141 B2 | 12/2004 | McDaniel |
| 6,833,415 B2 | 12/2004 | Kendrick |
| 6,902,664 B2 | 6/2005 | Timken |
| 6,984,603 B2 | 1/2006 | McDaniel |
| 6,995,112 B2 | 2/2006 | Timken |
| 7,002,031 B2 | 2/2006 | Resconi |
| 7,026,494 B1 | 4/2006 | Yang |
| 7,041,617 B2 | 5/2006 | Jensen |
| 7,045,056 B2 | 5/2006 | Kelkar |
| 7,045,485 B2 | 5/2006 | Kelkar |
| 7,064,225 B2 | 6/2006 | Thorn |
| 7,119,153 B2 | 10/2006 | Jensen |
| 7,125,821 B2 | 10/2006 | Xu |
| 7,148,298 B2 | 12/2006 | Jensen |
| 7,163,906 B2 | 1/2007 | McDaniel |
| 7,226,886 B2 | 6/2007 | Jayaratne |
| 7,247,594 B2 | 7/2007 | Jayaratne |
| 7,262,225 B2 | 8/2007 | Van Berge |
| 7,294,599 B2 | 11/2007 | Jensen |
| 7,312,283 B2 | 12/2007 | Martin |
| 7,468,452 B1 | 12/2008 | Martin |
| 7,517,939 B2 | 4/2009 | Yang |
| 7,521,572 B2 | 4/2009 | Jayaratne |
| 7,534,842 B2 | 5/2009 | Jayaratne |
| 7,594,992 B2 | 9/2009 | Timken |
| 7,601,665 B2 | 10/2009 | McDaniel |
| 7,763,561 B2 | 7/2010 | McDaniel |
| 7,771,816 B2 | 8/2010 | Leenders |
| 7,884,163 B2 | 2/2011 | McDaniel |
| 7,919,639 B2 | 4/2011 | Murray |
| 7,959,792 B2 | 6/2011 | Vaarkamp |
| 8,076,263 B2 | 12/2011 | Koranne |
| 8,309,485 B2 | 11/2012 | Yang |

(56) References Cited

U.S. PATENT DOCUMENTS

| | | | |
|---|---|---|---|
| 8,623,973 | B1 | 1/2014 | McDaniel |
| 8,637,420 | B2 | 1/2014 | Yang |
| 8,673,806 | B2 | 3/2014 | Schmidt |
| 8,703,886 | B1 | 4/2014 | Yang |
| 8,809,219 | B2 | 8/2014 | Yang |
| 9,023,959 | B2 | 5/2015 | McDaniel |
| 9,346,896 | B2 | 5/2016 | McDaniel |
| 9,365,667 | B2 | 6/2016 | McDaniel |
| 9,670,296 | B2 | 6/2017 | McDaniel |
| 10,239,975 | B2 | 3/2019 | McDaniel |
| 10,676,553 | B2 | 6/2020 | McDaniel |
| 10,919,996 | B2 * | 2/2021 | McDaniel ............. C08F 210/16 |
| 2003/0232716 | A1 | 12/2003 | McDaniel |
| 2004/0059070 | A1 | 3/2004 | Whitte |
| 2005/0113243 | A1 | 5/2005 | Thorn |
| 2005/0197470 | A1 | 9/2005 | McDaniel |
| 2007/0179044 | A1 | 8/2007 | Yang |
| 2007/0197374 | A1 | 8/2007 | Yang |
| 2009/0088543 | A1 | 4/2009 | Yang |
| 2009/0170690 | A1 | 7/2009 | Murray |
| 2009/0170691 | A1 | 7/2009 | Murray |
| 2009/0171041 | A1 | 7/2009 | Murray |
| 2009/0240010 | A1 | 9/2009 | McDaniel |
| 2010/0076167 | A1 | 3/2010 | McDaniel |
| 2010/0317904 | A1 | 12/2010 | Small |
| 2010/0324236 | A1 | 12/2010 | Murray |
| 2011/0082323 | A1 | 4/2011 | Small |
| 2011/0092357 | A1 | 4/2011 | McDaniel |

FOREIGN PATENT DOCUMENTS

| | | |
|---|---|---|
| WO | 1991009882 A1 | 7/1991 |
| WO | 1999060033 A1 | 11/1999 |
| WO | 2009117128 A1 | 9/2009 |
| WO | 2011002497 A1 | 1/2011 |
| WO | 2011037971 A1 | 3/2011 |

OTHER PUBLICATIONS

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.

Cotton, F. Albert, et al., "Advanced Inorganic Chemistry," Sixth Edition, cover page, title page, pages ix-x, and book description, Mar. 30, 1999, John Wiley & Sons, Inc.

Hawley's Condensed Chemical Dictionary, Eleventh Edition, cover page, contents page, pp. 862-863, Van Nostrand Reinhold Company, (1995).

Hieber, C. A., et al., "Shear-rate-dependence modeling of polymer melt viscosity," Polymer Engineering and Science, Jul. 1992, pp. 931-938, vol. 32, No. 14.

Hieber, C. A., et al., "Some correlations involving the shear viscosity of polystyrene melts," Rheol Acta, 1989, pp. 321-332, vol. 28.

Hongbo Li, et al., "Coordination Copolymerization of Severely Encumbered Isoalkenes with Ethylene: Enhanced Enchainment Mediated by Binuclear Catalysts and Cocatalysts," JACS Articles, Issue 127, 2005, pp. 14756-14768.

Janzen, et al., "Diagnosing Long-Chain Branching in Polyethylene," Journal of Mol. Struct., 485/486, 1999, pp. 569-584.

Pinnavaia, Thomas J., "Intercalated Clay Catalysts," Apr. 22, 1983, pp. 365-371, vol. 220, No. 4595, Science.

Satoshi Sato, et al., "Catalytic and Acidic Properties of Silica-Alumina Prepared by Chemical Vapour Deposition," Applied Catalysis, vol. 62, 1990, pp. 73-84.

Thomas, J. M., "Sheet Silicate Intercalates: New Agents for Unusual Chemical Conversions," Intercalation Chemistry, 1982, Chapter 3, pp. 55-99, Academic Press, Inc.

W. Daniell, et al., "Enhanced Surface Acidity in Mixed Alumina-Silicas: a Low-Temperature FTIR Study," Applied Catalysis A: General, Issue 196, 2000, pp. 247-260.

\* cited by examiner

SILICA-COATED ALUMINA ACTIVATOR-SUPPORTS FOR METALLOCENE CATALYST COMPOSITIONS

CROSS-REFERENCE TO RELATED APPLICATIONS

This application is a continuation application of U.S. patent application Ser. No. 16/812,496, filed on Mar. 9, 2020, now U.S. Pat. No. 10,919,996, which is a continuation application of U.S. patent application Ser. No. 16/266,176, filed on Feb. 4, 2019, now U.S. Pat. No. 10,676,553, which is a divisional application of U.S. patent application Ser. No. 15/494,674, filed on Apr. 24, 2017, now U.S. Pat. No. 10,239,975, which is a continuation application of U.S. patent application Ser. No. 15/097,355, filed on Apr. 13, 2016, now U.S. Pat. No. 9,670,296, which is a continuation application of U.S. patent application Ser. No. 12/980,415, filed on Dec. 29, 2010, now U.S. Pat. No. 9,346,896, which is a divisional application of U.S. patent application Ser. No. 12/565,257, filed on Sep. 23, 2009, now U.S. Pat. No. 7,884,163, which is a continuation-in-part of co-pending U.S. patent application Ser. No. 12/052,620, filed on Mar. 20, 2008, the disclosures of which are incorporated herein by reference in their entirety.

BACKGROUND OF THE INVENTION

The present invention relates generally to the field of olefin polymerization catalysis, catalyst compositions, methods for the polymerization and copolymerization of olefins, and polyolefins. More specifically, this invention relates to chemically-treated silica-coated alumina activator-supports and to catalyst compositions employing these activator-supports.

SUMMARY OF THE INVENTION

The present invention is directed generally to chemically-treated silica-coated alumina activator-supports, catalyst compositions employing these supports, methods for preparing activator-supports and catalyst compositions, methods for using the catalyst compositions to polymerize olefins, the polymer resins produced using such catalyst compositions, and articles produced using these polymer resins. In particular, the present invention relates to chemically-treated silica-coated alumina activator-supports and to catalyst compositions employing such activator-supports. Catalyst compositions containing silica-coated alumina activator-supports of the present invention can be used to produce, for example, ethylene-based homopolymers, copolymers, terpolymers, and the like.

In aspects of the present invention, activator-supports are disclosed which comprise at least one silica-coated alumina treated with at least one electron-withdrawing anion. Generally, these silica-coated aluminas have a weight ratio of alumina to silica in a range from about 1:1 to about 100:1, for example, from about 2:1 to about 20:1. The at least one electron-withdrawing anion can comprise fluoride, chloride, bromide, phosphate, triflate, bisulfate, sulfate, and the like, or any combination thereof. Further, two or more electron-withdrawing anions can be employed, examples of which can include, but are not limited to, fluoride and phosphate, fluoride and sulfate, chloride and phosphate, chloride and sulfate, triflate and sulfate, or triflate and phosphate, and the like.

Catalyst compositions containing these silica-coated activator-supports are also disclosed in the present invention. In one aspect, the catalyst composition can comprise at least one transition metal compound or metallocene compound and at least one activator-support. The at least one activator-support can comprise at least one silica-coated alumina having a weight ratio of alumina to silica in a range from about 1:1 to about 100:1, and is treated with at least one electron-withdrawing anion such as, for example, fluoride, chloride, bromide, phosphate, triflate, bisulfate, sulfate, and the like, or combinations thereof. This catalyst composition can further comprise at least one organoaluminum compound. In other aspects, the catalyst composition—comprising at least one transition metal or metallocene compound and at least one activator-support—can further comprise at least one optional co-catalyst. Suitable optional co-catalysts in this aspect can include, but are not limited to, aluminoxane compounds, organoboron or organoborate compounds, ionizing ionic compounds, and the like, or combinations thereof.

Another catalyst composition contemplated herein comprises at least one transition metal or metallocene compound, at least one organoaluminum compound, and at least one activator-support. The at least one organoaluminum compound can comprise, for instance, trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or combinations thereof. The at least one activator-support comprises at least one silica-coated alumina treated with at least one electron-withdrawing anion, such as those electron-withdrawing anions described herein. The silica-coated alumina has a weight ratio of alumina to silica in a range from about 1:1 to about 100:1, or from about 2:1 to about 20:1, in aspects of the invention.

Catalyst compositions disclosed herein can be used to polymerize olefins to form homopolymers, copolymers, and the like. One such olefin polymerization process can comprise contacting a catalyst composition of the present invention with at least one olefin monomer and optionally at least one olefin comonomer under polymerization conditions to produce an olefin polymer, wherein the catalyst composition comprises at least one transition metal or metallocene compound and at least one activator-support. As disclosed, the at least one activator-support comprises at least silica-coated alumina treated with at least one electron-withdrawing anion, and the silica-coated alumina generally has a weight ratio of alumina to silica in a range from about 1:1 to about 100:1. Other co-catalysts, including organoaluminum compounds, can be employed in the olefin polymerization process.

Polymers produced from the polymerization of olefins, resulting in homopolymers, copolymers, and the like, can be used to produce various articles of manufacture.

DEFINITIONS

Figure 1:
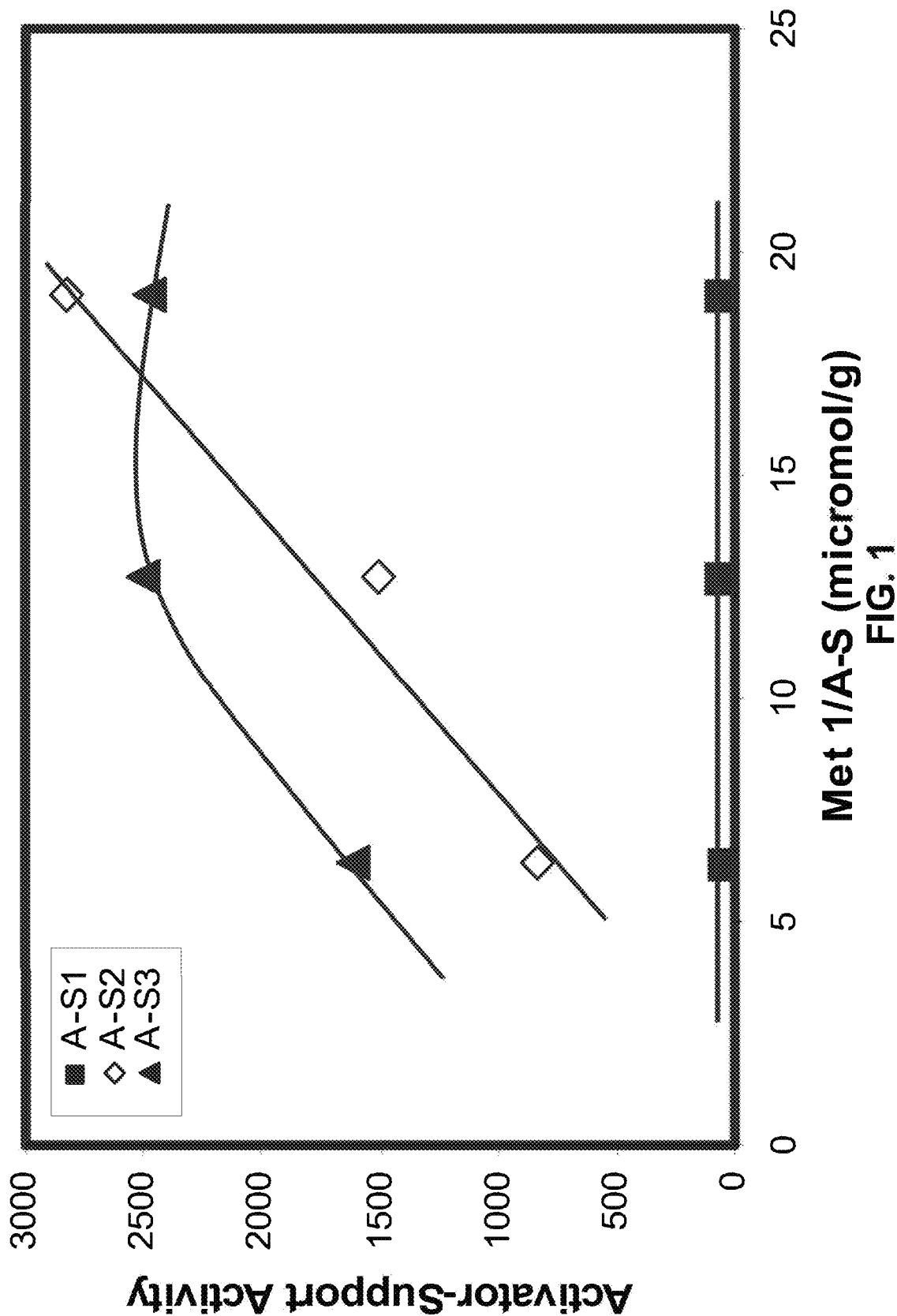
FIG. 1 presents a plot of catalyst activity, in units of grams of polyethylene per gram of activator-support (A-S) per hour, versus the concentration of MET 1, in units of micromoles of MET 1 per gram of the A-S, for the activator-supports of Examples 1-3.

To define more clearly the terms used herein, the following definitions are provided. To the extent that any definition or usage provided by any document incorporated herein by reference conflicts with the definition or usage provided herein, the definition or usage provided herein controls.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer would be categorized an as ethylene/1-hexene copolymer.

In like manner, the scope of the term "polymerization" includes homopolymerization, copolymerization, terpolymerization, etc. Therefore, a copolymerization process would involve contacting one olefin monomer (e.g., ethylene) and one olefin comonomer (e.g., 1-hexene) to produce a copolymer.

The term "co-catalyst" is used generally herein to refer to organoaluminum compounds that can constitute one component of a catalyst composition. Additionally, "co-catalyst" also refers to other optional components of a catalyst composition including, but not limited to, aluminoxanes, organoboron or organoborate compounds, ionizing ionic compounds, as disclosed herein. The term "co-catalyst" is used regardless of the actual function of the compound or any chemical mechanism by which the compound may operate. In one aspect of this invention, the term "co-catalyst" is used to distinguish that component of the catalyst composition from the transition metal or metallocene compound.

The term "fluoroorgano boron compound" is used herein with its ordinary meaning to refer to neutral compounds of the form $BY_3$. The term "fluoroorgano borate compound" also has its usual meaning to refer to the monoanionic salts of a fluoroorgano boron compound of the form $[cation]^+$ $[BY_4]^-$, where Y represents a fluorinated organic group. Materials of these types are generally and collectively referred to as "organoboron or organoborate compounds."

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to the refer to materials which may be blended, mixed, slurried, dissolved, reacted, treated, or otherwise contacted in some other manner.

The term "precontacted" mixture is used herein to describe a first mixture of catalyst components that are contacted for a first period of time prior to the first mixture being used to form a "postcontacted" or second mixture of catalyst components that are contacted for a second period of time. Often, the precontacted mixture describes a mixture of metallocene or transition metal compound (or compounds), olefin monomer (or monomers), and organoaluminum compound (or compounds), before this mixture is contacted with a calcined chemically-treated solid oxide (or oxides) and optional additional organoaluminum compound(s). The precontacted mixture also can describe a mixture of metallocene compound or transition metal compound (or compounds), organoaluminum compound (or compounds), and activator-support compound (or compounds) which is contacted for a period of time prior to being fed to a polymerization reactor. Thus, precontacted describes components that are used to contact each other, but prior to contacting the components in the second, postcontacted mixture. Accordingly, this invention may occasionally distinguish between a component used to prepare the precontacted mixture and that component after the mixture has been prepared. For example, in one aspect of this invention, it is possible for a precontacted organoaluminum compound, once it is contacted with a metallocene and an olefin monomer, to have reacted to form at least one different chemical compound, formulation, or structure from the distinct organoaluminum compound used to prepare the precontacted mixture. In this case, the precontacted organoaluminum compound or component is described as comprising an organoaluminum compound that was used to prepare the precontacted mixture.

Additionally, the precontacted mixture can describe a mixture of metallocene or transition metal compound(s) and organoaluminum compound(s), prior to contacting this mixture with the calcined chemically-treated solid oxide(s). This precontacted mixture also can describe a mixture of metallocene compound(s), olefin monomer(s), and calcined chemically-treated solid oxide(s), before this mixture is contacted with an organoaluminum co-catalyst compound or compounds.

Similarly, the term "postcontacted" mixture is used herein to describe a second mixture of catalyst components that are contacted for a second period of time, and one constituent of which is the "precontacted" or first mixture of catalyst components that were contacted for a first period of time. For example, the term "postcontacted" mixture is used herein to describe the mixture of metallocene or transition metal compound(s), olefin monomer(s), organoaluminum compound(s), and calcined chemically-treated solid oxide(s) formed from contacting the precontacted mixture of a portion of these components with any additional components added to make up the postcontacted mixture. For instance, the additional component added to make up the postcontacted mixture can be a chemically-treated solid oxide, and optionally, can include an organoaluminum compound which is the same as or different from the organoaluminum compound used to prepare the precontacted mixture, as described herein. Accordingly, this invention may also occasionally distinguish between a component used to prepare the postcontacted mixture and that component after the mixture has been prepared.

The term "metallocene," as used herein, describes a compound comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands may include hydrogen, therefore the description "substituted derivatives thereof" in this invention comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst," in much the same way the term "co-catalyst" is used herein to refer to, for example, an organoaluminum compound. Metallocene also is used herein to encompass mono-cyclopentadienyl or half-sandwich compounds, as well as compounds containing at least one cyclodienyl ring and compounds containing boratabenzene ligands. Further, metallocene also is used herein to encompass dinuclear metallocene compounds, i.e., compounds comprising two metallocene moieties linked by a connecting group, such as an alkenyl group resulting from an olefin metathesis reaction or a saturated version resulting from hydrogenation or derivatization. Unless otherwise specified, the following abbreviations are used: Cp for cyclopentadienyl; Ind for indenyl; and Flu for fluorenyl.

The terms "catalyst composition," "catalyst mixture," "catalyst system," and the like, do not depend upon the actual product or composition resulting from the contact or reaction of the components of the composition/mixture, the nature of the active catalytic site, or the fate of the co-catalyst, the metallocene or transition metal compound, any olefin monomer used to prepare a precontacted mixture, or the chemically-treated solid oxide, after combining these components. Therefore, the terms "catalyst composition," "catalyst mixture," "catalyst system," and the like, can include both heterogeneous compositions and homogenous compositions.

The terms "chemically-treated solid oxide," "activator-support," "treated solid oxide," and the like, are used herein to describe a solid, inorganic oxide of relatively high porosity, which exhibits Lewis acidic or Brönsted acidic behavior, and which has been treated with an electron-withdrawing component, typically an anion, and which is calcined. The electron-withdrawing component is typically an electron-withdrawing anion source compound. Thus, the chemically-treated solid oxide comprises a calcined contact product of at least one solid oxide with at least one electron-withdrawing anion source compound. Typically, the chemically-treated solid oxide comprises at least one ionizing, acidic solid oxide. The terms "support" and "activator-support" are not used to imply these components are inert, and such components should not be construed as an inert component of the catalyst composition.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

For any particular compound disclosed herein, any general or specific structure presented also encompasses all conformational isomers, regioisomers, and stereoisomers that may arise from a particular set of substituents. The general or specific structure also encompasses all enantiomers, diastereomers, and other optical isomers whether in enantiomeric or racemic forms, as well as mixtures of stereoisomers, as would be recognized by a skilled artisan.

Applicants disclose several types of ranges in the present invention. These include, but are not limited to, a range of a number of carbon atoms, a range of weight ratios, a range or molar ratios, a range of surface areas, a range of pore volumes, a range of particle sizes, a range of catalyst activities, and so forth. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a weight ratio of alumina to silica in a silica-coated alumina, Applicants' intent is to disclose or claim individually every possible number that such a range could encompass, consistent with the disclosure herein. By a disclosure that the weight ratio of alumina to silica in a silica-coated alumina is in a range from about 1:1 to about 100:1, Applicants intend to recite that the weight ratio can be selected from about 1:1, about 1.1:1, about 1.2:1, about 1.3:1, about 1.4:1, about 1.5:1, about 1.6:1, about 1.7:1, about 1.8:1, about 1.9:1, about 2:1, about 2.1:1, about 2.2:1, about 2.3:1, about 2.4:1, about 2.5:1, about 2.6:1, about 2.7:1, about 2.8:1, about 2.9:1, about 3:1, about 3.1:1, about 3.2:1, about 3.3:1, about 3.4:1, about 3.5:1, about 3.6:1, about 3.7:1, about 3.8:1, about 3.9:1, about 4:1, about 4.1:1, about 4.2:1, about 4.3:1, about 4.4:1, about 4.5:1, about 4.6:1, about 4.7:1, about 4.8:1, about 4.9:1, about 5:1, about 5.1:1, about 5.2:1, about 5.3:1, about 5.4:1, about 5.5:1, about 5.6:1, about 5.7:1, about 5.8:1, about 5.9:1, about 6:1, about 6.5:1, about 7:1, about 7.5:1, about 8:1, about 8.5:1, about 9:1, about 9.5:1, about 10:1, about 11:1, about 12:1, about 13:1, about 14:1, about 15:1, about 16:1, about 17:1, about 18:1, about 19:1, about 20:1, about 30:1, about 40:1, about 50:1, about 60:1, about 70:1, about 80:1, about 90:1, about 95:1, about 96:1, about 97:1, about 98:1, about 99:1, or about 100:1. Additionally, the weight ratio can be within any range from about 1:1 to about 100:1 (for example, the weight ratio is in a range from about 2:1 to about 20:1), and this also includes any combination of ranges between about 1:1 to about 100:1 (for example, the weight ratio is in a range from about 1.8:1 to about 12:1 or from about 20:1 to about 40:1). Likewise, all other ranges disclosed herein should be interpreted in a manner similar to this example.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

The terms "a," "an," and "the" are intended to include plural alternatives, e.g., at least one, unless otherwise specified. For instance, the disclosure of "an activator-support" or "a metallocene compound" is meant to encompass one, or mixtures or combinations of more than one, activator-support or metallocene compound, respectively.

While compositions and methods are described in terms of "comprising" various components or steps, the compositions and methods can also "consist essentially of" or "consist of" the various components or steps. For example, a catalyst composition in an aspect of the present invention can comprise; alternatively, can consist essentially of; or alternatively, can consist of; (i) at least one transition metal or metallocene compound, (ii) at least one activator-support, and (iii) at least one organoaluminum compound.

DETAILED DESCRIPTION OF THE INVENTION

The present invention relates generally to chemically-treated silica-coated alumina activator-supports, catalyst compositions employing these supports, methods for preparing activator-supports and catalyst compositions, methods for using the catalyst compositions to polymerize olefins, the polymer resins produced using such catalyst compositions, and articles produced using these polymer resins.

In particular, the present invention is directed to chemically-treated silica-coated alumina activator-supports and to catalyst compositions employing such activator-supports. Catalyst compositions containing the silica-coated alumina supports of the present invention can be used to produce, for example, ethylene-based homopolymers and copolymers.

Catalyst Compositions

Catalyst compositions disclosed herein employ at least one silica-coated alumina activator-support. According to one aspect of the present invention, a catalyst composition is provided which comprises:

(a) at least one transition metal compound or metallocene compound; and
(b) at least one activator-support.

The at least one activator-support comprises at least one silica-coated alumina, having a weight ratio of alumina to silica ranging from about 1:1 to about 100:1, which is treated with at least one electron-withdrawing anion. The at least one electron-withdrawing anion can comprise, for example, fluoride, chloride, bromide, phosphate, triflate, bisulfate, sulfate, and the like, or combinations thereof. This catalyst composition can further comprise at least one organoaluminum compound. These catalyst compositions can be utilized to produce polyolefins—homopolymers, copolymers, and the like—for a variety of end-use applications.

In accordance with this and other aspects of the present invention, it is contemplated that the catalyst compositions disclosed herein can contain more than one transition metal compound and/or more than one metallocene compound and/or more than one activator-support. Additionally, more than one organoaluminum compound also is contemplated.

In another aspect of the present invention, a catalyst composition is provided which comprises at least one transition metal or metallocene compound, at least one activator-support, and, optionally, at least one organoaluminum compound, wherein this catalyst composition is substantially free of aluminoxanes, organoboron or organoborate compounds, and ionizing ionic compounds. In this aspect, the catalyst composition has catalyst activity, to be discussed below, in the absence of these additional or optional co-catalysts.

However, in other aspects of this invention, optional co-catalysts can be employed. For example, a catalyst composition comprising at least one metallocene or transition metal compound and at least one activator-support can further comprise at least one optional co-catalyst. Suitable co-catalysts in this aspect can include, but are not limited to, aluminoxane compounds, organoboron or organoborate compounds, ionizing ionic compounds, and the like, or combinations thereof. More than one co-catalyst can be present in the catalyst composition.

Another catalyst composition contemplated herein comprises:

(a) at least one transition metal compound or metallocene compound;
(b) at least one activator-support; and
(c) at least one organoaluminum compound.

The at least one activator-support comprises at least one silica-coated alumina treated with at least one electron-withdrawing anion. The at least one silica-coated alumina has a weight ratio of alumina to silica in a range from about 1:1 to about 100:1, or from about 2:1 to about 20:1, in this aspect of the invention. The at least one electron-withdrawing anion can comprise fluoride, chloride, bromide, phosphate, triflate, bisulfate, sulfate, and the like, or combinations thereof. Often, the at least one organoaluminum compound can comprise trimethylaluminum, triethylaluminum, tri-n-propylaluminum, tri-n-butylaluminum, tri-isobutylaluminum, tri-n-hexylaluminum, tri-n-octylaluminum, diisobutylaluminum hydride, diethylaluminum ethoxide, diethylaluminum chloride, or any combination thereof.

Catalyst compositions of the present invention comprising at least one transition metal or metallocene compound and at least one chemically-treated silica-coated alumina activator-support can further comprise at least one additional or optional activator-support. For instance, optional activator-supports such as fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, and the like, or combinations thereof, can be employed in catalyst compositions disclosed herein. If the additional or optional activator-support is a chemically-treated silica-alumina, this material is different from the silica-coated aluminas of the present invention, to be discussed further below. One or more organoaluminum compounds also can be present in the catalyst composition.

In another aspect, a catalyst composition comprising at least one transition metal or metallocene compound and at least one silica-coated alumina activator-support—and optionally, at least one organoaluminum compound—can further comprise at least one additional or optional activator-support, wherein the at least one optional activator-support comprises at least one solid oxide treated with at least one electron-withdrawing anion. The at least one solid oxide can comprise silica, alumina, silica-alumina, aluminum phosphate, heteropolytungstate, titania, zirconia, magnesia, boria, zinc oxide, any mixed oxide thereof, or any mixture thereof; and the at least one electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, or any combination thereof.

Further, activator-supports of this invention can comprise a metal or metal ion such as, for example, zinc, titanium, nickel, vanadium, silver, copper, gallium, tin, tungsten, molybdenum, and the like, or any combination thereof.

In yet another aspect, catalyst compositions of the present invention can further comprise one or more optional activator-supports selected from a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, and the like, or combinations of these materials. Additional, or optional, activator-support materials will be discussed in more detail below.

In one aspect, the present invention encompasses a catalyst composition comprising at least one transition metal or metallocene compound and at least one activator-support. The at least one activator-support can comprise at least one silica-coated alumina treated with at least one electron-withdrawing anion. The weight ratio of alumina to silica in the at least one silica-coated alumina can range from about 1:1 to about 100:1, for example, from about 1.5:1 to about 100:1, from about 2:1 to about 20:1, or from about 2:1 to about 12:1. This catalyst composition can further comprise at least one organoaluminum compound. Additionally, this catalyst composition can further comprise at least one optional co-catalyst, wherein the at least one optional co-catalyst is at least one aluminoxane compound, at least one organoboron or organoborate compound, at least one ionizing ionic compound, or any combination thereof.

This invention further encompasses methods of making these catalyst compositions, such as, for example, contacting the respective catalyst components in any order or sequence.

The at least one transition metal and/or metallocene compound can be precontacted with an olefinic monomer if desired, not necessarily the olefin monomer to be polymerized, and an organoaluminum compound for a first period of time prior to contacting this precontacted mixture with an activator-support. The first period of time for contact, the precontact time, between the transition metal and/or metallocene compound (or compounds), the olefinic monomer, and the organoaluminum compound typically ranges from a time period of about 1 minute to about 24 hours, for example, from about 3 minutes to about 1 hour. Precontact times from about 10 minutes to about 30 minutes are also employed.

Alternatively, the precontacting process is carried out in multiple steps, rather than a single step, in which multiple mixtures are prepared, each comprising a different set of catalyst components. For example, at least two catalyst components are contacted forming a first mixture, followed by contacting the first mixture with at least one other catalyst component forming a second mixture, and so forth.

Multiple precontacting steps can be carried out in a single vessel or in multiple vessels. Further, multiple precontacting steps can be carried out in series (sequentially), in parallel, or a combination thereof. For example, a first mixture of two catalyst components can be formed in a first vessel, a second mixture comprising the first mixture plus one additional catalyst component can be formed in the first vessel or in a second vessel, which is typically placed downstream of the first vessel.

In another aspect, one or more of the catalyst components can be split and used in different precontacting treatments. As an example, part of a catalyst component is fed into a first precontacting vessel for precontacting with at least one other catalyst component, while the remainder of that same catalyst component is fed into a second precontacting vessel for precontacting with at least one other catalyst component, or is fed directly into the reactor, or a combination thereof. The precontacting can be carried out in any suitable equipment, such as tanks, stirred mix tanks, various static mixing devices, a flask, a vessel of any type, or combinations of these apparatus.

In another aspect of this invention, the various catalyst components (for example, transition metal or metallocene compound, activator-support, organoaluminum co-catalyst, and optionally an unsaturated hydrocarbon) are contacted in the polymerization reactor simultaneously while the polymerization reaction is proceeding. Alternatively, any two or more of these catalyst components can be precontacted in a vessel prior to entering the reaction zone. This precontacting step can be continuous, in which the precontacted product is fed continuously to the reactor, or it can be a stepwise or batchwise process in which a batch of precontacted product is added to make a catalyst composition. This precontacting step can be carried out over a time period that can range from a few seconds to as much as several days, or longer. In this aspect, the continuous precontacting step generally lasts from about 1 second to about 1 hour. In another aspect, the continuous precontacting step lasts from about 10 seconds to about 45 minutes, or from about 1 minute to about 30 minutes.

Once a precontacted mixture of the transition metal and/or metallocene compound(s), olefin monomer(s), and organoaluminum co-catalyst(s) is contacted with the activator-support(s), this composition (with the addition of the activator-support) is termed the "postcontacted mixture." The postcontacted mixture optionally remains in contact for a second period of time, the postcontact time, prior to initiating the polymerization process. Postcontact times between the precontacted mixture and the activator-support generally range from about 1 minute to about 24 hours. In a further aspect, the postcontact time can be in a range from about 1 minute to about 1 hour. The precontacting step, the postcontacting step, or both, can increase the productivity of the polymer as compared to the same catalyst composition that is prepared without precontacting or postcontacting. However, neither a precontacting step nor a postcontacting step is required.

The postcontacted mixture can be heated at a temperature and for a time period sufficient to allow adsorption, impregnation, or interaction of precontacted mixture and the activator-support, such that a portion of the components of the precontacted mixture is immobilized, adsorbed, or deposited thereon. Where heating is employed, the postcontacted mixture generally is heated to a temperature of from between about 0° F. to about 150° F., or from about 40° F. to about 95° F.

In another aspect, a metallocene, an organoaluminum, and an activator-support can be precontacted for a period of time prior to being contacted with the olefin to be polymerized in the reactor, as demonstrated in Example 6 that follows.

According to one aspect of this invention, the molar ratio of the moles of transition metal or metallocene compound to the moles of organoaluminum compound in a catalyst composition generally is in a range from about 1:1 to about 1:10,000. In another aspect, the molar ratio is in a range from about 1:1 to about 1:1,000. Yet, in another aspect, the molar ratio of the moles of metallocene or transition metal compound to the moles of organoaluminum compound is in a range from about 1:1 to about 1:100. These molar ratios reflect the ratio of total moles of transition metal and/or metallocene compound (or compounds) to the total amount of organoaluminum compound (or compounds) in both the precontacted mixture and the postcontacted mixture combined, if precontacting and/or postcontacting steps are employed.

When a precontacting step is used, the molar ratio of the total moles of olefin monomer to total moles of transition metal and/or metallocene compound(s) in the precontacted mixture is typically in a range from about 1:10 to about 100,000:1. Total moles of each component are used in this ratio to account for aspects of this invention where more than one olefin monomer and/or more than one transition metal and/or metallocene compound is employed. Further, this molar ratio can be in a range from about 10:1 to about 1,000:1 in another aspect of the invention.

Generally, the weight ratio of organoaluminum compound to activator-support is in a range from about 10:1 to about 1:1000. If more than one organoaluminum compound and/or more than one activator-support is employed, this ratio is based on the total weight of each respective component. In another aspect, the weight ratio of the organoaluminum compound to the activator-support is in a range from about 3:1 to about 1:100, or from about 1:1 to about 1:50.

In some aspects of this invention, the weight ratio of transition metal or metallocene to activator-support is in a range from about 1:1 to about 1:1,000,000. If more than one transition metal and/or metallocene compound and/or more than one activator-support is employed, this ratio is based on the total weight of each respective component. In another aspect, this weight ratio is in a range from about 1:5 to about 1:100,000, or from about 1:10 to about 1:10,000. Yet, in another aspect, the weight ratio of the transition metal and/or metallocene compound(s) to the activator-support is in a range from about 1:20 to about 1:1000.

Yet, in another aspect of this invention, the concentration of the transition metal or metallocene, in units of micromoles of the transition metal or metallocene per gram of the activator-support, can be in a range from about 0.5 to about 150. If more than one transition metal and/or metallocene and/or more than one activator-support is employed, this ratio is based on the total weight of each respective component. In another aspect, the concentration of the transition metal and/or metallocene, in units of micromoles of the transition metal and/or metallocene per gram of the activator-support, can be in a range from about 1 to about 120, for example, from about 5 to about 100, from about 5 to about 80, from about 5 to about 60, or from about 5 to about 40. In still another aspect, the concentration of the transition metal and/or metallocene, in units of micromoles of the transition metal and/or metallocene per gram of the activator-support, is in a range from about 1 to about 30, from about 1 to about 20, from about 1 to about 15, or from about 1 to about 12.

According to some aspects of this invention, aluminoxane compounds are not required to form the catalyst composition. Thus, the polymerization proceeds in the absence of aluminoxanes. Accordingly, the present invention can use, for example, organoaluminum compounds and an activator-support in the absence of aluminoxanes. While not intending to be bound by theory, it is believed that the organoaluminum compound likely does not activate a transition metal or metallocene catalyst in the same manner as an organoaluminoxane compound.

Additionally, in some aspects, organoboron and organoborate compounds are not required to form a catalyst composition of this invention. Nonetheless, aluminoxanes, organoboron or organoborate compounds, ionizing ionic compounds, or combinations thereof can be used in other catalyst compositions contemplated by and encompassed within the present invention. Hence, co-catalysts such as aluminoxanes, organoboron or organoborate compounds, ionizing ionic compounds, or combinations thereof, can be employed with the transition metal and/or metallocene compound, and either in the presence or in the absence of an organoaluminum compound.

In accordance with one aspect of this invention, a catalyst composition can comprise at least one transition metal or metallocene compound, and at least one activator-support. In accordance with another aspect of this invention, a catalyst composition can comprise at least one transition metal or metallocene compound, at least one activator-support, and at least one organoaluminum compound. Catalyst compositions in these and other aspects of the present invention generally have a catalyst activity greater than about 100 grams of polyethylene (homopolymer, copolymer, etc., as the context requires) per gram of activator-support per hour (abbreviated gPE/gA-S/hr). In another aspect, the catalyst activity can be greater than about 200, greater than about 300, greater than about 400, or greater than about 500 gPE/gA-S/hr. In still another aspect, catalyst compositions of this invention can be characterized as having a catalyst activity greater than about 750, greater than about 1000, or greater than about 1500 gPE/gA-S/hr. The catalyst activity can be greater than about 2000, greater than about 4000, or greater than about 5000 gPE/gA-S/hr, in certain aspects of this invention. The catalyst activity is measured under slurry polymerization conditions using isobutane as the diluent, at a polymerization temperature of 90° C. and a reactor pressure of 420 psig. The reactor pressure is largely controlled by the pressure of the monomer, e.g., the ethylene pressure, but other contributors to the reactor pressure can include hydrogen gas (e.g., if hydrogen is used), isobutane vapor, and comonomer gas or vapor (e.g., if a comonomer is used).

Likewise, catalyst compositions of the present invention can have a catalyst activity greater than about 5000 grams of polyethylene (homopolymer, copolymer, etc., as the context requires) per gram of transition metal compound or metallocene compound per hour (abbreviated gPE/gMET/hr). For example, the catalyst activity can be greater than about 10,000, greater than about 25,000, or greater than about 50,000 gPE/gMET/hr. In another aspect, catalyst compositions of this invention can be characterized as having a catalyst activity greater than about 75,000, greater than about 100,000, or greater than about 150,000 gPE/gMET/hr. Yet, in another aspect of this invention, the catalyst activity can be greater than about 200,000, greater than about 300,000, greater than about 400,000, or greater than about 500,000 gPE/gMET/hr. This catalyst activity is measured under slurry polymerization conditions using isobutane as the diluent, at a polymerization temperature of about 90° C. and a reactor pressure of about 420 psig.

Catalyst compositions employing silica-coated alumina activator supports—for instance, fluorided silica-coated alumina—may result in significant increases in catalyst activity, for instance, as compared to a conventional silica-alumina activator-support—for instance, fluorided silica-alumina— having an alumina to silica weight ratio of less than 1:1 (e.g., from about 0.05:1 to about 0.25:1). These catalyst activities can be compared on a "per gram of activator-support" basis or on a "per gram of transition metal or metallocene" basis. In one aspect, the catalyst activity of a catalyst composition of the present invention is at least twice that of a comparable catalyst composition containing a conventional silica-alumina activator-support (i.e., at the same reaction conditions, using the same other catalyst components, same anion chemical treatment, etc.). In another aspect, the activity of a catalyst composition comprising a silica-coated alumina activator-support (with a weight ratio of alumina to silica in a range of, for example, from about 1.5:1 to about 100:1) can be at least about 3 times, at least about 4 times, at least about 5 times, at least about 6 times, or at least about 7 times the activity of a comparable catalyst composition comprising a silica-alumina activator-support (having a weight ratio of alumina to silica in a range of, for example, from about 0.05:1 to about 0.25:1). In still another aspect, the catalyst activity of a catalyst composition comprising a silica-coated alumina activator-support can be from about 2 times to about 100 times the activity of a comparable catalyst composition comprising a silica-alumina activator-support. Yet, in another aspect, the catalyst activity of a catalyst composition comprising a silica-coated alumina activator-support can be from about 2 times to about 80 times; alternatively, from about 3 times to about 60 times; alternatively, from about 3 times to about 40 times; or alternatively, from about 4 times to about 20 times; the activity of a comparable catalyst composition comprising a silica-alumina activator-support.

As discussed herein, any combination of the metallocene or transition metal compound, the activator-support, the organoaluminum compound, and the olefin monomer, can be precontacted in some aspects of this invention. When any precontacting occurs with an olefinic monomer, it is not necessary that the olefin monomer used in the precontacting step be the same as the olefin to be polymerized. Further, when a precontacting step among any combination of the catalyst components is employed for a first period of time, this precontacted mixture can be used in a subsequent postcontacting step between any other combination of catalyst components for a second period of time. For example, a metallocene compound, an organoaluminum compound, and 1-hexene can be used in a precontacting step for a first period of time, and this precontacted mixture then can be contacted with a calcined chemically-treated solid oxide to form a postcontacted mixture that is contacted for a second period of time prior to initiating the polymerization reaction. For example, the first period of time for contact, the precontact time, between any combination of the transition metal or metallocene compound, the olefinic monomer, the activator-support, and the organoaluminum compound can be from about 1 minute to about 24 hours, from about 1 minute to about 1 hour, or from about 10 minutes to about 30 minutes. The postcontacted mixture optionally is allowed to remain in contact for a second period of time, the postcontact time, prior to initiating the polymerization process. According to one aspect of this invention, postcontact times between the precontacted mixture and any remaining catalyst components is from about 1 minute to about 24 hours, or from about 0.1 hour to about 1 hour.

Silica-Coated Alumina Activator-Supports

Activator-supports of the present invention comprise silica-coated aluminas, and these materials comprise an alumina matrix that is coated, or partially coated, with a layer of silica. These silica-coated aluminas generally have a high alumina content, i.e., a weight ratio of alumina to silica in the silica-coated alumina of greater than about 1:1. Silica-coated alumina activator-supports provided in this invention can comprise at least one silica-coated alumina treated with at least one electron-withdrawing anion, the at least one silica-coated alumina having a weight ratio of alumina to silica ranging, generally, from about 1:1 to about 100:1. The at least one electron-withdrawing anion typically comprises fluoride, chloride, bromide, phosphate, triflate, bisulfate, sulfate, and the like, but combinations of two or more of these anions also can be employed.

In one aspect of this invention, the weight ratio of alumina to silica in the silica-coated alumina can be in a range from about 1:1 to about 100:1, or from about 1.2:1 to about 25:1. In another aspect, the weight ratio of alumina to silica in the silica-coated alumina is in a range from about 1.1:1 to about 100:1; alternatively, from about 1.1:1 to about 75:1; alternatively, from about 1.3:1 to about 50:1; alternatively, from about 1.5:1 to about 20:1; or alternatively, from about 1.5:1 to about 15:1. Yet, in another aspect, the weight ratio of alumina to silica is in a range from about 2:1 to about 100:1, such as, for example, from about 2:1 to about 50:1, from about 2:1 to about 25:1, or from about 2:1 to about 20:1. For instance, the alumina to silica weight ratio in a silica-coated alumina can be in a range from about 2:1 to about 15:1, from about 2:1 to about 12:1, or from about 2:1 to about 10:1. The alumina to silica weight ratio in the silica-coated alumina can be from about 2.1:1 to about 9:1, from about 2.2:1 to about 8:1, or from about 2.3:1 to about 6:1, in other aspects disclosed herein.

High alumina content silica-coated aluminas of the present invention generally have surface areas ranging from about 100 to about 1000 $m^2/g$. In some aspects, the surface area falls within a range from about 150 to about 750 $m^2/g$, for example, from about 200 to about 600 $m^2/g$. The surface area of the silica-coated alumina can range from about 250 to about 500 $m^2/g$ in another aspect of this invention. High alumina content silica-coated aluminas having surface areas of about 300 $m^2/g$, about 350 $m^2/g$, about 400 $m^2/g$, or about 450 $m^2/g$, can be employed in aspects of this invention.

The pore volume of the silica-coated aluminas is generally greater than about 0.5 mL/g. Often, the pore volume is greater than about 0.75 mL/g, or greater than about 1 mL/g. In another aspect, the pore volume is greater than about 1.2 mL/g. In yet another aspect, the pore volume falls within a range from about 0.5 mL/g to about 1.8 mL/g, such as, for example, from about 0.8 mL/g to about 1.7 mL/g, or from about 1 mL/g to about 1.6 mL/g.

The silica-coated aluminas disclosed herein generally have average particle sizes ranging from about 5 microns to about 150 microns. In some aspects of this invention, the average particle size falls within a range from about 30 microns to about 100 microns. For example, the average particle size of silica-coated aluminas can be in a range from about 40 to about 80 microns.

Silica-coated aluminas of the present invention can be produced using various methods, including those disclosed in U.S. Pat. No. 5,401,820, which is incorporated herein by reference in its entirety. In one aspect of this invention, a suitable method for producing a silica-coated alumina can comprise the following steps:

(i) providing at least one alumina source, the at least one alumina source comprising an alumina, a hydrated alumina, aluminum hydroxide, boehmite, or a combination thereof;

(ii) contacting the at least one alumina source with a solution or suspension comprising at least one solvent and at least one silicon-containing compound capable of producing silica upon calcination;

(iii) depositing a coating of the at least one silicon-containing compound on at least a portion of the at least one alumina source; and (iv) removing the solvent.

Alumina sources for silica-coated aluminas can include, but are not limited to, an alumina, a hydrated alumina, aluminum hydroxide, boehmite, or a combination thereof.

In one step of the process to produce a silica-coated alumina, the alumina source (or sources) is/are contacted with a solution or suspension comprising at least one solvent and at least one silicon-containing compound capable of producing silica upon calcination. The alumina source may be wet or dry prior to this contacting step. Although not limited to any particular solvent(s), suitable solvents for the solution or suspension (e.g., dispersion, emulsion, and so forth) can include, for example, water, and organic solvents such as hexane, heptane, benzene, toluene, xylene, and other hydrocarbons, acetone, alcohols, and the like, or combinations thereof.

One or more silicon-containing compounds can be used to produce a coating of silica, for example, a partial coating on the alumina, a full coating on the alumina, etc. The silicon-containing compound generally is a material that is capable of producing or liberating silica upon calcination, and such materials can include, but are not limited to, silica, sodium silicate, potassium silicate, $SiCl_4$, $Si(OMe)_4$, $Si(OEt)_4$, siloxane polymers, silica colloids, silicic acid, and the like, or combinations thereof.

In some aspects, a coating of the silicon-containing compound is deposited on at least a portion of the alumina source, and the solvent is removed. The solvent may be removed prior to, or during, a subsequent calcination step. The coated alumina may be calcined before and/or during and/or after the coated alumina is contacted with an electron-withdrawing anion source. The result of this process is a coating of silica on the alumina, i.e., a partial coating, or a complete coating.

It should be noted that the silica-coated aluminas disclosed herein are different from conventional silica-alumina solid oxides (e.g., mixed oxides), both in terms of morphology and the processes used to produce the respective materials. As noted above, silica-coated aluminas of the present invention have both a high alumina content (e.g., a weight ratio of alumina to silica in a range from about 1:1 to about 100:1) and a coating of silica (e.g., partial, complete) on an alumina matrix. Silica-aluminas are known materials typically having an alumina to silica weight ratio of less than 1:1, and usually in a range from about 0.05:1 to about 0.25:1, as illustrated in Example 1 that follows. Such silica-alumina materials are not the inventive silica-coated aluminas of this invention. It is believed that silica-alumina mixed oxides can be prepared by co-gelling or co-precipitating methods, which may result in a mixed matrix of silica and alumina (e.g., a mixed oxide), or by impregnating a silica matrix with aluminum ions or alumina. The resultant morphology is different from an alumina matrix with a full or partial coating of silica.

The electron-withdrawing component used to treat the silica-coated alumina solid oxide can be any component that increases the Lewis or Brönsted acidity of the solid oxide upon treatment (as compared to the solid oxide that is not treated with at least one electron-withdrawing anion). According to one aspect of the present invention, the electron-withdrawing component is an electron-withdrawing anion derived from a salt, an acid, or other compound, such as a volatile organic compound, that serves as a source or precursor for that anion. Examples of suitable electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, and the like, including mixtures and combinations thereof. In addition, other ionic or non-ionic compounds that serve as sources for these electron-withdrawing anions also can be employed in the present invention. It is contemplated that the electron-withdrawing anion can be, or can comprise, fluoride, chloride, bromide, phosphate, triflate, bisulfate, sulfate, and the like, or any combination thereof, in some aspects of this invention. For instance, the at least one electron-withdrawing anion can comprise fluoride or, alternatively, can comprise sulfate.

According to one aspect of the present invention, an activator-support comprising at least one silica-coated alumina treated with at least one electron-withdrawing anion is contemplated. In this aspect, the at least one silica-coated alumina has a weight ratio of alumina to silica in a range from about 1:1 to about 100:1; alternatively, from about 1.5:1 to about 100:1; alternatively, from about 2:1 to about 20:1; or alternatively, from about 2:1 to about 12:1. Also, in this aspect, the at least one electron-withdrawing anion can comprise fluoride, chloride, bromide, phosphate, triflate, bisulfate, sulfate, or any combination thereof; alternatively, can comprise chloride, bromide, phosphate, triflate, bisulfate, sulfate, or any combination thereof; alternatively, can comprise chloride, bromide, phosphate, sulfate, or any combination thereof; alternatively, can comprise chloride; alternatively, can comprise bromide; alternatively, can comprise phosphate; or alternatively, can comprise sulfate.

When the electron-withdrawing component comprises a salt of an electron-withdrawing anion, the counterion or cation of that salt can be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of two or more different electron-withdrawing anions, in varying proportions, can be used to tailor the specific acidity of the activator-support to the desired level. Combinations of electron-withdrawing components can be contacted with the oxide material(s) simultaneously or individually, and in any order that affords the desired chemically-treated solid oxide acidity. For example, one aspect of this invention is employing two or more electron-withdrawing anion source compounds in two or more separate contacting steps. Hence, in aspects of this invention, an activator-support can comprise a silica-coated alumina treated with at least two electron-withdrawing anions. Generally, the electron-withdrawing anions can be selected from fluoride, chloride, bromide, phosphate, triflate, bisulfate, sulfate, and the like. Accordingly, the at least two electron-withdrawing anions can comprise fluoride and phosphate, fluoride and sulfate, chloride and phosphate, chloride and sulfate, triflate and sulfate, or triflate and phosphate, in some aspects of this invention.

Thus, one example of a process by which a chemically-treated silica-coated alumina can be prepared is as follows: the selected solid oxide (or a combination of oxides) is contacted with a first electron-withdrawing anion source compound to form a first mixture; this first mixture is calcined and then contacted with a second electron-withdrawing anion source compound to form a second mixture; the second mixture is then calcined to form a treated solid oxide. In such a process, the first and second electron-withdrawing anion source compounds are either the same or different compounds, comprising the same or different anions (e.g., fluoride and sulfate, chloride and phosphate, etc.).

According to one aspect of the present invention, an activator-support comprising at least one silica-coated alumina treated with at least two electron-withdrawing anions is contemplated. In this aspect, the at least one silica-coated alumina has a weight ratio of alumina to silica in a range from about 1:1 to about 100:1, alternatively, from about 1.5:1 to about 100:1; alternatively, from about 2:1 to about 20:1; or alternatively, from about 2:1 to about 12:1. Also, in this aspect, the at least two electron-withdrawing anions can comprise fluoride and phosphate, fluoride and sulfate, chloride and phosphate, chloride and sulfate, triflate and sulfate, or triflate and phosphate; alternatively, can comprise fluoride and phosphate; alternatively, can comprise fluoride and sulfate; alternatively, can comprise chloride and phosphate; alternatively, can comprise chloride and sulfate; alternatively, can comprise triflate and sulfate; or alternatively, can comprise triflate and phosphate.

According to another aspect of the present invention, a chemically-treated silica-coated alumina can be treated with a metal source, including metal salts, metal ions, or other metal-containing compounds. Non-limiting examples of the metal or metal ion can include zinc, nickel, vanadium, titanium, silver, copper, gallium, tin, tungsten, molybdenum, zirconium, and the like, or combinations thereof. Any method of impregnating the solid oxide with a metal can be used. The method by which the oxide is contacted with a metal source, typically a salt or metal-containing compound, can include, but is not limited to, gelling, co-gelling, impregnation of one compound onto another, and the like. If desired, the metal-containing compound can be added to or impregnated into the solid oxide in solution form, and subsequently converted into the supported metal upon calcining. Accordingly, the silica-coated alumina or chemically-treated silica-coated alumina can further comprise a metal or metal ion comprising zinc, titanium, nickel, vanadium, silver, copper, gallium, tin, tungsten, molybdenum, and the like, or combinations of these metals. For example, zinc is often used to impregnate the solid oxide because it may provide improved catalyst activity at a low cost.

The solid oxide can be treated with metal salts or metal-containing compounds before, after, or at the same time that the solid oxide is treated with the electron-withdrawing anion. Following any contacting method, the contacted mixture of oxide, electron-withdrawing anion, and the metal ion is typically calcined. Alternatively, the solid oxide material, the electron-withdrawing anion source, and the metal salt or metal-containing compound are contacted and calcined simultaneously.

Various processes can be used to form chemically-treated solid oxides useful in the present invention. The chemically-treated solid oxide can comprise a contact product of at least one silica-coated alumina solid oxide with one or more electron-withdrawing anion sources. It is not required that the silica-coated alumina solid oxide be calcined prior to contacting the electron-withdrawing anion source. Therefore, the solid oxide can be calcined or, alternatively, the solid oxide can be uncalcined. The contact product typically is calcined either during or after the solid oxide is contacted with the electron-withdrawing anion source. Various processes to prepare solid oxide activator-supports that can be employed in this invention have been reported. For example, such methods are described in U.S. Pat. Nos. 6,107,230, 6,165,929, 6,294,494, 6,300,271, 6,316,553, 6,355,594, 6,376,415, 6,388,017, 6,391,816, 6,395,666, 6,524,987, 6,548,441, 6,548,442, 6,576,583, 6,613,712, 6,632,894, 6,667,274, and 6,750,302, the disclosures of which are incorporated herein by reference in their entirety.

According to one aspect of the present invention, the solid oxide is chemically-treated by contacting it with at least one electron-withdrawing component, typically an electron-withdrawing anion source. Further, the solid oxide optionally is treated with a metal ion, and then calcined to form a metal-containing or metal-impregnated chemically-treated solid oxide. According to another aspect of the present invention, the solid oxide and electron-withdrawing anion source are contacted and calcined simultaneously.

The method by which the oxide is contacted with the electron-withdrawing component, typically a salt or an acid of an electron-withdrawing anion, can include, but is not limited to, gelling, co-gelling, impregnation of one compound onto another, and the like. Thus, following any contacting method, the contacted mixture of the solid oxide, electron-withdrawing anion, and optional metal ion, can be, and often is, calcined.

The solid oxide activator-support (i.e., chemically-treated solid oxide), whether the inventive activator-supports of this invention or optional, additional activator-supports (to be discussed below), thus can be produced by a process comprising:

1) contacting at least one solid oxide with at least one electron-withdrawing anion source compound to form a first mixture; and 2) calcining the first mixture to form the solid oxide activator-support.

According to another aspect of the present invention, the solid oxide activator-support (chemically-treated solid oxide) can be produced by a process comprising:

1) contacting at least one solid oxide with a first electron-withdrawing anion source compound to form a first mixture;

2) calcining the first mixture to produce a calcined first mixture;

3) contacting the calcined first mixture with a second electron-withdrawing anion source compound to form a second mixture; and 4) calcining the second mixture to form the solid oxide activator-support.

Generally, the at least one electron-withdrawing anion source compound is contacted with the at least one alumina source (e.g., alumina, boehmite) after the at least one alumina source has been contacted with at least one silicon-containing compound capable of producing silica upon calcination (e.g., silica, silicate). However, it is also contemplated that the electron-withdrawing anion source compound can be contacted with the at least one alumina source before—or, alternatively, at the same time as—the at least one alumina source is contacted with at least one silicon-containing compound capable of producing silica upon calcination.

According to yet another aspect of the present invention, the chemically-treated solid oxide is produced or formed by contacting the solid oxide with the electron-withdrawing anion source compound, where the solid oxide compound is calcined before, during, or after contacting the electron-withdrawing anion source, and where there is a substantial absence of aluminoxanes, organoboron or organoborate compounds, and ionizing ionic compounds.

Calcining of solid oxides and chemically-treated solid oxides generally is conducted in an ambient atmosphere, typically in a dry ambient atmosphere, at a temperature from about 200° C. to about 900° C., and for a time period of about 1 minute to about 30 hours. Calcining can be conducted at a temperature from about 300° C. to about 800° C., or alternatively, at a temperature from about 400° C. to about 700° C. Calcining can be conducted for about 30 minutes to about 50 hours, or for about 1 hour to about 15 hours. Thus, for example, calcining can be carried out for about 1 to about 10 hours at a temperature from about 350° C. to about 550° C. Any suitable ambient atmosphere can be employed during calcining. Generally, calcining is conducted in an oxidizing atmosphere, such as air or oxygen. Alternatively, an inert atmosphere, such as nitrogen or argon, or a reducing atmosphere, such as hydrogen or carbon monoxide, can be used.

According to one aspect of the present invention, the silica-coated alumina solid oxide can be treated with a source of halide ion, sulfate ion, or a combination of anions, optionally treated with a metal ion, and then calcined to provide the chemically-treated solid oxide in the form of a particulate solid. For example, the solid oxide material can be treated with a source of sulfate (termed a "sulfating agent"), a source of chloride ion (termed a "chloriding agent"), a source of fluoride ion (termed a "fluoriding agent"), or a combination thereof, and calcined to provide the solid oxide activator.

A chemically-treated solid oxide can comprise a fluorided silica-coated alumina in the form of a particulate solid. The fluorided silica-coated alumina can be formed by contacting a silica-coated alumina with a fluoriding agent. The fluoride ion can be added to the oxide by forming a slurry of the oxide in a suitable solvent such as alcohol or water including, but not limited to, the one to three carbon alcohols because of their volatility and low surface tension. Examples of suitable fluoriding agents include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), hexafluorotitanic acid ($H_2TiF_6$), ammonium hexafluorotitanic acid (($NH_4)_2TiF_6$), hexafluorozirconic acid ($H_2ZrF_6$), $AlF_3$, $NH_4AlF_4$, analogs thereof, and combinations thereof. Triflic acid and ammonium triflate also can be employed. For example, ammonium bifluoride ($NH_4HF_2$) can be used as the fluoriding agent, due to its ease of use and availability.

If desired, the solid oxide can be treated with a fluoriding agent during the calcining step. Any fluoriding agent capable of thoroughly contacting the silica-coated alumina during the calcining step can be used. For example, in addition to those fluoriding agents described previously, volatile organic fluoriding agents can be used. Examples of volatile organic fluoriding agents useful in this aspect of the invention include, but are not limited to, freons, perfluorohexane, perfluorobenzene, fluoromethane, trifluoroethanol, an the like, and combinations thereof. Calcining temperatures generally must be high enough to decompose the compound and release fluoride. Gaseous hydrogen fluoride (HF) or fluorine ($F_2$) itself also can be used with the silica-coated alumina if fluorided while calcining. Silicon tetrafluoride ($SiF_4$) and compounds containing tetrafluoroborate ($BF_4^-$) also can be employed. One convenient method of contacting silica-coated alumina with the fluoriding agent is to vaporize a fluoriding agent into a gas stream used to fluidize the silica-coated alumina during calcination.

Similarly, in another aspect of this invention, the chemically-treated solid oxide comprises a chlorided silica-coated alumina in the form of a particulate solid. The chlorided solid oxide is formed by contacting silica-coated alumina with a chloriding agent. The chloride ion can be added to the oxide by forming a slurry of the oxide in a suitable solvent. The silica-coated alumina can be treated with a chloriding agent during the calcining step. Any chloriding agent capable of serving as a source of chloride and thoroughly contacting the oxide during the calcining step can be used, such as $SiCl_4$, $SiMe_2Cl_2$, $TiCl_4$, $BCl_3$, and the like, including mixtures thereof. Volatile organic chloriding agents can be used. Examples of suitable volatile organic chloriding agents include, but are not limited to, certain freons, perchlorobenzene, chloromethane, dichloromethane, chloroform, carbon tetrachloride, trichloroethanol, and the like, or any combination thereof. Gaseous hydrogen chloride or chlorine itself also can be used with the solid oxide during calcining. One convenient method of contacting silica-coated alumina with the chloriding agent is to vaporize a chloriding agent into a gas stream used to fluidize the solid oxide during calcination.

The amount of fluoride or chloride ion present before calcining the silica-coated alumina solid oxide generally is from about 1 to about 50% by weight, where weight percent is based on the weight of the solid oxide before calcining. According to another aspect of this invention, the amount of fluoride or chloride ion present before calcining the solid oxide is from about 1 to about 25% by weight, from about 2 to about 15%, or from about 3 to about 12% by weight. According to yet another aspect of this invention, the amount of fluoride or chloride ion present before calcining the solid oxide is from about 5 to about 10% by weight. Once impregnated with halide, the halided silica-coated alumina can be dried by any suitable method including, but not limited to, suction filtration followed by evaporation, drying under vacuum, spray drying, and the like, although it is also possible to initiate the calcining step immediately without drying the impregnated solid oxide.

A sulfated solid oxide comprises sulfate and a solid oxide component, such as silica-coated alumina, in the form of a particulate solid. Optionally, the sulfated oxide can be treated further with a metal ion such that the calcined sulfated oxide comprises a metal. According to one aspect of the present invention, the sulfated solid oxide comprises sulfate and silica-coated alumina. In some instances, the sulfated silica-coated alumina can be formed by a process wherein the silica-coated alumina is treated with a sulfate source, for example, sulfuric acid or a sulfate salt such as ammonium sulfate. This process is generally performed by forming a slurry of the silica-coated alumina in a suitable solvent, such as alcohol or water, in which the desired concentration of the sulfating agent has been added. Suitable organic solvents include, but are not limited to, the one to three carbon alcohols because of their volatility and low surface tension.

According to one aspect of this invention, the amount of sulfate ion present before calcining is from about 0.5 to about 100 parts by weight sulfate ion to about 100 parts by weight solid oxide. According to another aspect of this invention, the amount of sulfate ion present before calcining is from about 1 to about 50 parts by weight sulfate ion to about 100 parts by weight solid oxide, and according to still another aspect of this invention, from about 5 to about 30 parts by weight sulfate ion to about 100 parts by weight solid oxide. These weight ratios are based on the weight of the solid oxide before calcining. Once impregnated with sulfate, the sulfated silica-coated alumina can be dried by any suitable method including, but not limited to, suction filtration followed by evaporation, drying under vacuum, spray drying, and the like, although it is also possible to initiate the calcining step immediately.

Generally, the silica-coated alumina activator-supports of the present invention are calcined. The silica-coated alumina can be calcined prior to chemical treatment, but this is not a requirement. Either during or after chemical treatment, the silica-coated alumina activator-support can be calcined. Activator-supports comprising at least one silica-coated alumina treated with at least one electron-withdrawing anion, after calcining, generally have surface areas ranging from about 100 to about 1000 $m^2/g$. In some aspects, the surface area falls within a range from about 150 to about 750 $m^2/g$, for example, from about 200 to about 600 $m^2/g$. The surface area of the activator-support can range from about 200 to about 500 $m^2/g$ in another aspect of this invention. For instance, activator-supports having surface areas of about 300 $m^2/g$, about 350 $m^2/g$, about 400 $m^2/g$, or about 450 $m^2/g$, can be employed in this invention.

After calcining, the pore volume of the activator-support is generally greater than about 0.5 mL/g. Often, the pore volume is greater than about 0.75 mL/g, or greater than about 1 mL/g. In another aspect, the pore volume is greater than about 1.2 mL/g. In yet another aspect, the pore volume falls within a range from about 0.8 mL/g to about 1.8 mL/g, such as, for example, from about 1 mL/g to about 1.6 mL/g.

The calcined activator-supports disclosed herein generally have average particle sizes ranging from about 5 microns to about 150 microns. In some aspects of this invention, the average particle size falls within a range from about 30 microns to about 100 microns. For example, the average particle size of the activator-supports can be in a range from about 40 to about 80 microns.

According to another aspect of the present invention, one or more of transition metal and/or metallocene compounds can be precontacted with an olefin monomer(s) and an organoaluminum compound(s) for a first period of time prior to contacting this mixture with an activator-support (e.g., a chemically-treated silica-coated alumina). Once the precontacted mixture of the transition metal and/or metallocene compound, olefin monomer, and organoaluminum compound is contacted with the activator-support (one or more than one), the composition further comprising the activator-support is termed the "postcontacted" mixture. The postcontacted mixture can be allowed to remain in further contact for a second period of time prior to being charged into the reactor in which the polymerization process will be carried out.

According to yet another aspect of the present invention, one or more of transition metal and/or metallocene compounds can be precontacted with an olefin monomer and an activator-support (e.g., a chemically-treated silica-coated alumina) for a first period of time prior to contacting this mixture with an organoaluminum compound. Once the precontacted mixture of the transition metal and/or metallocene compound, olefin monomer, and activator-support (one or more than one) is contacted with the organoaluminum compound, the composition further comprising the organoaluminum is termed a "postcontacted" mixture. The postcontacted mixture can be allowed to remain in further contact for a second period of time prior to being introduced into the polymerization reactor.

Optional Activator-Supports

The present invention encompasses various catalyst compositions which can include an activator-support. For example, a catalyst composition is provided which comprises at least one metallocene or transition metal compound and at least one activator-support. The at least one activator-support comprises at least one silica-coated alumina, having a weight ratio of alumina to silica ranging from about 1:1 to about 100:1, which is treated with at least one electron-withdrawing anion.

Such catalyst compositions can further comprise an additional, optional activator-support, such as a chemically-treated solid oxide, that is different from the chemically-treated, silica-coated alumina of the present invention. Alternatively, the catalyst composition can further comprise an activator-support selected from a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, and the like, or any combination thereof.

Generally, chemically-treated solid oxides exhibits enhanced acidity as compared to the corresponding untreated solid oxide compound. The chemically-treated solid oxide also functions as a catalyst activator as compared to the corresponding untreated solid oxide. While the chemically-treated solid oxide activates the metallocene in the absence of co-catalysts, it is not necessary to eliminate co-catalysts from the catalyst composition. The activation function of the activator-support is evident in the enhanced activity of catalyst composition as a whole, as compared to a catalyst composition containing the corresponding untreated solid oxide. However, it is believed that the chemically-treated solid oxide can function as an activator, even in the absence of organoaluminum compounds, aluminoxanes, organoboron compounds, ionizing ionic compounds, and the like.

Chemically-treated solid oxides can comprise at least one solid oxide treated with at least one electron-withdrawing anion. While not intending to be bound by the following statement, it is believed that treatment of the solid oxide with an electron-withdrawing component augments or enhances the acidity of the oxide. Thus, either the activator-support exhibits Lewis or Brönsted acidity that is typically greater than the Lewis or Brönsted acid strength of the untreated solid oxide, or the activator-support has a greater number of acid sites than the untreated solid oxide, or both. One method to quantify the acidity of the chemically-treated and the untreated solid oxide materials is by comparing the polymerization activities of the treated and the untreated oxides under acid catalyzed reactions.

Chemically-treated solid oxides of this invention are formed generally from an inorganic solid oxide that exhibits Lewis acidic or Brönsted acidic behavior and has a relatively high porosity. The solid oxide is chemically-treated with an electron-withdrawing component, typically an electron-withdrawing anion, to form an activator-support.

The pore volume and surface area of silica-coated alumina were discussed in the preceding section. Solid oxides used to prepare an additional chemically-treated solid oxide generally have a pore volume greater than about 0.1 mL/g. According to another aspect of the present invention, the solid oxide has a pore volume greater than about 0.5 mL/g. According to yet another aspect of the present invention, the solid oxide has a pore volume greater than about 1 mL/g.

In another aspect, the solid oxide used to prepare the additional chemically-treated solid oxide has a surface area ranging from about 100 to about 1000 m²/g, for example, in a range from about 200 to about 800 m²/g. In still another aspect of the present invention, the solid oxide has a surface area in a range from about 250 to about 600 m²/g.

In still another aspect, the optional chemically-treated solid oxide can comprise a solid inorganic oxide comprising oxygen and at least one element selected from Group 2, 3, 4, 5, 6, 7, 8, 9, 10, 11, 12, 13, 14, or 15 of the periodic table, or comprising oxygen and at least one element selected from the lanthanide or actinide elements. (See: Hawley's Condensed Chemical Dictionary, 11$^{th}$ Ed., John Wiley & Sons; 1995; Cotton, F. A., Wilkinson, G., Murillo, C. A., and Bochmann, M., Advanced Inorganic Chemistry, 6$^{th}$ Ed., Wiley-Interscience, 1999.) For example, the inorganic oxide can comprise oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn and Zr.

Suitable examples of solid oxide materials or compounds that can be used to form the additional chemically-treated solid oxide include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. For example, the solid oxide that can be used to prepare the additional chemically-treated solid oxide can comprise silica, alumina, silica-alumina, aluminum phosphate, heteropolytungstate, titania, zirconia, magnesia, boria, zinc oxide, mixed oxides thereof, or any combination thereof. As noted above, if the solid oxide is a silica-alumina, this material is different from the silica-coated aluminas of the present invention, which have both high alumina content and silica coated on an alumina matrix. These known silica-alumina mixed oxides having an alumina to silica weight ratio of less than 1:1 can be used to form an additional, or optional, activator-support. For example, the weight ratio of alumina to silica in these silica-alumina mixed oxides is often in a range from about 0.05:1 to about 0.25:1, as reflected in Example 1. However, these silica-alumina materials can optionally be used in combination with (i.e., in addition to) the high alumina content silica-coated alumina activator-supports of the present invention.

Solid oxides of this invention, which can be used to prepare additional chemically-treated solid oxides, encompass oxide materials such as alumina, "mixed oxide" compounds thereof such as silica-alumina, and combinations and mixtures thereof. Examples of mixed oxides that can be used in the additional activator-support of the present invention include, but are not limited to, silica-alumina, silica-titania, silica-zirconia, zeolites, various clay minerals, alumina-titania, alumina-zirconia, zinc-aluminate, and the like.

Suitable electron-withdrawing components/anions were discussed previously. These can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, and the like, including mixtures and combinations thereof. Thus, for example, the optional activator-support (e.g., chemically-treated solid oxide) additionally used in the catalyst compositions of the present invention can be, or can comprise, fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, and the like, or combinations thereof.

Also, as discussed above, optional chemically-treated solid oxides can further comprise a metal or metal ion, such as zinc, nickel, vanadium, titanium, silver, copper, gallium, tin, tungsten, molybdenum, zirconium, and the like, or combinations thereof. Examples of additional chemically-treated solid oxides that contain a metal or metal ion an include, but are not limited to, zinc-impregnated chlorided alumina, titanium-impregnated fluorided alumina, zinc-impregnated fluorided alumina, zinc-impregnated chlorided silica-alumina, zinc-impregnated fluorided silica-alumina, zinc-impregnated sulfated alumina, chlorided zinc aluminate, fluorided zinc aluminate, sulfated zinc aluminate, and the like, or any combination thereof.

Methods for the preparation of, and calcination conditions for, the additional, or optional, activator-supports can be the same as those provided above in the discussion of silica-coated alumina activator-supports. The pore volume and surface area of silica-coated aluminas were discussed in the preceding section, and the ranges provided therein can be suitable for the optional, additional activator-supports.

According to another aspect of the present invention, the catalyst composition can further comprise an ion-exchangeable activator-support, including but not limited to silicate and aluminosilicate compounds or minerals, either with layered or non-layered structures, and combinations thereof. In another aspect of this invention, ion-exchangeable, layered aluminosilicates such as pillared clays are used as optional activator-supports. The ion-exchangeable activator-support optionally can be treated with at least one electron-withdrawing anion such as those disclosed herein, though typically the ion-exchangeable activator-support is not treated with an electron-withdrawing anion.

According to another aspect of the present invention, the catalyst composition further comprises clay minerals having exchangeable cations and layers capable of expanding. Typical clay mineral activator-supports include, but are not limited to, ion-exchangeable, layered aluminosilicates such as pillared clays. Although the term "support" is used, it is not meant to be construed as an inert component of the catalyst composition, but rather is to be considered an active part of the catalyst composition, because of its intimate association with the transition metal or metallocene component.

According to another aspect of the present invention, the clay materials of this invention encompass materials either in their natural state or that have been treated with various ions by wetting, ion exchange, or pillaring. Typically, the clay material activator-support of this invention comprises clays that have been ion exchanged with large cations, including polynuclear, highly charged metal complex cations. However, the clay material activator-supports of this invention also encompass clays that have been ion exchanged with simple salts, including, but not limited to, salts of Al(III), Fe(II), Fe(III), and Zn(II) with ligands such as halide, acetate, sulfate, nitrate, or nitrite.

According to another aspect of the present invention, the additional activator-support comprises a pillared clay. The term "pillared clay" is used to refer to clay materials that have been ion exchanged with large, typically polynuclear, highly charged metal complex cations. Examples of such ions include, but are not limited to, Keggin ions which can have charges such as 7+, various polyoxometallates, and other large ions. Thus, the term pillaring refers to a simple exchange reaction in which the exchangeable cations of a clay material are replaced with large, highly charged ions, such as Keggin ions. These polymeric cations are then immobilized within the interlayers of the clay and when calcined are converted to metal oxide "pillars," effectively supporting the clay layers as column-like structures. Thus, once the clay is dried and calcined to produce the supporting pillars between clay layers, the expanded lattice structure is maintained and the porosity is enhanced. The resulting pores can vary in shape and size as a function of the pillaring material and the parent clay material used. Examples of pillaring and pillared clays are found in: T. J. Pinnavaia, Science 220 (4595), 365-371 (1983); J. M. Thomas, Intercalation Chemistry, (S. Whittington and A. Jacobson, eds.) Ch. 3, pp. 55-99, Academic Press, Inc., (1972); U.S. Pat. Nos. 4,452,910; 5,376,611; and 4,060,480; the disclosures of which are incorporated herein by reference in their entirety.

The pillaring process utilizes clay minerals having exchangeable cations and layers capable of expanding. Any pillared clay that can enhance the polymerization of olefins in the catalyst composition of the present invention can be used. Therefore, suitable clay minerals for pillaring include, but are not limited to, allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; the fibrous clays including but not limited to sepiolites, attapulgites, and palygorskites; a serpentine clay; illite; laponite; saponite; and any combination thereof. In one aspect, the pillared clay activator-support comprises bentonite or montmorillonite. The principal component of bentonite is montmorillonite.

The pillared clay can be pretreated if desired. For example, a pillared bentonite is pretreated by drying at about 300° C. under an inert atmosphere, typically dry nitrogen, for about 3 hours, before being added to the polymerization reactor. Although an exemplary pretreatment is described herein, it should be understood that the preheating can be carried out at many other temperatures and times, including any combination of temperature and time steps, all of which are encompassed by this invention.

The activator-supports used to prepare the catalyst compositions of the present invention can be combined with other inorganic support materials, including, but not limited to, zeolites, inorganic oxides, phosphated inorganic oxides, and the like. In one aspect, typical support materials that are used include, but are not limited to, silica, silica-alumina, alumina, titania, zirconia, magnesia, boria, thoria, aluminophosphate, aluminum phosphate, silica-titania, coprecipitated silica/titania, mixtures thereof, or any combination thereof.

Transition Metal or Metallocene Compounds

The activator-supports of the present invention can be employed in a catalyst composition with one or more transition metal compounds, with one or more metallocene compounds, or combinations thereof (e.g., at least transition metal or metallocene compound). Generally, there is no limitation on the selection of the transition metal compound and/or metallocene compound, or compounds, that can be used in combination with the silica-coated alumina activator-supports disclosed herein. For instance, transition metal compounds disclosed in U.S. Pat. Nos. 7,247,594 and 7,534,842, which are incorporated herein by reference in their entirety, can be used with the silica-coated alumina activator-supports of this invention. Non-limiting examples of such transition metal compounds can include, but are not limited to, [bis(2,6-ditertbutylphenolato)]titanium dichloride, [tetrakis(2,6-diisopropylphenolato)]zirconium, dichloro[bis(2,6-dimethyphenolato)]zirconium bis(tetrahydrofuran), [(2,6-ditertbutyl-4-methyl)phenolato]zirconium tribenzyl, tetrakis(dimethylamido)zirconium, bis(tert-butylamido)cyclodiphosphazane zirconium dibenzyl, bis(tert-butylamido)cyclodiphosphazane zirconium dichloride, 2,2'-methylenebis(6-tert-butyl-4-methylphenoxy)titanium dichloride, 2,2'-thiobis(6-tert-butyl-4-methylphenoxy)titanium dichloride, N-alkoxy-β-ketoiminate tetrahydrofuran titanium dichloride, 2,2'-[1,2-ethanebis[methylamido-N] methylene]bis[4,6 tert-butylphenoxy]zirconium dibenzyl, N,N'-[(amino-N)di-2,1-ethane]bis[2-N-2,4,6-trimethylphenyl amido]zirconium dibenzyl, and the like, or combinations thereof.

Often, in a metallocene compound, the transition metal is Ti, Zr, Hf, Cr, La, Y, Sc, or V (or can be more than one, for example, if a dinuclear metallocene compound is employed). Some examples of suitable ansa-metallocene compounds include, but are not limited to:

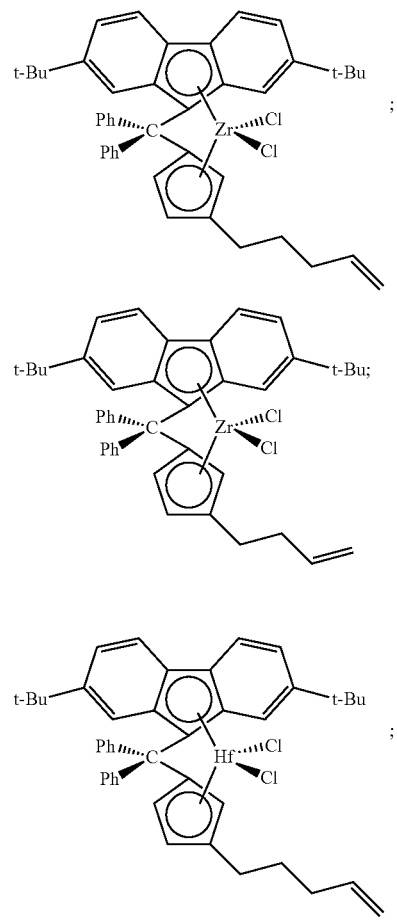

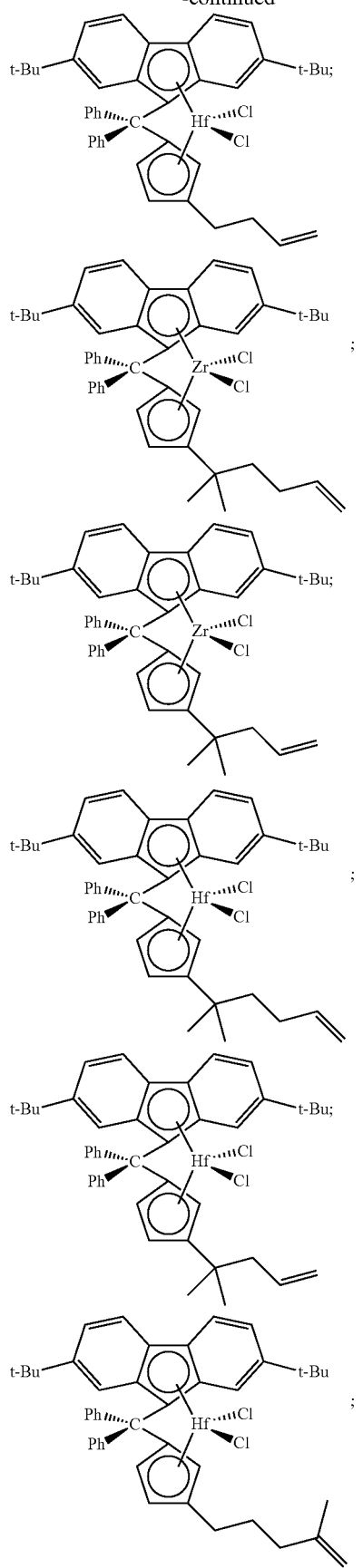
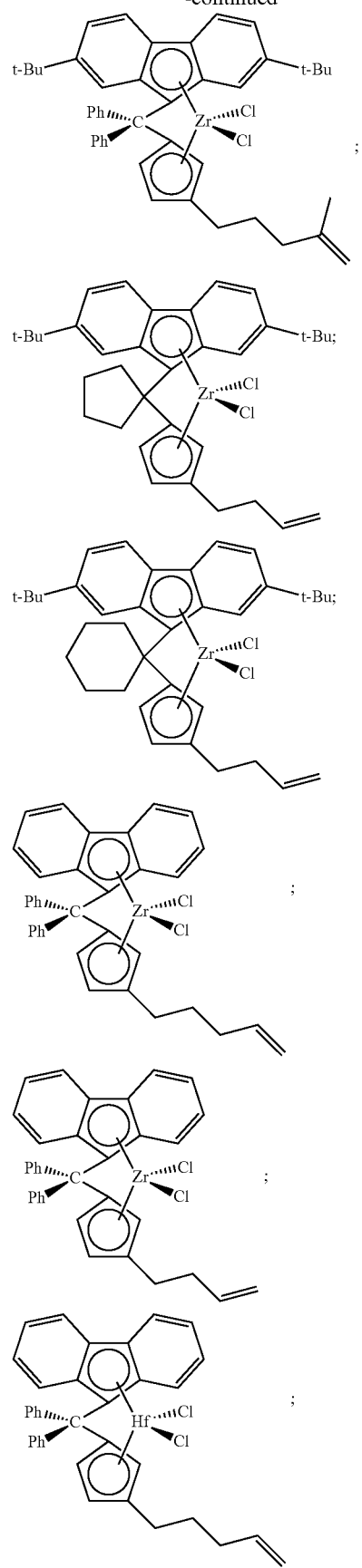

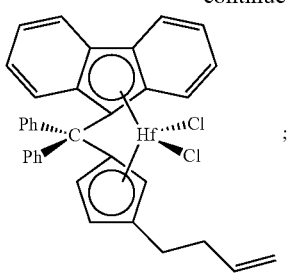
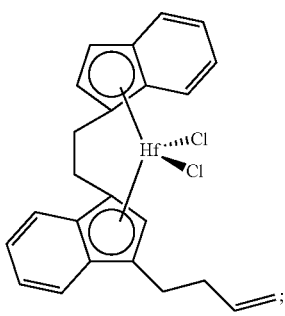
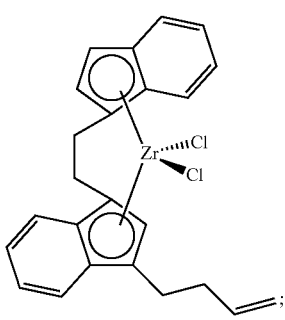
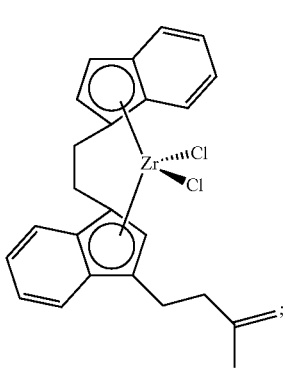
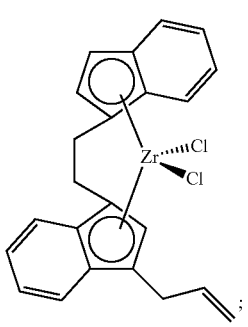
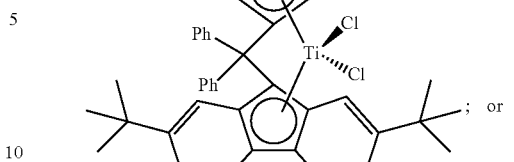
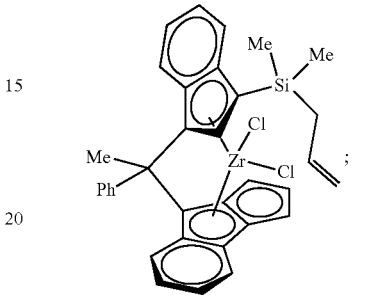
and the like. Applicants have used the abbreviations Ph for phenyl, Me for methyl, and t-Bu for tert-butyl.
The following representative bridged metallocene compounds also can be employed in catalyst compositions of the present invention:
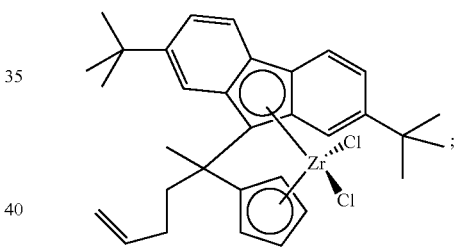
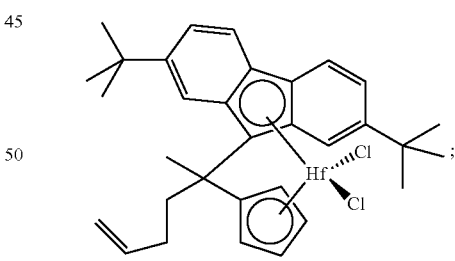
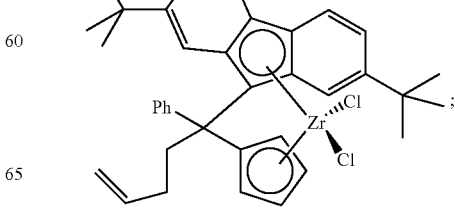

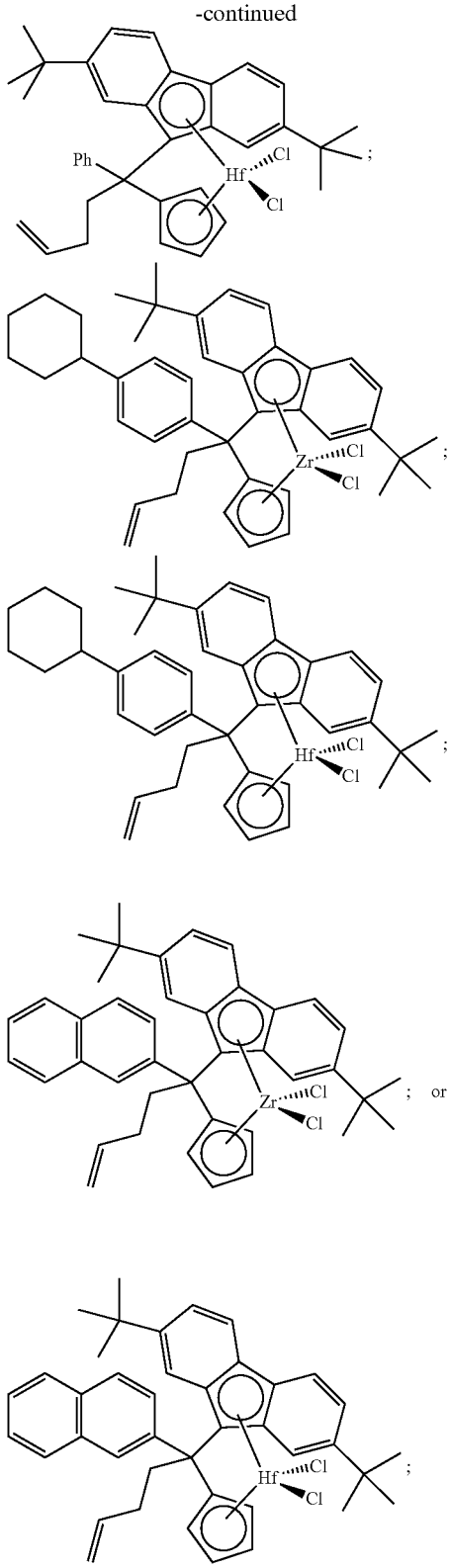
and the like.
Additional examples of bridged metallocene compounds that are suitable for use in catalyst compositions of the present invention are contemplated. These include, but are not limited to:
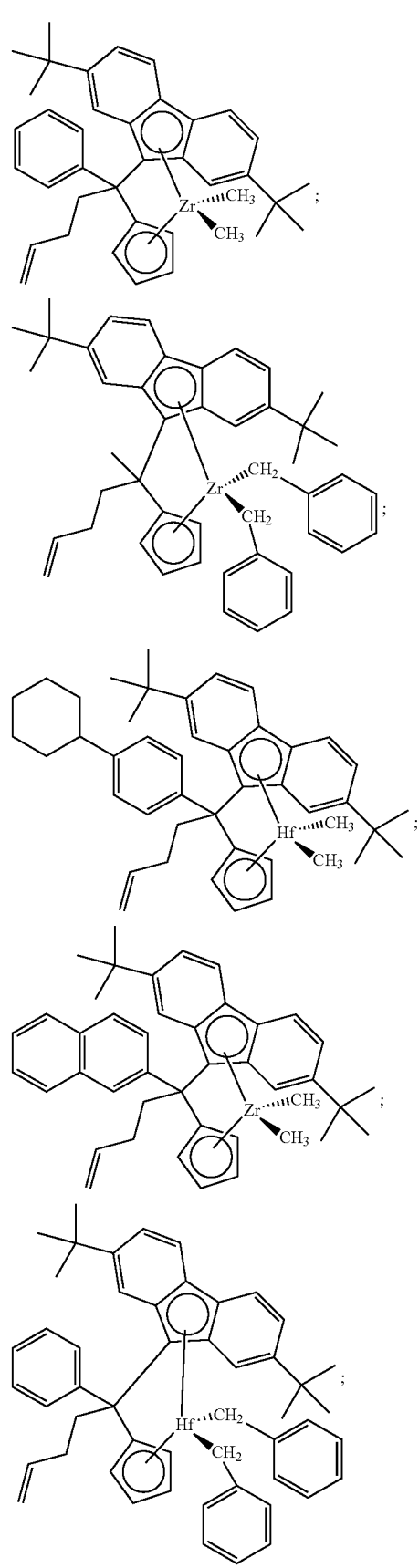

33
-continued
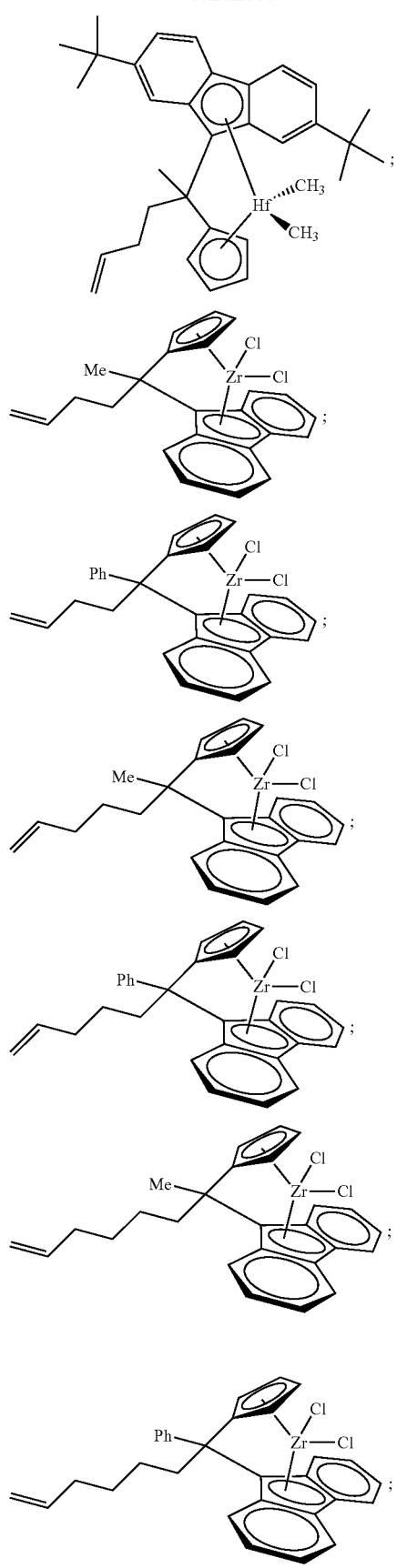
34
-continued
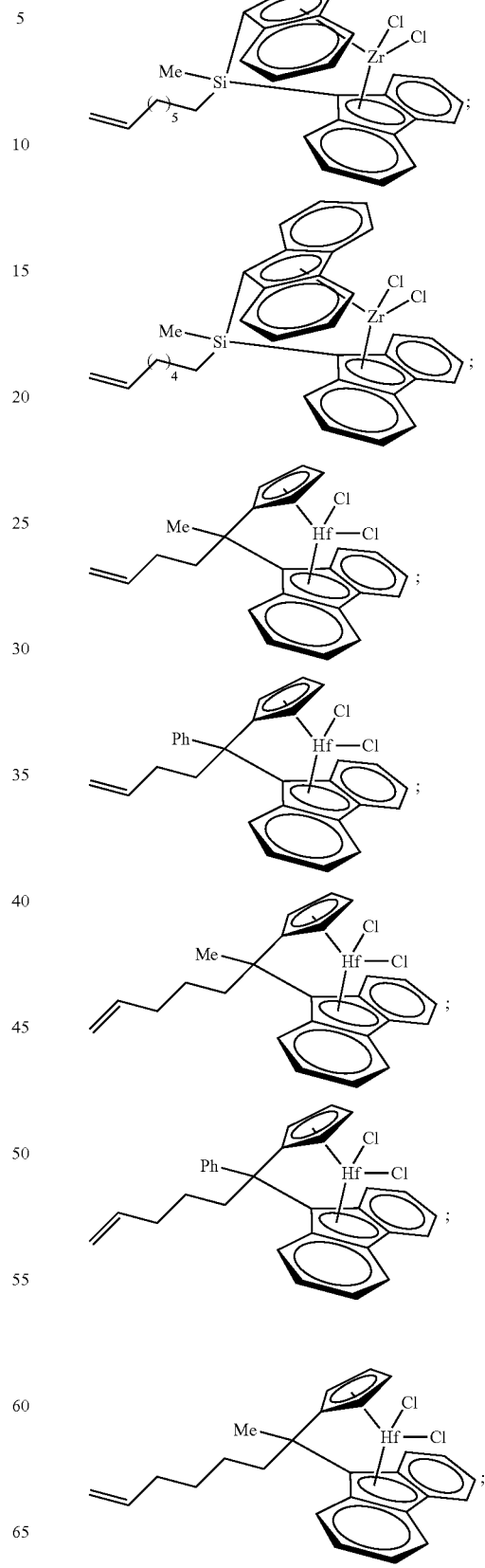

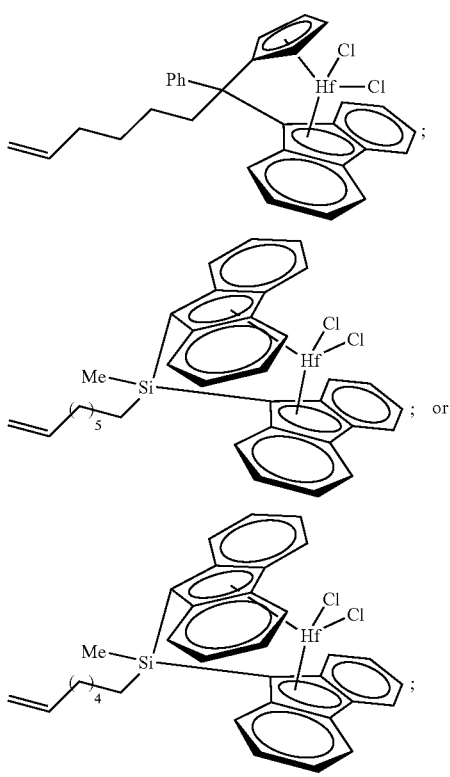
and the like.
The following non-limiting examples of two-carbon bridged metallocene compounds also can be used in catalyst compositions of the present invention:
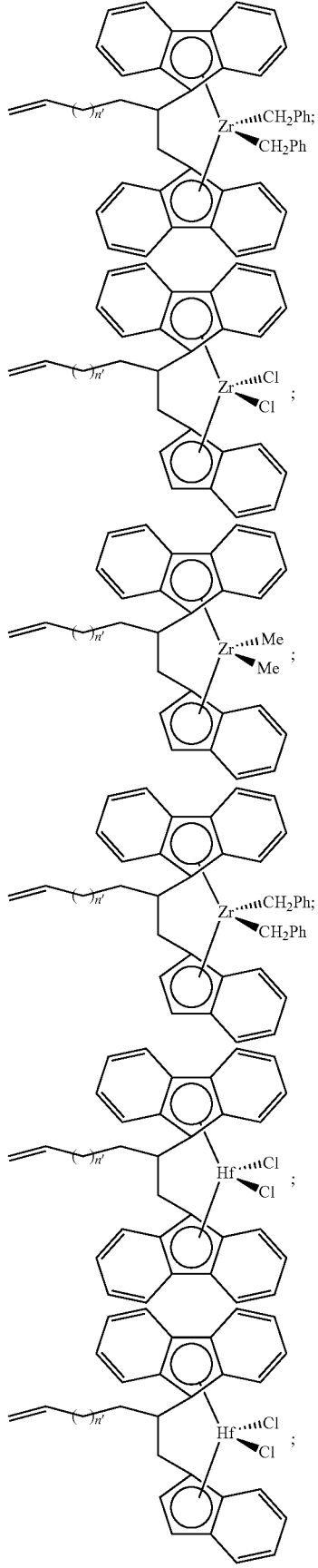

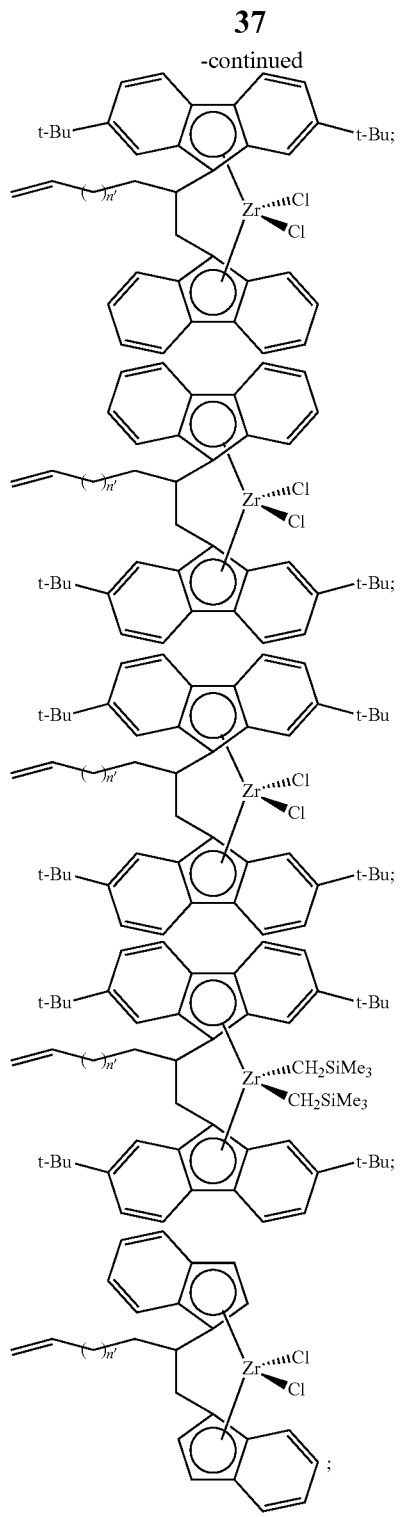

and the like. The integer n' in these metallocene compounds generally ranges from 0 to about 10, inclusive. For example, n' can be 1, 2, 3, 4, 5, 6, 7, or 8.

Other bridged metallocene compounds can be employed in catalyst compositions of the present invention. Therefore, the scope of the present invention is not limited to the bridged metallocene species provided above.

Likewise, unbridged metallocene compounds can be used in catalyst compositions of the present invention. Such compounds can include, but are not limited to:

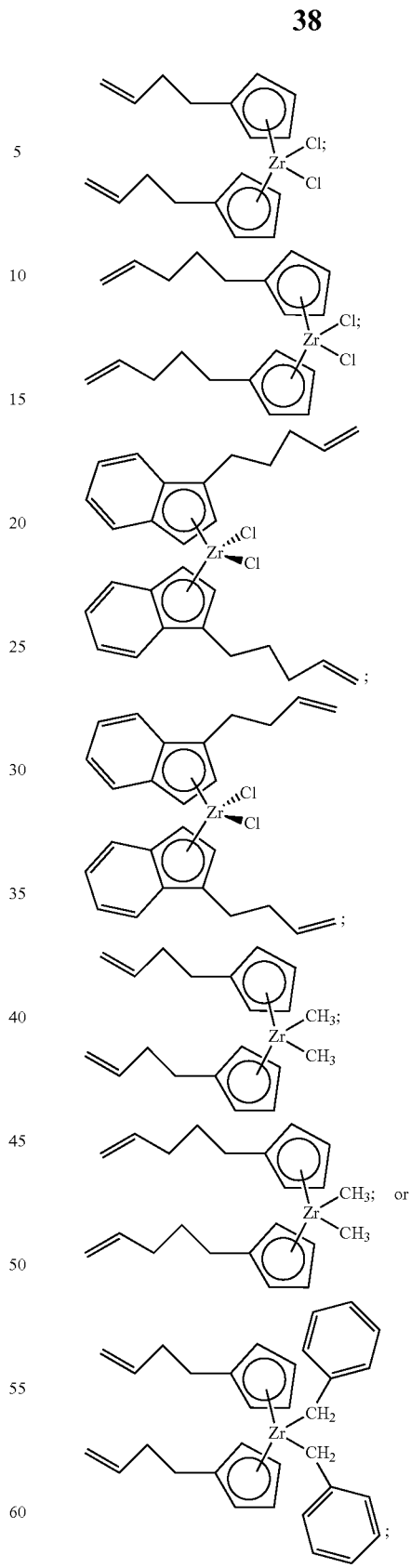

and the like.

Other suitable unbridged metallocene compounds include, but are not limited, to the following compounds:

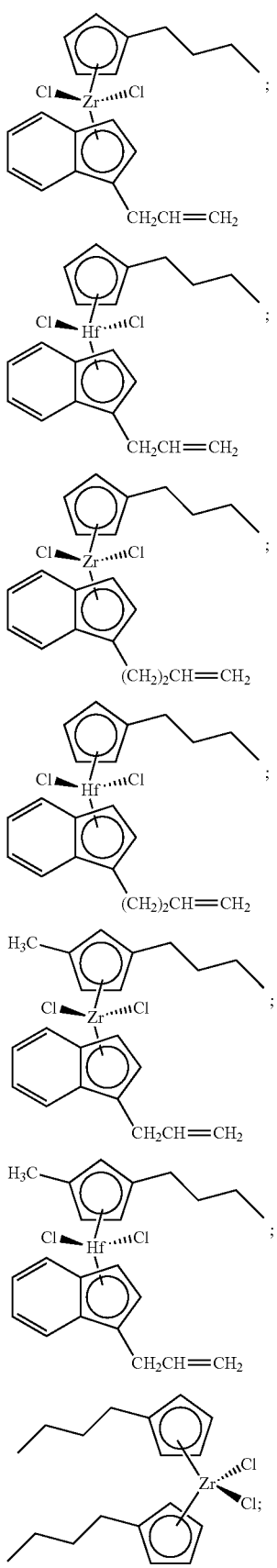

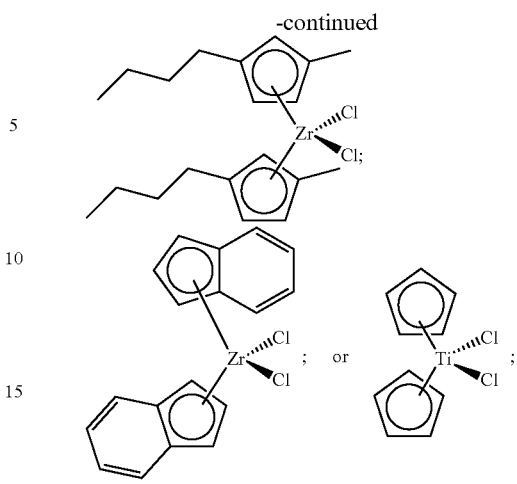

and the like.

Additional unbridged metallocene compounds can be employed in catalyst compositions of the present invention. Therefore, the scope of the present invention is not limited to the unbridged metallocene species provided above. Other metallocene compounds, including half-sandwich and cyclodienyl compounds, can be used in catalyst compositions of the present invention, and such compounds can include, but are not limited to, the following:

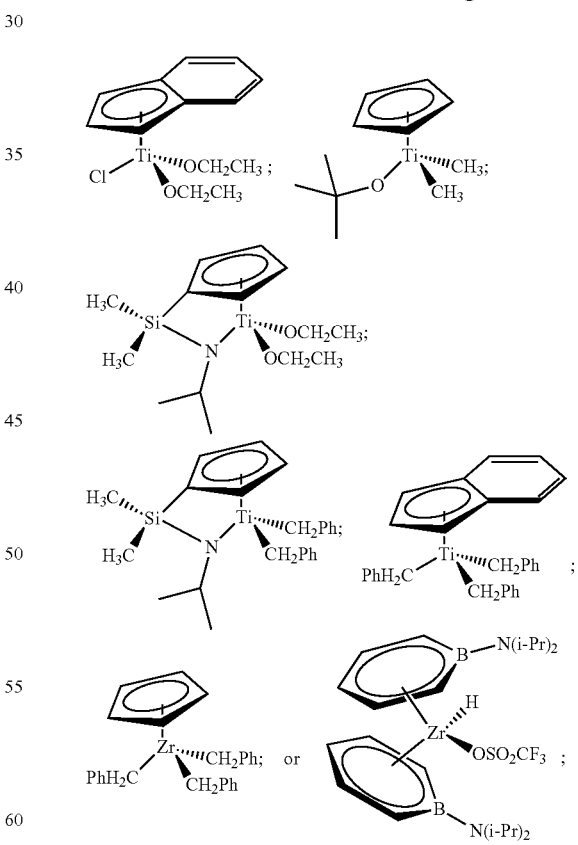

and the like, wherein i-Pr is an abbreviation for isopropyl.

In accordance with one aspect of the invention, the at least one transition metal or metallocene compound can comprise an ansa-metallocene compound. In another aspect, the at least one transition metal or metallocene compound can comprise an unbridged metallocene compound. In still another aspect, the at least one transition metal or metallocene compound can comprise a dinuclear metallocene compound. In yet another aspect of the invention, the at least one transition metal or metallocene compound can comprise a metallocene compound (or dinuclear compound) containing an alkenyl moiety. For example, an unbridged or bridged metallocene can contain an alkenyl substituent on a Cp, Ind, and/or Flu group. Alternatively, or in addition, a bridged metallocene can contain an alkenyl substituent on the bridging group (or the bridging atom).

Representative bridged and/or unbridged metallocene compounds which may be employed in some aspects of this invention are disclosed in U.S. Pat. Nos. 5,498,581, 7,026,494, 7,041,617, 7,119,153, 7,148,298, 7,226,886, 7,294,599, 7,312,283, 7,468,452, 7,517,939, and 7,521,572, the disclosures of which are incorporated herein by reference in their entirety.

In one aspect of this invention, the at least one transition metal or metallocene compound can comprise an unbridged metallocene having the following formula:

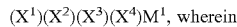

$(X^1)(X^2)(X^3)(X^4)M^1$, wherein $M^1$ is Ti, Zr, or Hf;

$(X^1)$ and $(X^2)$ independently are a substituted or unsubstituted Cp, Ind, or Flu group; and $(X^3)$ and $(X^4)$ independently are a halide (e.g., fluoride, chloride, bromide, iodide), a hydride, an amido, an alkoxide, or a hydrocarbyl group, any of which having up to 20 carbon atoms.

In another aspect of this invention, the at least one transition metal or metallocene compound can comprise a bridged metallocene having the following formula:

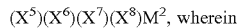

$(X^5)(X^6)(X^7)(X^8)M^2$, wherein $M^2$ is Ti, Zr, or Hf;

$(X^5)$ and $(X^6)$ independently are a substituted Cp, Ind, or Flu group;

$(X^5)$ and $(X^6)$ are connected by a substituted or unsubstituted bridging group comprising a bridging chain of 2 to 5 carbon atoms, or a carbon, silicon, germanium, tin, boron, nitrogen, or phosphorus bridging atom; and $(X^7)$ and $(X^8)$ independently are a halide, a hydride, an amido, an alkoxide, or a hydrocarbyl group, any of which having up to 20 carbon atoms.

The unbridged and bridged metallocenes represented by the formulas above can comprise a variety of substituents. In each occurrence, any substituent on a substituted Cp, substituted Ind, substituted Flu, and substituted bridging group independently can be a hydrocarbyl group, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, having from 1 to 20 carbon atoms; a halide; or hydrogen.

A hydrocarbyl group is used herein to specify a hydrocarbon radical group which includes, but is not limited to, aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, and/or heteroatom substituted derivatives thereof. Suitable hydrocarbyl groups can include, but are not limited to, methyl, ethyl, propyl, n-butyl, tert-butyl, sec-butyl, isobutyl, pentyl, hexyl, heptyl, octyl, nonyl, decyl, dodecyl, 2-ethylhexyl, ethenyl, propenyl, butenyl, pentenyl, hexenyl, phenyl, benzyl, tolyl, xylyl, naphthyl, cyclopentyl, cyclohexyl, and the like.

Examples of halides include fluoride, chloride, bromide, and iodide.

Oxygen groups are oxygen-containing groups, examples of which include, but are not limited to, alkoxy or aryloxy groups ($-OR^A$), $-OC(O)R^A$, $-OC(O)H$, $-OSiR^A{}_3$, $-OPR^A{}_2$, $-OAlR^A{}_2$, and the like, including substituted derivatives thereof, wherein $R^A$ in each instance is selected from alkyl, cycloalkyl, aryl, aralkyl, substituted alkyl, substituted aryl, or substituted aralkyl having from 1 to 20 carbon atoms. Examples of alkoxy or aryloxy groups ($-OR^A$) groups include, but are not limited to, methoxy, ethoxy, propoxy, butoxy, phenoxy, substituted phenoxy, and the like.

Sulfur groups are sulfur-containing groups, examples of which include, but are not limited to, $-SR^A$, $-OSO_2R^A$, $-OSO_2OR^A$, $-SCN$, $-SO_2R^A$, and the like, including substituted derivatives thereof, wherein $R^A$ in each instance is selected from alkyl, cycloalkyl, aryl, aralkyl, substituted alkyl, substituted aryl, or substituted aralkyl having from 1 to 20 carbon atoms.

Nitrogen groups are nitrogen-containing groups, which include, but are not limited to, $-NH_2$, $-NHR^A$, $-NR^A{}_2$, $-NO_2$, $-CN$, and the like, including substituted derivatives thereof, wherein $R^A$ in each instance is selected from alkyl, cycloalkyl, aryl, aralkyl, substituted alkyl, substituted aryl, or substituted aralkyl having from 1 to 20 carbon atoms.

Phosphorus groups are phosphorus-containing groups, which include, but are not limited to, $-PH_2$, $-PHR^A$, $-PR^A{}_2$, $-P(O)R^A{}_2$, $-P(OR^A)_2$, $-P(O)(OR^A)_2$, and the like, including substituted derivatives thereof, wherein $R^A$ in each instance is selected from alkyl, cycloalkyl, aryl, aralkyl, substituted alkyl, substituted aryl, or substituted aralkyl having from 1 to 20 carbon atoms.

Arsenic groups are arsenic-containing groups, which include, but are not limited to, $-AsHR^A$, $-AsR^A{}_2$, $-As(O)R^A{}_2$, $-As(OR^A)_2$, $-As(O)(OR^A)_2$, and the like, including substituted derivatives thereof, wherein $R^A$ in each instance is selected from alkyl, cycloalkyl, aryl, aralkyl, substituted alkyl, substituted aryl, or substituted aralkyl having from 1 to 20 carbon atoms.

Carbon groups are carbon-containing groups, which include, but are not limited to, alkyl halide groups that comprise halide-substituted alkyl groups with 1 to about 20 carbon atoms, aralkyl groups with 1 to about 20 carbon atoms, $-C(O)H$, $-C(O)R^A$, $-C(O)OR^A$, cyano, $-C(NR^A)H$, $-C(NR^A)R^A$, $-C(NR^A)OR^A$, and the like, including substituted derivatives thereof, wherein $R^A$ in each instance is selected from alkyl, cycloalkyl, aryl, aralkyl, substituted alkyl, substituted aryl, or substituted aralkyl having from 1 to 20 carbon atoms.

Silicon groups are silicon-containing groups, which include, but are not limited to, silyl groups such alkylsilyl groups, arylsilyl groups, arylalkylsilyl groups, siloxy groups, and the like, which in each instance have from 1 to 20 carbon atoms. For example, silicon groups include trimethylsilyl and phenyloctylsilyl groups.

Germanium groups are germanium-containing groups, which include, but are not limited to, germyl groups such alkylgermyl groups, arylgermyl groups, arylalkylgermyl groups, germyloxy groups, and the like, which in each instance have from 1 to 20 carbon atoms.

Tin groups are tin-containing groups, which include, but are not limited to, stannyl groups such alkylstannyl groups, arylstannyl groups, arylalkylstannyl groups, stannoxy (or "stannyloxy") groups, and the like, which in each instance have from 1 to 20 carbon atoms. Thus, tin groups include, but are not limited to, stannoxy groups. Lead groups are lead-containing groups, which include, but are not limited to, alkyllead groups, aryllead groups, arylalkyllead groups, and the like, which in each instance, have from 1 to 20 carbon atoms.

Boron groups are boron-containing groups, which include, but are not limited to, $-BR^A{}_2$, $-BX^A{}_2$, $-BR^AX^A$, wherein $X^A$ is a monoanionic group such as halide, hydride, alkoxide, alkyl thiolate, and the like, and wherein $R^A$ in each instance is selected from alkyl, cycloalkyl, aryl, aralkyl, substituted alkyl, substituted aryl, or substituted aralkyl having from 1 to 20 carbon atoms.

Aluminum groups are aluminum-containing groups, which include, but are not limited to, $-AlR^A{}_2$, $-AlX^A{}_2$, $-AlR^AX^A$, wherein $X^A$ is a monoanionic group such as halide, hydride, alkoxide, alkyl thiolate, and the like, and wherein $R^A$ in each instance is selected from alkyl, cycloalkyl, aryl, aralkyl, substituted alkyl, substituted aryl, or substituted aralkyl having from 1 to 20 carbon atoms.

Inorganic groups that may be used as substituents include, but are not limited to, $-SO_2X^A$, $-OAlX^A{}_2$, $-OSiX^A{}_3$, $-OPX^A{}_2$, $-SX^A$, $-OSO_2X^A$, $-AsX^A{}_2$, $-As(O)X^A{}_2$, $-PX^A{}_2$, and the like, wherein $X^A$ is a monoanionic group such as halide, hydride, amide, alkoxide, alkyl thiolate, and the like, and wherein any alkyl, cycloalkyl, aryl, aralkyl, substituted alkyl, substituted aryl, or substituted aralkyl group or substituent on these ligands has from 1 to 20 carbon atoms.

Organometallic groups that may be used as substituents include, but are not limited to, organoboron groups, organoaluminum groups, organogallium groups, organosilicon groups, organogermanium groups, organotin groups, organolead groups, organo-transition metal groups, and the like, having from 1 to 20 carbon atoms.

It is also contemplated that the at least one transition metal or metallocene compound can comprise one or more dinuclear metallocene compounds. Suitable dinuclear metallocenes include, but are not limited to, those compounds disclosed in U.S. patent application Ser. No. 12/489,630 and U.S. Patent Publication Nos. 2009/0170690, 2009/0170691, and 2009/0171041, the disclosures of which are incorporated herein by reference in their entirety.

Organoaluminum Compounds

In some aspects, catalyst compositions of the present invention can comprise one or more organoaluminum compounds. Such compounds can include, but are not limited to, compounds having the formula:

$(R^B)_3Al$;

where $R^B$ is an aliphatic group having from 1 to 10 carbon atoms. For example, $R^B$ can be methyl, ethyl, propyl, butyl, hexyl, or isobutyl.

Other organoaluminum compounds which can be used in catalyst compositions disclosed herein can include, but are not limited to, compounds having the formula:

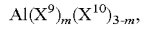
$Al(X^9)_m(X^{10})_{3-m}$, where $X^9$ is a hydrocarbyl; $X^{10}$ is an alkoxide or an aryloxide, a halide, or a hydride; and m is from 1 to 3, inclusive. Hydrocarbyl is used herein to specify a hydrocarbon radical group and includes, but is not limited to, aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, and/or heteroatom substituted derivatives thereof.

In one aspect, $X^9$ is a hydrocarbyl having from 1 to about 20 carbon atoms. In another aspect of the present invention, $X^9$ is an alkyl having from 1 to 10 carbon atoms. For example, $X^9$ can be methyl, ethyl, propyl, n-butyl, sec-butyl, isobutyl, or hexyl, and the like, in yet another aspect of the present invention.

According to one aspect of the present invention, $X^{10}$ is an alkoxide or an aryloxide, any one of which has from 1 to 20 carbon atoms, a halide, or a hydride. In another aspect of the present invention, $X^{10}$ is selected independently from fluorine and chlorine. Yet, in another aspect, $X^{10}$ is chlorine.

In the formula, $Al(X^9)_m(X^{10})_{3-m}$, m is a number from 1 to 3, inclusive, and typically, m is 3. The value of m is not restricted to be an integer; therefore, this formula includes sesquihalide compounds or other organoaluminum cluster compounds.

Examples of organoaluminum compounds suitable for use in accordance with the present invention include, but are not limited to, trialkylaluminum compounds, dialkylaluminum halide compounds, dialkylaluminum alkoxide compounds, dialkylaluminum hydride compounds, and combinations thereof. Specific non-limiting examples of suitable organoaluminum compounds include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, or combinations thereof.

The present invention contemplates a method of precontacting a transition metal and/or metallocene compound with an organoaluminum compound and an olefin monomer to form a precontacted mixture, prior to contacting this precontacted mixture with an activator-support to form a catalyst composition. When the catalyst composition is prepared in this manner, typically, though not necessarily, a portion of the organoaluminum compound is added to the precontacted mixture and another portion of the organoaluminum compound is added to the postcontacted mixture prepared when the precontacted mixture is contacted with the solid oxide activator-support. However, the entire organoaluminum compound can be used to prepare the catalyst composition in either the precontacting or postcontacting step. Alternatively, all the catalyst components are contacted in a single step.

Further, more than one organoaluminum compound can be used in either the precontacting or the postcontacting step. When an organoaluminum compound is added in multiple steps, the amounts of organoaluminum compound disclosed herein include the total amount of organoaluminum compound used in both the precontacted and postcontacted mixtures, and any additional organoaluminum compound added to the polymerization reactor. Therefore, total amounts of organoaluminum compounds are disclosed regardless of whether a single organoaluminum compound or more than one organoaluminum compound is used.

Aluminoxane Compounds

The present invention contemplates a catalyst composition which can comprise an aluminoxane compound. As used herein, the term "aluminoxane" refers to aluminoxane compounds, compositions, mixtures, or discrete species, regardless of how such aluminoxanes are prepared, formed or otherwise provided. For example, a catalyst composition comprising an aluminoxane compound can be prepared in which aluminoxane is provided as the poly(hydrocarbyl aluminum oxide), or in which aluminoxane is provided as the combination of an aluminum alkyl compound and a source of active protons such as water. Aluminoxanes are also referred to as poly(hydrocarbyl aluminum oxides) or organoaluminoxanes.

The other catalyst components typically are contacted with the aluminoxane in a saturated hydrocarbon compound solvent, though any solvent that is substantially inert to the reactants, intermediates, and products of the activation step can be used. The catalyst composition formed in this manner is collected by any suitable method, for example, by filtration. Alternatively, the catalyst composition is introduced into the polymerization reactor without being isolated.

The aluminoxane compound of this invention can be an oligomeric aluminum compound comprising linear structures, cyclic structures, or cage structures, or mixtures of all three. Cyclic aluminoxane compounds having the formula:

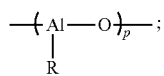

wherein R is a linear or branched alkyl having from 1 to 10 carbon atoms, and p is an integer from 3 to 20, are encompassed by this invention. The AlRO moiety shown here also constitutes the repeating unit in a linear aluminoxane. Thus, linear aluminoxanes having the formula:

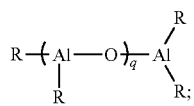

wherein R is a linear or branched alkyl having from 1 to 10 carbon atoms, and q is an integer from 1 to 50, are also encompassed by this invention.

Further, aluminoxanes can have cage structures of the formula $R^t{}_{5r+\alpha}R^b{}_{r-\alpha}Al_{4r}O_{3r}$, wherein $R^t$ is a terminal linear or branched alkyl group having from 1 to 10 carbon atoms; $R^b$ is a bridging linear or branched alkyl group having from 1 to 10 carbon atoms; r is 3 or 4; and α is equal to $n_{Al(3)}-n_{O(2)}+n_{O(4)}$, wherein $n_{Al(3)}$ is the number of three coordinate aluminum atoms, $n_{O(2)}$ is the number of two coordinate oxygen atoms, and $n_{O(4)}$ is the number of 4 coordinate oxygen atoms.

Thus, aluminoxanes which can be employed in the catalyst compositions of the present invention are represented generally by formulas such as $(R-Al-O)_p$, $R(R-Al-O)_q AlR_2$, and the like. In these formulas, the R group is typically a linear or branched $C_1$-$C_6$ alkyl, such as methyl, ethyl, propyl, butyl, pentyl, or hexyl. Examples of aluminoxane compounds that can be used in accordance with the present invention include, but are not limited to, methylaluminoxane, ethylaluminoxane, n-propylaluminoxane, iso-propylaluminoxane, n-butylaluminoxane, t-butyl-aluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, and the like, or any combination thereof. Methylaluminoxane, ethylaluminoxane, and iso-butylaluminoxane are prepared from trimethylaluminum, triethylaluminum, or triisobutylaluminum, respectively, and sometimes are referred to as poly (methyl aluminum oxide), poly(ethyl aluminum oxide), and poly(isobutyl aluminum oxide), respectively. It is also within the scope of the invention to use an aluminoxane in combination with a trialkylaluminum, such as that disclosed in U.S. Pat. No. 4,794,096, incorporated herein by reference in its entirety.

The present invention contemplates many values of p and q in the aluminoxane formulas $(R-Al-O)_p$ and $R(R-Al-O)_q AlR_2$, respectively. In some aspects, p and q are at least 3. However, depending upon how the organoaluminoxane is prepared, stored, and used, the value of p and q can vary within a single sample of aluminoxane, and such combinations of organoaluminoxanes are contemplated herein.

In preparing a catalyst composition containing an aluminoxane, the molar ratio of the total moles of aluminum in the aluminoxane (or aluminoxanes) to the total moles of transition metal and/or metallocene compound (or compounds) in the composition is generally between about 1:10 and about 100,000:1. In another aspect, the molar ratio is in a range from about 5:1 to about 15,000:1. Optionally, aluminoxane can be added to a polymerization zone in ranges from about 0.01 mg/L to about 1000 mg/L, from about 0.1 mg/L to about 100 mg/L, or from about 1 mg/L to about 50 mg/L.

Organoaluminoxanes can be prepared by various procedures. Examples of organoaluminoxane preparations are disclosed in U.S. Pat. Nos. 3,242,099 and 4,808,561, the disclosures of which are incorporated herein by reference in their entirety. For example, water in an inert organic solvent can be reacted with an aluminum alkyl compound, such as $(R^B)_3Al$, to form the desired organoaluminoxane compound. While not intending to be bound by this statement, it is believed that this synthetic method can afford a mixture of both linear and cyclic R—Al—O aluminoxane species, both of which are encompassed by this invention. Alternatively, organoaluminoxanes are prepared by reacting an aluminum alkyl compound, such as $(R^B)_3Al$, with a hydrated salt, such as hydrated copper sulfate, in an inert organic solvent.

Organoboron/Organoborate Compounds

According to another aspect of the present invention, a catalyst composition further comprising organoboron or organoborate compounds is provided. Such compounds include neutral boron compounds, borate salts, and the like, or combinations thereof. For example, fluoroorgano boron compounds and fluoroorgano borate compounds are contemplated.

Any fluoroorgano boron or fluoroorgano borate compound can be utilized with the present invention. Examples of fluoroorgano borate compounds that can be used in the present invention include, but are not limited to, fluorinated aryl borates such as N,N-dimethylanilinium tetrakis(pentafluorophenyl)borate, triphenylcarbenium tetrakis(pentafluorophenyl)borate, lithium tetrakis(pentafluorophenyl) borate, N,N-dimethylanilinium tetrakis[3,5-bis (trifluoromethyl)phenyl]borate, triphenylcarbenium tetrakis [3,5-bis(trifluoromethyl)phenyl]borate, and the like, or mixtures thereof. Examples of fluoroorgano boron compounds that can be used as co-catalysts in the present invention include, but are not limited to, tris(pentafluorophenyl)boron, tris[3,5-bis(trifluoromethyl)phenyl]boron, and the like, or mixtures thereof. Although not intending to be bound by the following theory, these examples of fluoroorgano borate and fluoroorgano boron compounds, and related compounds, are thought to form "weakly-coordinating" anions when combined with organometal or metallocene compounds, as disclosed in U.S. Pat. No. 5,919,983, the disclosure of which is incorporated herein by reference in its entirety. Applicants also contemplate the use of diboron, or bis-boron, compounds or other bifunctional compounds containing two or more boron atoms in the chemical structure, such as disclosed in J. Am. Chem. Soc., 2005, 127, pp. 14756-14768, the content of which is incorporated herein by reference in its entirety.

Generally, any amount of organoboron compound can be used. According to one aspect of this invention, the molar ratio of the total moles of organoboron or organoborate compound (or compounds) to the total moles of transition metal and/or metallocene compound (or compounds) in the catalyst composition is in a range from about 0.1:1 to about 15:1. Typically, the amount of the fluoroorgano boron or fluoroorgano borate compound used is from about 0.5 moles to about 10 moles of boron/borate compound per mole of transition metal and/or metallocene compound(s). According to another aspect of this invention, the amount of fluoroorgano boron or fluoroorgano borate compound is from about 0.8 moles to about 5 moles of boron/borate compound per mole of transition metal and/or metallocene compound(s).

Ionizing Ionic Compounds

The present invention provides a catalyst composition which can further comprise an ionizing ionic compound. An ionizing ionic compound is an ionic compound that can function as a co-catalyst to enhance the activity of the catalyst composition. While not intending to be bound by theory, it is believed that the ionizing ionic compound is capable of reacting with a metallocene compound and converting the metallocene into one or more cationic metallocene compounds, or incipient cationic metallocene compounds. Again, while not intending to be bound by theory, it is believed that the ionizing ionic compound can function as an ionizing compound by completely or partially extracting an anionic ligand, possibly a non-alkadienyl ligand, from the metallocene. However, the ionizing ionic compound is an activator or co-catalyst regardless of whether it is ionizes the metallocene, abstracts a ligand in a fashion as to form an ion pair, weakens the metal-ligand bond in the metallocene, simply coordinates to a ligand, or activates the metallocene by some other mechanism.

Further, it is not necessary that the ionizing ionic compound activate the transition metal and/or metallocene compound only. The activation function of the ionizing ionic compound can be evident in the enhanced activity of a catalyst composition as a whole, as compared to a catalyst composition that does not contain an ionizing ionic compound.

Examples of ionizing ionic compounds include, but are not limited to, the following compounds: tri(n-butyl)ammonium tetrakis(p-tolyl)borate, tri(n-butyl) ammonium tetrakis(m-tolyl)borate, tri(n-butyl)ammonium tetrakis(2,4-dimethylphenyl)borate, tri(n-butyl)ammonium tetrakis(3,5-dimethylphenyl)borate, tri(n-butyl)ammonium tetrakis[3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethylphenyl)borate, N,N-dimethylanilinium tetrakis[3,5-bis(trifluoro-methyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl) borate, triphenylcarbenium tetrakis[3,5-bis(trifluoromethyl) phenyl]borate, triphenylcarbenium tetrakis (pentafluorophenyl)borate, tropylium tetrakis(p-tolyl) borate, tropylium tetrakis(m-tolyl)borate, tropylium tetrakis (2,4-dimethylphenyl)borate, tropylium tetrakis(3,5-dimethylphenyl)borate, tropylium tetrakis[3,5-bis(trifluoromethyl)phenyl]borate, tropylium tetrakis (pentafluorophenyl)borate, lithium tetrakis (pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis (m-tolyl)borate, sodium tetrakis(2,4-dimethylphenyl)borate, sodium tetrakis(3,5-dimethylphenyl)borate, sodium tetrafluoroborate, potassium tetrakis-(pentafluorophenyl)borate, potassium tetraphenylborate, potassium tetrakis(p-tolyl)borate, potassium tetrakis(m-tolyl)borate, potassium tetrakis(2,4-dimethyl-phenyl)borate, potassium tetrakis(3,5-dimethylphenyl)borate, potassium tetrafluoroborate, lithium tetrakis(pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl) aluminate, lithium tetrakis(3,5-dimethylphenyl)aluminate, lithium tetrafluoroaluminate, sodium tetrakis(pentafluorophenyl)aluminate, sodium tetraphenylaluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl) aluminate, potassium tetrakis(m-tolyl)aluminate, potassium tetrakis(2,4-dimethylphenyl)aluminate, potassium tetrakis (3,5-dimethylphenyl)aluminate, potassium tetrafluoroaluminate, and the like, or combinations thereof. Ionizing ionic compounds useful in this invention are not limited to these; other examples of ionizing ionic compounds are disclosed in U.S. Pat. Nos. 5,576,259 and 5,807,938, the disclosures of which are incorporated herein by reference in their entirety.

Olefin Monomers

Unsaturated reactants that can be employed with catalyst compositions and polymerization processes of this invention typically include olefin compounds having from 2 to 30 carbon atoms per molecule and having at least one olefinic double bond. This invention encompasses homopolymerization processes using a single olefin such as ethylene or propylene, as well as copolymerization, terpolymerization, etc., reactions using an olefin monomer with at least one different olefinic compound. For example, the resultant ethylene copolymers, terpolymers, etc., generally contain a major amount of ethylene (>50 mole percent) and a minor amount of comonomer (<50 mole percent), though this is not a requirement. Comonomers that can be copolymerized with ethylene often have from 3 to 20 carbon atoms in their molecular chain.

Acyclic, cyclic, polycyclic, terminal (a), internal, linear, branched, substituted, unsubstituted, functionalized, and non-functionalized olefins can be employed in this invention. For example, typical unsaturated compounds that can be polymerized with the catalyst compositions of this invention include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described above. Styrene also can be employed as a monomer in the present invention. In an aspect, the olefin monomer is ethylene; alternatively, the olefin monomer is propylene.

When a copolymer (or alternatively, a terpolymer) is desired, the olefin monomer can comprise, for example, ethylene or propylene, which is copolymerized with at least one comonomer. According to one aspect of this invention, the olefin monomer in the polymerization process comprises ethylene. In this aspect, examples of suitable olefin comonomers include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to one aspect of the present invention, the comonomer can comprise 1-butene, 1-pentene, 1-hexene, 1-octene, 1-decene, styrene, or a combination thereof.

Generally, the amount of comonomer introduced into a reactor zone to produce the copolymer is from about 0.01 to about 50 weight percent of the comonomer based on the total weight of the monomer and comonomer. According to another aspect of the present invention, the amount of comonomer introduced into a reactor zone is from about 0.01 to about 40 weight percent comonomer based on the total weight of the monomer and comonomer. In still another aspect, the amount of comonomer introduced into a reactor zone is from about 0.1 to about 35 weight percent comonomer based on the total weight of the monomer and comonomer. Yet, in another aspect, the amount of comonomer introduced into a reactor zone is from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might. According to one aspect of the present invention, at least one monomer/reactant is ethylene, so the polymerizations are either a homopolymerization involving only ethylene, or copolymerizations with a different acyclic, cyclic, terminal, internal, linear, branched, substituted, or unsubstituted olefin. In addition, the catalyst compositions of this invention can be used in the polymerization of diolefin compounds including, but not limited to, 1,3-butadiene, isoprene, 1,4-pentadiene, and 1,5-hexadiene.

Polymerization Process

Catalyst compositions of the present invention can be used to polymerize olefins to form homopolymers, copolymers, terpolymers, and the like. One such olefin polymerization process comprises contacting a catalyst composition with at least one olefin monomer and optionally at least one olefin comonomer under polymerization conditions to produce an olefin polymer, wherein the catalyst composition comprises at least one transition metal or metallocene compound and at least one activator-support. The at least one activator-support comprises at least one silica-coated alumina treated with at least one electron-withdrawing anion, wherein the at least one silica-coated alumina generally has a weight ratio of alumina to silica in a range from about 1:1 to about 100:1. The at least one electron-withdrawing anion can comprise fluoride, chloride, bromide, phosphate, triflate, bisulfate, sulfate, and the like, or any combination thereof.

Often, a catalyst composition of the present invention, employed in an olefin polymerization process, may further comprise at least one organoaluminum compound. Suitable organoaluminum compounds can include, but are not limited to, trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or combinations thereof.

The catalyst compositions of the present invention are intended for any olefin polymerization method using various types of polymerization reactors. As used herein, "polymerization reactor" includes any polymerization reactor capable of polymerizing olefin monomers and comonomers (one or more than one comonomer) to produce homopolymers, copolymers, terpolymers, and the like. The various types of reactors include those that may be referred to as batch, slurry, gas-phase, solution, high pressure, tubular or autoclave reactors. The polymerization conditions for the various reactor types are well known to those of skill in the art. Gas phase reactors may comprise fluidized bed reactors or staged horizontal reactors. Slurry reactors may comprise vertical or horizontal loops. High pressure reactors may comprise autoclave or tubular reactors. For instance, the polymerization reaction can be conducted in a gas phase reactor, a loop reactor, a stirred tank reactor, or a combination thereof. Reactor types can include batch or continuous processes. Continuous processes could use intermittent or continuous product discharge. Processes may also include partial or full direct recycle of un-reacted monomer, un-reacted comonomer, and/or diluent.

Polymerization reactor systems of the present invention may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high pressure reactors or a combination of high pressure with loop and/or gas reactors. The multiple reactors may be operated in series or in parallel.

According to one aspect of the invention, the polymerization reactor system may comprise at least one loop slurry reactor comprising vertical or horizontal loops. Monomer, diluent, catalyst, and optionally any comonomer may be continuously fed to a loop reactor where polymerization occurs. Generally, continuous processes may comprise the continuous introduction of monomer/comonomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugation.

A typical slurry polymerization process (also known as the particle form process), is disclosed, for example, in U.S. Pat. Nos. 3,248,179, 4,501,885, 5,565,175, 5,575,979, 6,239,235, 6,262,191, and 6,833,415, each of which is incorporated by reference in its entirety herein.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this invention, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another aspect of the invention, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the invention, the polymerization reactor may comprise a solution polymerization reactor wherein the monomer/comonomer is/are contacted with the catalyst composition by suitable stirring or other means. A carrier comprising an inert organic diluent or excess monomer may be employed. If desired, the monomer/comonomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present invention may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide desired polymer properties include temperature, pressure, and the concentrations of various reactants. Polymerization temperature can affect catalyst productivity, polymer molecular weight, and molecular weight distribution. Suitable polymerization temperature may be any temperature below the de-polymerization temperature according to the Gibbs Free energy equation. Typically, this includes from about 60° C. to about 280° C., for example, or from about 60° C. to about 110° C., depending upon the type of polymerization reactor. In some reactor systems, the polymerization temperature can be within a range from about 70° C. to about 100° C., or from about 75° C. to about 90° C.

Suitable pressures will also vary according to the reactor and polymerization type. The pressure for liquid phase polymerizations in a loop reactor is typically less than 1000 psig. Pressure for gas phase polymerization is usually at about 200 to 500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

According to one aspect of this invention, the ratio of hydrogen to the olefin monomer in the polymerization process can be controlled. This weight ratio can range from 0 ppm to about 10,000 ppm of hydrogen, based on the weight of the olefin monomer. For instance, the reactant or feed ratio of hydrogen to olefin monomer can be controlled at a weight ratio which falls within a range from about 10 ppm to about 7500 ppm, from about 10 ppm to about 5000 ppm, or from about 10 ppm to about 1000 ppm.

It is also contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

In ethylene polymerizations, the feed ratio of hydrogen to ethylene monomer, irrespective of comonomer(s) employed, generally is controlled at a weight ratio within a range from about 0 ppm to about 1000 ppm, but the specific weight ratio target can depend upon the desired polymer molecular weight or melt index (MI). For ethylene polymers (homopolymers, copolymers, etc.) having a MI around 1 g/10 min, the weight ratio of hydrogen to ethylene typically can fall within a range from about 5 ppm to about 300 ppm, such as, for example, from about 10 ppm to about 250 ppm, or from about 10 ppm to about 200 ppm.

The concentration of the reactants entering the polymerization reactor can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

This invention also is directed to, and encompasses, the olefin polymers produced by any of the polymerization processes disclosed herein. Articles of manufacture can be formed from, and can comprise, the olefin polymers produced in accordance with this invention.

Polymers and Articles

If the resultant polymer produced in accordance with the present invention is, for example, a polymer or copolymer of ethylene, its properties can be characterized by various analytical techniques known and used in the polyolefin industry. Articles of manufacture can be formed from, and can comprise, the ethylene polymers of this invention, whose typical properties are provided below.

Polymers of ethylene (homopolymers, copolymers, terpolymers, etc.) produced in accordance with this invention generally have a melt index from about 0.01 to about 100 g/10 min. Melt indices in the range from about 0.1 to about 50 g/10 min, or from about 0.3 to about 20 g/10 min, are contemplated in some aspects of this invention. For example, a polymer of the present invention can have a melt index in a range from about 0.5 to about 10, or from about 0.5 to about 6 g/10 min.

The density of ethylene-based polymers produced using one or more transition metal and/or metallocene compounds and activator-supports of the present invention typically falls within the range from about 0.87 to about 0.97 g/cm$^3$. In one aspect of this invention, the density of an ethylene polymer is in a range from about 0.89 to about 0.96 g/cm$^3$. Yet, in another aspect, the density is in a range from about 0.90 to about 0.95 g/cm$^3$, such as, for example, from about 0.91 to about 0.94 g/cm$^3$.

In one aspect, polymers of the present invention (e.g., ethylene-based homopolymers, copolymers, etc.) can have low levels of long chain branching, with typically less than about 10 long chain branches (LCB) per million total carbon atoms. In some aspects, the number of long chain branches per million total carbon atoms is less than about 9; alternatively, less than about 8; alternatively, less than about 7; alternatively, less than about 6; or alternatively, less than about 5, LCB per million total carbon atoms. Furthermore, polymers of the present invention can have less than about 4, less than about 3, or less than about 2, LCB per million total carbon atoms, in other aspects of this invention. For example, olefin polymers of the present invention can have about 1 LCB per million total carbon atoms, or less than about 1 LCB per million total carbon atoms.

In accordance with another aspect of the present invention, a polymer produced using a catalyst composition employing a silica-coated alumina activator support—for instance, fluorided silica-coated alumina—may result in a significant decrease in LCB content, for instance, as compared to a polymer produced using a catalyst composition employing a conventional silica-alumina activator-support—for instance, fluorided silica-alumina—having an alumina to silica weight ratio of from about 0.05:1 to about 0.25:1. The number of LCB's in a polymer produced using a catalyst composition of the present invention can be less than about 70% of the number of LCB's in a polymer produced using a comparable catalyst composition containing a conventional silica-alumina activator-support (i.e., at the same reaction conditions, using the same other catalyst components, same anion chemical treatment, etc.). For instance, the number of LCB's in a polymer produced using a catalyst composition of the present invention can be less than about 50%, or less than about 35%, of the number of LCB's in a polymer produced using a comparable catalyst composition containing a conventional silica-alumina activator-support.

The number of LCB per million total carbon atoms can be measured from a plot of $\log(\eta_0)$ versus log (Mw). Linear polyethylene polymers are observed to follow a power law relationship between their zero-shear viscosity, $\eta_0$, and their weight-average molecular weight, Mw, with a power very close to 3.4. This relationship is shown by a straight line with a slope of 3.4 when the logarithm of $\eta_0$ is plotted versus the logarithm of Mw. Deviations from this linear polymer line are generally accepted as being caused by the presence of LCB. Janzen and Colby presented a model that predicts the expected deviation from the linear plot of $\log(\eta_0)$ vs. log(Mw) for given frequencies of LCB as a function of the Mw of the polymer. See "Diagnosing long-chain branching in polyethylenes," *J. Mol. Struct.* 485-486, 569-584 (1999), which is incorporated herein by reference in its entirety. Polymers of this invention may deviate only slightly from the well-known 3.4 power law "Arnett line" which is used as an indication of a linear polymer (see J. Phys. Chem. 1980, 84, 649, incorporated herein by reference in its entirety).

The CY-a parameter for olefin-based polymers disclosed herein (e.g., ethylene-based homopolymers, copolymers, etc.) can fall within a range from about 0.3 to about 0.8. In one aspect, the polymer has a CY-a parameter in a range from about 0.35 to about 0.75. In another aspect, the polymer has a CY-a parameter in a range from about 0.4 to about 0.7. In still another aspect, the polymer has a CY-a parameter in a range from about 0.45 to about 0.65. In yet another aspect, the polymer has a CY-a parameter in a range from about 0.5 to about 0.6.

In accordance with another aspect of the present invention, a polymer produced using a catalyst composition employing a silica-coated alumina activator support—for instance, fluorided silica-coated alumina—may result in a significant increase in the CY-a parameter, for instance, as compared to a polymer produced using a catalyst composition employing a conventional silica-alumina activator-support—for instance, fluorided silica-alumina—having an alumina to silica weight ratio of from about 0.05:1 to about 0.25:1. The CY-a parameter for a polymer produced using a catalyst composition of the present invention can at least about 10% greater than the CY-a parameter for a polymer produced using a comparable catalyst composition containing a conventional silica-alumina activator-support (i.e., at the same reaction conditions, using the same other catalyst components, same anion chemical treatment, etc.). For instance, the CY-a parameter for a polymer produced using a catalyst composition of the present invention can be at least about 20%, at least about 30%, or at least about 50%, greater than the CY-a parameter for a polymer produced using a comparable catalyst composition containing a conventional silica-alumina activator-support.

Polymers of ethylene, whether homopolymers, copolymers, terpolymers, and so forth, can be formed into various articles of manufacture. Articles which can comprise polymers of this invention can include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Melt rheological characterizations were performed as follows. Small-strain (10%) oscillatory shear measurements were performed on a Rheometrics Scientific, Inc. ARES rheometer using parallel-plate geometry. All rheological tests were performed at 190° C. The complex viscosity |η*| versus frequency (ω) data were then curve fitted using the modified three parameter Carreau-Yasuda (CY) empirical model to obtain the zero shear viscosity—$\eta_0$, characteristic viscous relaxation time—$\tau_\eta$, and the breadth parameter—$\alpha$. The simplified Carreau-Yasuda (CY) empirical model is as follows.

$$|\eta^*(\omega)| = \frac{\eta_0}{[1 + (\tau_\eta \omega)^a]^{(1-n)/a}},$$

wherein: |η*(ω)|=magnitude of complex shear viscosity;
  $\eta_0$=zero shear viscosity;
  $\tau_\eta$=viscous relaxation time;
  $\alpha$="breadth" parameter;
  n=fixes the final power law slope, fixed at 2/11; and
  ω=angular frequency of oscillatory shearing deformation.

Details of the significance and interpretation of the CY model and derived parameters may be found in: C. A. Hieber and H. H. Chiang, *Rheol. Acta,* 28, 321 (1989); C. A. Hieber and H. H. Chiang, *Polym. Eng. Sci.,* 32, 931 (1992); and R. B. Bird, R. C. Armstrong and O. Hasseger, *Dynamics of Polymeric Liquids, Volume* 1, Fluid Mechanics, 2nd Edition, John Wiley & Sons (1987); each of which is incorporated herein by reference in its entirety. The CY "a" parameter (CY-a) is reported for some of the polymer resins produced herein.

Molecular weights and molecular weight distributions were obtained using a PL 220 SEC high temperature chromatography unit (Polymer Laboratories) with trichlorobenzene (TCB) as the solvent, with a flow rate of 1 mL/minute at a temperature of 145° C. BHT (2,6-di-tert-butyl-4-methylphenol) at a concentration of 0.5 g/L was used as a stabilizer in the TCB. An injection volume of 200 μL was used with a nominal polymer concentration of 1.5 mg/mL. Dissolution of the sample in stabilized TCB was carried out by heating at 150° C. for 5 hours with occasional, gentle agitation. The columns used were three PLgel Mixed A LS columns (7.8×300 mm) and were calibrated with a broad linear polyethylene standard (Phillips Marlex® BHB 5003) for which the molecular weight had been determined.

Ethylene was polymerization grade ethylene obtained from Union Carbide Corporation. This ethylene was then further purified through a column of ¼-inch beads of Alcoa A201 alumina, activated at about 250° C. in nitrogen. Isobutane was polymerization grade obtained from Phillips Petroleum Company, which was further purified by distillation and then also passed through a column of ¼-inch beads of Alcoa A201 alumina, activated at about 250° C. in nitrogen. The 1-hexene was polymerization grade obtained from Chevron Chemical Company, which was further purified by nitrogen purging and storage over 13× molecular sieve activated at about 250° C. Triisobutylaluminum (TIBA) was obtained from Akzo Corporation as a one molar solution in heptane.

All polymerizations were carried out in a one-gallon stirred reactor. First, the reactor was purged with nitrogen and heated to about 120° C. After cooling to below about 40° C. and purging with isobutane vapor, the metallocene compound was charged to the reactor under nitrogen. The metallocene quantity varied based on the metallocene to activator-support ratio, but was generally in the 0.1 to 3.5 milligram range. Approximately 100 mg of the activator-support (A-S) were then added to the reactor, followed by about 0.3 mL of 1M triisobutylaluminum (TIBA) co-catalyst. The reactor was then closed and, if noted, about 48 g of 1-hexene was injected into the reactor. Two liters of isobutane were added under pressure, and the reactor was subsequently heated to about 90° C. The reactor contents were mixed at 700 rpm. Ethylene was then added to the reactor and fed on demand to maintain a constant total pressure of about 420 psig. The reactor was maintained and controlled at 90° C. throughout the 60-minute run time of the polymerization. Upon completion, the isobutane and ethylene were vented from the reactor, the reactor was opened, and the polymer product was collected and dried.

Example 1

Synthesis of a Fluorided Silica-Alumina Activator-Support

A silica-alumina was obtained from W.R. Grace Company containing about 13% alumina by weight and having a surface area of about 400 m²/g and a pore volume of about 1.2 mL/g. This material was obtained as a powder having an average particle size of about 70 microns. Approximately 100 grams of this material were impregnated with a solution containing about 200 mL of water and about 10 grams of ammonium hydrogen fluoride, resulting in a damp powder having the consistency of wet sand. This mixture was then placed in a flat pan and allowed to dry under vacuum at approximately 110° C. for about 16 hours.

To calcine the support, about 10 grams of this powdered mixture were placed in a 1.75-inch quartz tube fitted with a sintered quartz disk at the bottom. While the powder was supported on the disk, air (nitrogen can be substituted) dried by passing through a 13× molecular sieve column, was blown upward through the disk at the linear rate of about 1.6 to 1.8 standard cubic feet per hour. An electric furnace around the quartz tube was then turned on and the temperature was raised at the rate of about 400° C. per hour to the desired calcining temperature of about 450° C. At this temperature, the powder was allowed to fluidize for about three hours in the dry air. Afterward, the fluorided silica-alumina was collected and stored under dry nitrogen, and was used without exposure to the atmosphere. The fluorided silica-alumina activator-support of Example 1 is abbreviated A-S1. The weight ratio of alumina to silica in A-S1 is about 0.15:1.

Example 2

Synthesis of a Sulfated Alumina Activator-Support

Boehmite was obtained from W.R. Grace Company under the designation "Alumina A" and having a surface area of about 300 m²/g and a pore volume of about 1.3 mL/g. This material was obtained as a powder having an average particle size of about 100 microns. This material was impregnated to incipient wetness with an aqueous solution of ammonium sulfate to equal about 15% sulfate. This mixture was then placed in a flat pan and allowed to dry under vacuum at approximately 110° C. for about 16 hours.

To calcine the support, about 10 grams of this powdered mixture were placed in a 1.75-inch quartz tube fitted with a sintered quartz disk at the bottom. While the powder was supported on the disk, air (nitrogen can be substituted) dried by passing through a 13× molecular sieve column, was blown upward through the disk at the linear rate of about 1.6 to 1.8 standard cubic feet per hour. An electric furnace around the quartz tube was then turned on and the temperature was raised at the rate of about 400° C. per hour to the desired calcining temperature of about 600° C. At this temperature, the powder was allowed to fluidize for about three hours in the dry air. Afterward, the sulfated alumina was collected and stored under dry nitrogen, and was used without exposure to the atmosphere. The sulfated alumina activator-support of Example 2 is abbreviated A-S2.

Example 3

Synthesis of a Fluorided Silica-Coated Alumina Activator-Support

A silica-coated alumina was obtained from Sasol Company under the designation "Siral 28M" containing about 72% alumina by weight and having a surface area of about 340 m²/g and a pore volume of about 1.6 mL/g. This material was obtained as a powder having an average particle size of about 70 microns. Additional information on Siral materials can be found in W. Daniell et al., "Enhanced surface acidity in mixed alumina-silicas: a low temperature FTIR study," in Applied Catalysis A: General 196 (2000) 247-260, the disclosure of which is incorporated herein by reference in its entirety. The Siral 28M was first calcined at about 600° C. for approximately 6 hours, then impregnated to incipient wetness with a 10% ammonium bifluoride solution in methanol. This mixture was then placed in a flat pan and allowed to dry under vacuum at approximately 110° C. for about 16 hours.

To calcine the support, about 10 grams of this powdered mixture were placed in a 1.75-inch quartz tube fitted with a sintered quartz disk at the bottom. While the powder was supported on the disk, air (nitrogen can be substituted) dried by passing through a 13× molecular sieve column, was blown upward through the disk at the linear rate of about 1.6 to 1.8 standard cubic feet per hour. An electric furnace around the quartz tube was then turned on and the temperature was raised at the rate of about 400° C. per hour to the desired calcining temperature of about 600° C. At this temperature, the powder was allowed to fluidize for about three hours in the dry air. Afterward, the fluorided silica-coated alumina was collected and stored under dry nitrogen, and was used without exposure to the atmosphere. The fluorided silica-coated alumina activator-support of Example 3 is abbreviated A-S3. The weight ratio of alumina to silica in A-S3 is about 2.6:1.

Example 4

Comparison of Polymerization Catalyst Activity Using MET 1 and the Activator-Supports of Examples 1-3

The metallocene compound of Example 4, abbreviated "MET 1," has the following structure (Ph=Phenyl; t-Bu=tert-butyl):

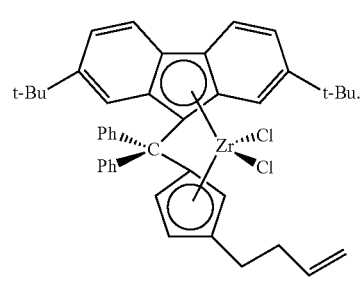

The MET 1 metallocene compound can be prepared in accordance with any suitable method. One such technique is described in U.S. Patent Publication No. 2007-0179044, the disclosure of which is incorporated herein by reference in its entirety.

The activator-supports of Examples 1-3 were charged in separate experiments to the reactor with various levels of MET 1, along with a constant amount of TIBA co-catalyst. No hexene was introduced. FIG. 1 illustrates the resultant polymerization catalyst activity for each of the three activator-supports, as a function of MET 1 to activator-support ratio. The activity is measured in units of grams of polyethylene produced per gram of A-S per hour. The MET 1 concentration varied from about 5 to about 20 micromoles of MET 1 per gram of the A-S. FIG. 1 demonstrates that A-S3 provided better catalyst activity at low MET 1 levels, far superior to that of A-S1 and almost twice that of A-S2. Hence, less metallocene would be needed in a catalyst system employing A-S3 to provide the same catalyst activity achieved with a higher loading of metallocene with the A-S2 activator-support. Since the metallocene compound employed in a polymerization catalyst system can be an expensive component, reducing the amount of metallocene can be a significant benefit. FIG. 1 also indicates that the activity using A-S3 was comparable to that of A-S2 at the highest metallocene loading.

Figure 2:
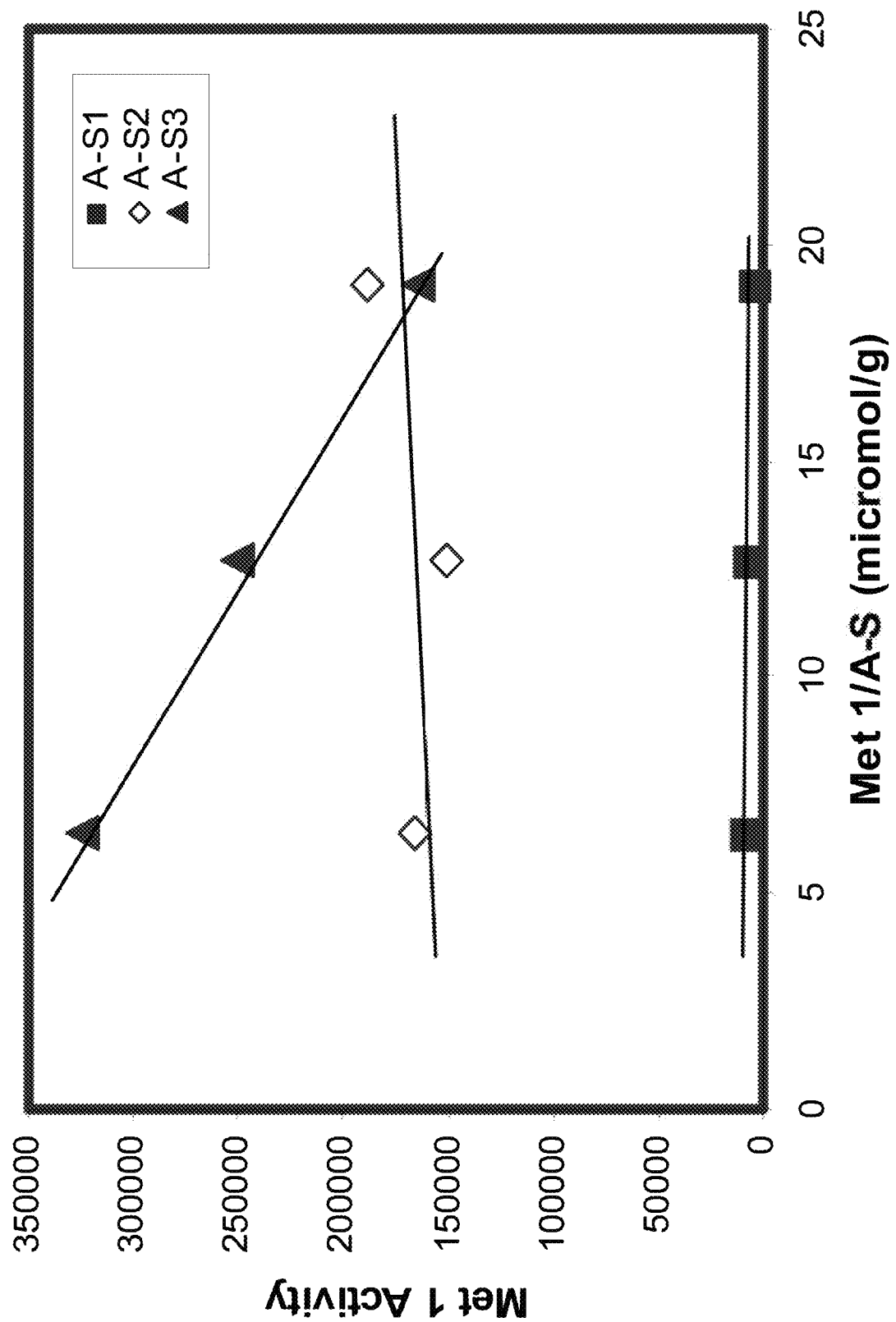
FIG. 2 presents a plot of catalyst activity, in units of grams of polyethylene per gram of MET 1 per hour, versus the concentration of MET 1, in units of micromoles of MET 1 per gram of the activator-support (A-S), for the activator-supports of Examples 1-3.

FIG. 2 illustrates the same polymerization catalyst activity data, but instead, the activity is measured in units of grams of polyethylene produced per gram of MET 1 per hour. The catalyst activity using A-S2 is relatively constant across the MET 1 concentration range from about 5 to about 20 micromoles of MET 1 per gram of A-S. The higher catalyst activity of a system employing A-S3 at lower MET 1 loadings is also evidenced in FIG. 2.

The molecular weight and other properties of the polymer resins produced using A-S3 are compared to those produced using A-S2, at a Met 1 loading of 3.5 mg per 100 grams of the activator-support, in Table I below. The polymer produced using A-S3 had a lower molecular weight than that produced using A-S2.

TABLE I

Property comparison of polymers produced using A-S2 and A-S3.

| A-S Type | Mn/1000 | Mw/1000 | Mz/1000 | PDI | $\eta_0$ | CY-a |
|---|---|---|---|---|---|---|
| AS-2 | 87.3 | 212 | 385 | 2.42 | 5.86E+04 | 0.4615 |
| AS-3 | 67.7 | 194 | 346 | 2.86 | 4.36E+04 | 0.4930 |

Notes on Table I:
Mn—number-average molecular weight.
Mw—weight-average molecular weight.
Mz—z-average molecular weight.
PDI—polydispersity index, Mw/Mn.
$\eta_0$—zero shear viscosity at 190° C.
CY-a—Carreau-Yasuda breadth parameter.

Example 5

Comparison of Polymerization Catalyst Activity Using MET 2 and the Activator-Supports of Examples 1-3

The metallocene compound of Example 5 was bis(n-butylcyclopentadienyl) hafnium dichloride (abbreviated "MET 2"), which can be prepared in accordance with any suitable method for synthesizing metallocene compounds.

Figure 3:
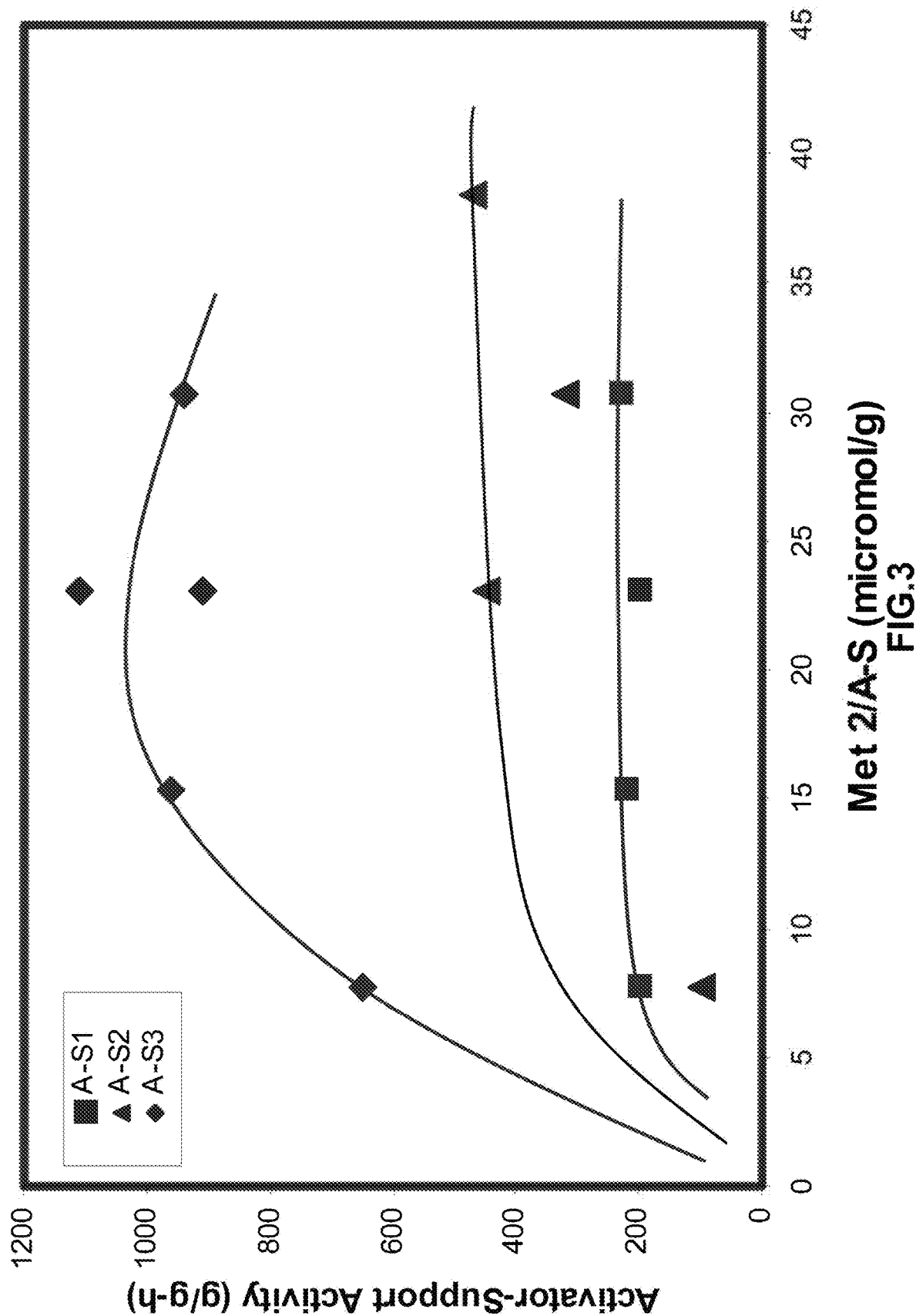
FIG. 3 presents a plot of catalyst activity, in units of grams of polyethylene per gram of A-S per hour, versus the concentration of MET 2, in units of micromoles of MET 2 per gram of the A-S, for the activator-supports of Examples 1-3.

The activator-supports of Examples 1-3 were charged in separate experiments to the reactor with various levels of MET 2, along with a constant amount of TIBA co-catalyst. For Example 5, the reactor was maintained and controlled at 95° C. throughout the 60-minute run time of the polymerization. No hexene was introduced. FIG. 3 compares the resultant polymerization catalyst activity for each of the three activator-supports, as a function of MET 2 to activator-support ratio. The activity is measured in units of grams of polyethylene produced per gram of A-S per hour. The MET 2 concentration varied from about 5 to about 40 micromoles of MET 2 per gram of the A-S. FIG. 3 demonstrates that A-S3 provided over twice the catalyst activity at all metallocene loading levels when compared to the catalyst activity achieved using either A-S1 or A-S2.

Figure 4:
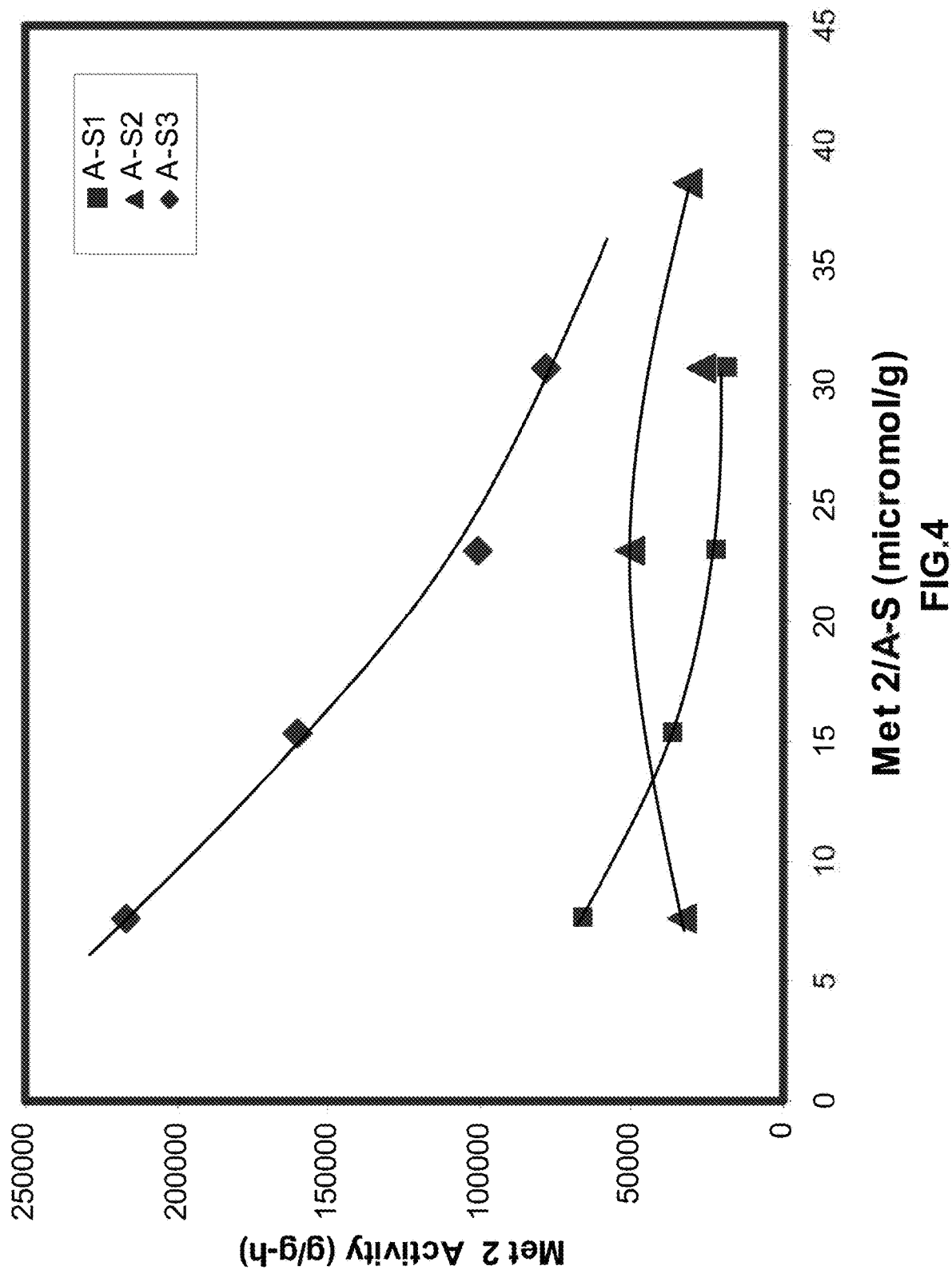
FIG. 4 presents a plot of catalyst activity, in units of grams of polyethylene per gram of MET 2 per hour, versus the concentration of MET 2, in units of micromoles of MET 2 per gram of the A-S, for the activator-supports of Examples 1-3.

FIG. 4 illustrates the same polymerization catalyst activity data, but instead, the activity is measured in units of grams of polyethylene produced per gram of MET 2 per hour. Not only is the catalyst activity at all MET 2 loadings (micromoles MET 2 per gram of A-S) higher for the catalyst system containing A-S3, but the activity at the lowest metallocene loading is over 100,000 grams of polyethylene (per gram of MET 2 per hour) higher than that activity of the catalyst systems using either A-S1 or A-S2. Thus, less metallocene can be used in a catalyst system employing A-S3 to provide the same catalyst activity as that achieved with much higher loadings of metallocene using either the A-S1 or A-S2 activator-supports.

Example 6

Effect of Precontacting on the Polymerization Catalyst Activity of a Catalyst System Containing MET 2 and A-S3

Figure 5:
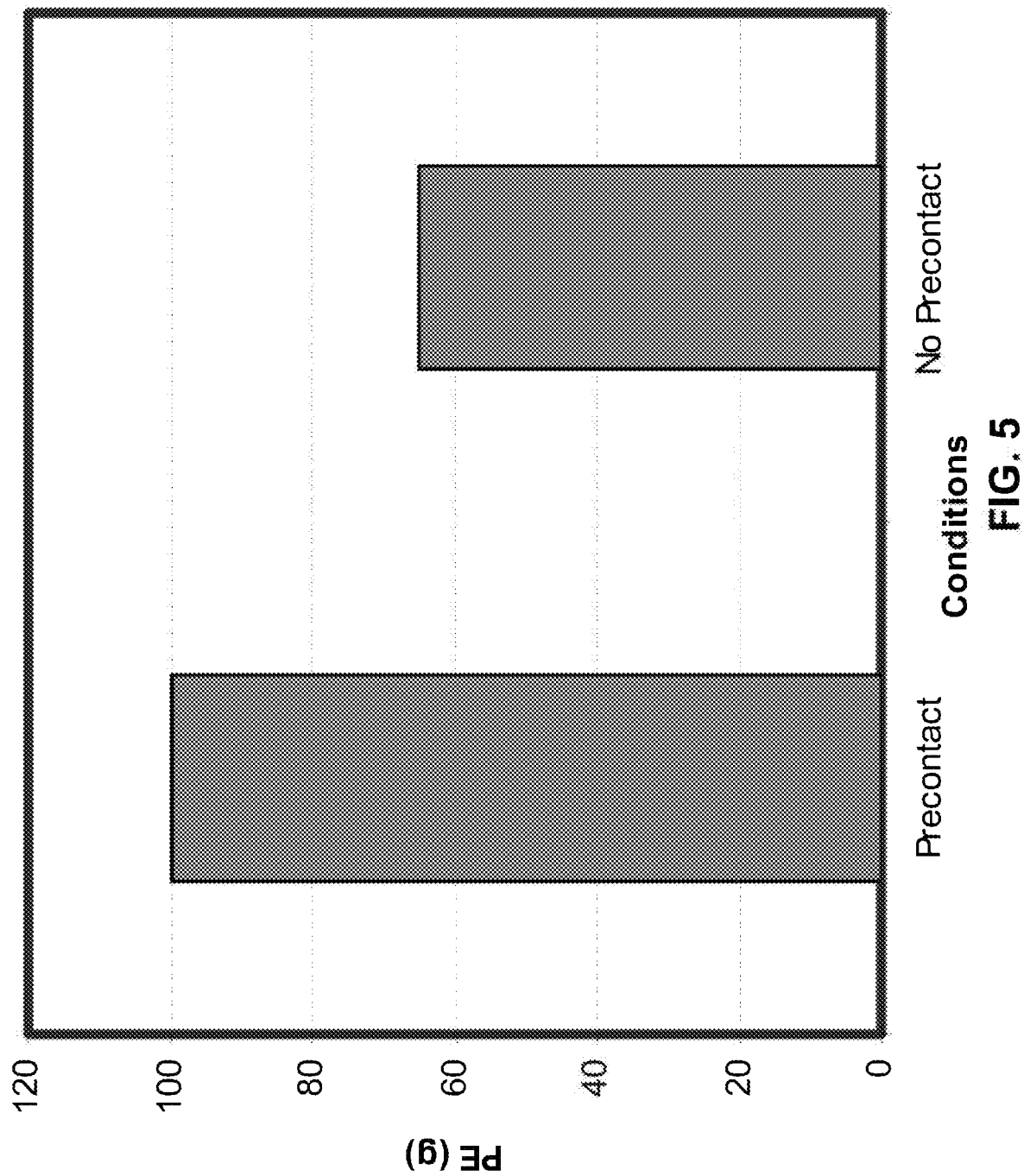
FIG. 5 presents a plot of catalyst activity, in units of grams of polyethylene per hour, for the precontacted catalyst system and the catalyst system which was not precontacted of Example 6.

FIG. 5 compares the grams of polyethylene produced per hour for a precontacted catalyst system and for a catalyst system which was not precontacted. The polymerization procedure used for the catalyst system which was not precontacted was substantially the same as that employed in Example 5. In this case, however, a fixed quantity of about 0.3 milligrams of MET 2 was used. For the precontacted catalyst system, the MET-2, A-S3 and TIBA were first mixed in a separate vessel for about 30 minutes before being introduced into the reactor and exposed to ethylene. As shown in FIG. 5, the precontacted catalyst system gave a significant improvement in polymerization activity versus the catalyst system which was not precontacted.

Example 7

Comparison of Polymerization Catalyst Activity Using MET 3 and the Activator-Supports of Examples 2-3

The metallocene compound of Example 7, abbreviated "MET 3," has the following structure:

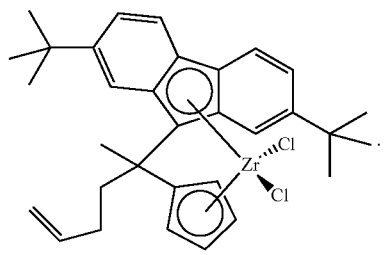

The MET 3 metallocene compound can be prepared in accordance with any suitable method. One such technique is described in U.S. Pat. No. 7,064,225, the disclosure of which is incorporated herein by reference in its entirety.

Figure 6:
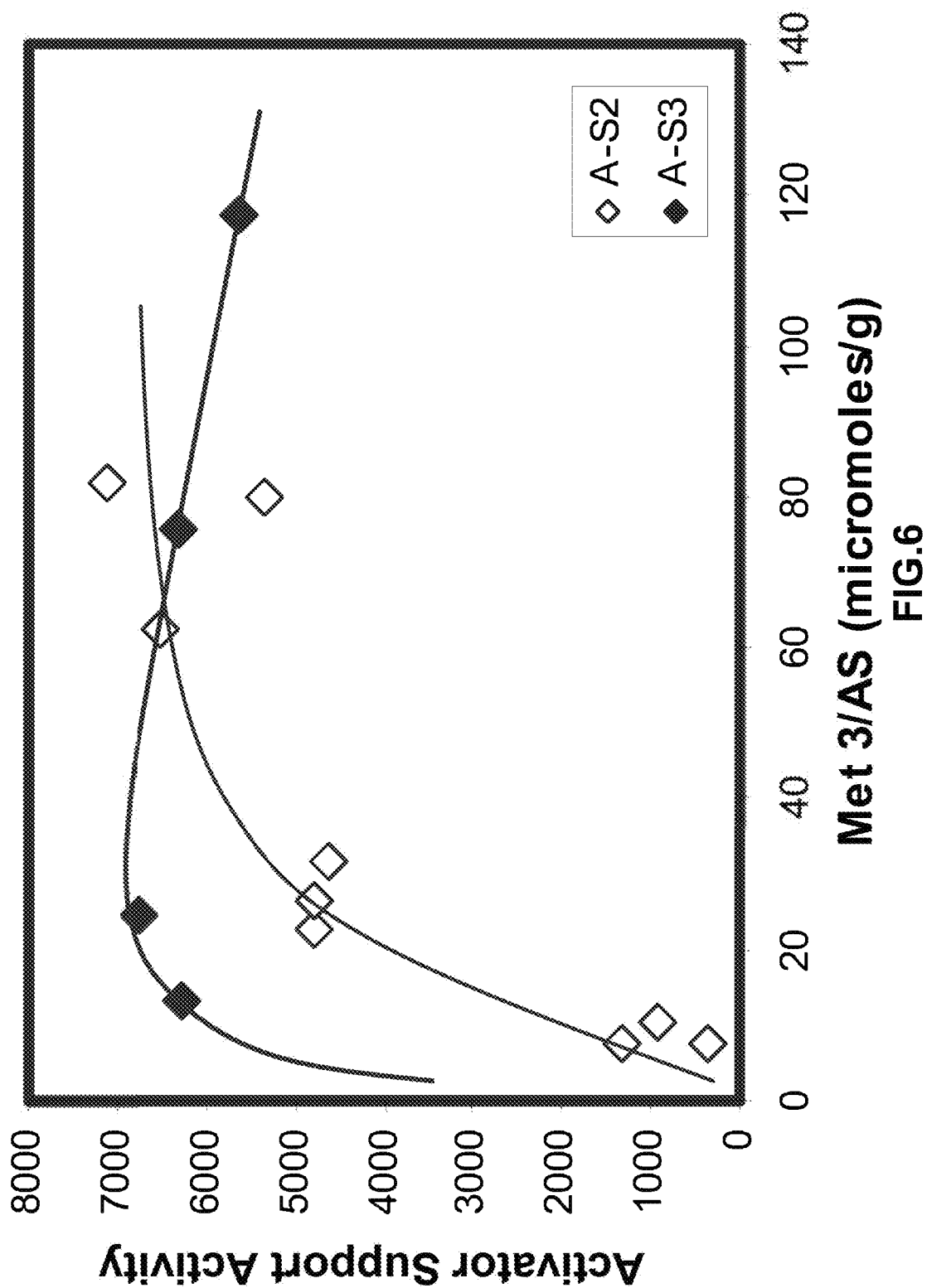
FIG. 6 presents a plot of catalyst activity, in units of grams of polyethylene per gram of A-S per hour, versus the concentration of MET 3, in units of micromoles of MET 3 per gram of the A-S, for the activator-supports of Examples 2-3.

The activator-supports of Examples 2-3 were charged in separate experiments to the reactor with various levels of MET 3, along with a constant amount of TIBA co-catalyst. No hexene was introduced. FIG. 6 compares the resultant polymerization catalyst activity for A-S2 and A-S3, as a function of MET 3 to activator-support ratio. The activity is measured in units of grams of polyethylene produced per gram of A-S per hour. The MET 3 concentration varied from about 5 to about 120 micromoles of MET 3 per gram of the A-S. FIG. 6 demonstrates that A-S3 provided higher catalyst activity at lower metallocene loadings on the activator-support as compared to A-S2.

Figure 7:
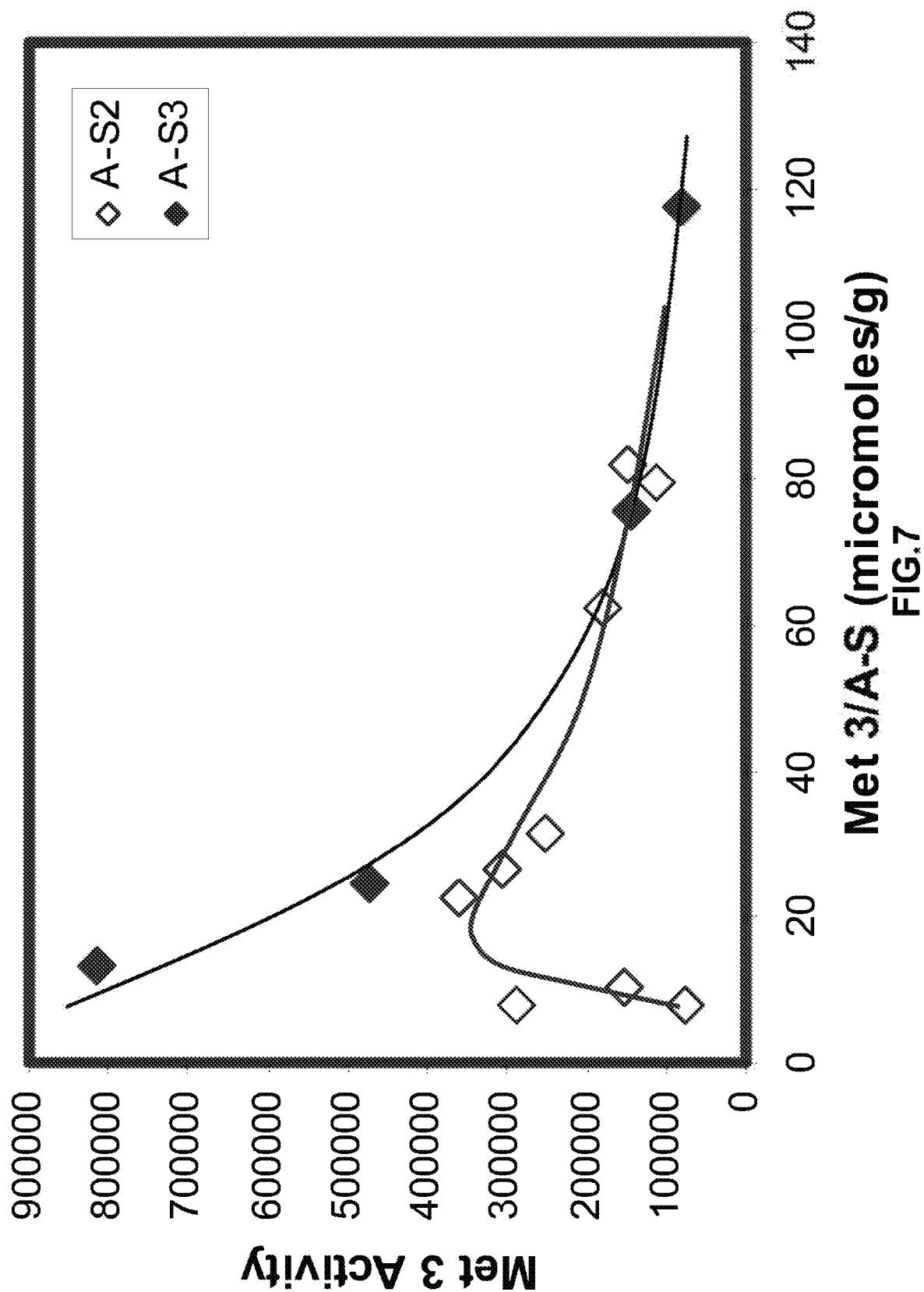
FIG. 7 presents a plot of catalyst activity, in units of grams of polyethylene per gram of MET 3 per hour, versus the concentration of MET 3, in units of micromoles of MET 3 per gram of the A-S, for the activator-supports of Examples 2-3.

FIG. 7 illustrates the same polymerization catalyst activity data, but instead, the activity is measured in units of grams of polyethylene produced per gram of MET 3 per hour. At metallocene loadings of about 60 and above (micromoles MET 3 per gram of A-S), the activities of catalyst systems containing A-S2 and A-S3 appeared very similar. However, at low metallocene loadings, the catalyst activity was much greater for the catalyst system employing A-S3. As mentioned above, less metallocene can be used in a catalyst system employing A-S3 to provide the same catalyst activity as that achieved with much higher loadings of metallocene using the A-S2 activator-support.

Examples 8-10

Effect of Fluoride Concentration on the Activity of Fluorided Silica-Coated Alumina Activator-Supports The silica-coated alumina support used in Examples 8-10 was the same as the high alumina content silica-coated alumina employed in Example 3, containing about 72% alumina by weight. For Examples 8-10, this uncalcined material was impregnated to incipient wetness with a 5%, a 10%, or a 15% ammonium bifluoride solution in methanol, followed by calcining at a temperature of about 600° C. for about three hours, in the manner described in Example 3.

Ethylene polymerizations were conducted as described in Example 7, except that in this case, the loading of MET 3 was fixed at 3.5 milligrams per 100 g of the activator-support.

Table II summarizes the catalyst activity data for Examples 8-10. For this set of conditions, the fluoride level at about 10 weight percent $NH_4HF_2$ provided the highest catalyst activity. The results in Table II also indicate that precalcining the silica-coated alumina support before the fluoride treatment also can provide an activity improvement. For instance, the catalyst activities in FIGS. 6-7, using a precalcined support, were significantly higher than that achieved with Example 9, which did not precalcine the support prior to the fluoride treatment.

TABLE II

Examples 8-10 using the MET 3 metallocene compound.

| Example | Fluoride Added | Activity (based on A-S) | Activity (based on MET 3) |
|---|---|---|---|
| 8 | 5% | 2433 | 41.7 |
| 9 | 10% | 3129 | 55.4 |
| 10 | 15% | 1833 | 31.4 |

Notes on Table II:
Fluoride added is the weight percent of the $NH_4HF_2$ solution.
Activity based on the A-S is in units of grams of polyethylene per gram of A-S per hour.
Activity based on MET 3 is in units of kilograms of polyethylene per gram of MET 3 per hour.

Examples 11-17

Effect of the Weight Ratio of Alumina to Silica on the Activity of Fluorided Silica-Coated Alumina Supports Table III lists the silica, alumina, silica-alumina, or silica-coated alumina supports having different ratios of alumina to silica, employed in Examples 11-17. The grade of silica-alumina used in Example 16 was the same as that employed in Example 1, and the grade of alumina used in Example 11 was the same as that employed in Example 2. The grade of silica used in Example 17 was W.R. Grace Company grade 952 silica. The silica-coated aluminas used in Examples 12-15 were obtained from Sasol, each made by the same technique, but with a different alumina to silica weight ratio.

Each support was first precalcined at 600° C., then impregnated with 10% ammonium bifluoride in methanol, then calcined again at 600° C., in the manner described in Example 3. Ethylene polymerizations were conducted as described in Example 7 (e.g., 100 mg A-S, 0.3 mmol TIBA), except that in this case, the loading of MET 3 was fixed at approximately 3.5 mg, and about 48 grams of 1-hexene were charged to the reactor.

As shown in Table III, the catalyst activities of Examples 12-15 were superior to the catalyst activities of Examples 11 and 16-17. Due to the excess of MET 3 that was used, the activities based on the amount of MET 3 that was employed, in units of kilograms of polyethylene per gram of MET 3 per hour, are low.

TABLE III

Examples 11-17 using the MET 3 metallocene compound.

| Example | Alumina to Silica Ratio | Activity (based on A-S) | Activity (based on MET 3) |
|---|---|---|---|
| 11 | Alumina | 1688 | 46 |
| 12 | 19:1 | 2109 | 74 |
| 13 | 4:1 | 5291 | 192 |
| 14 | 2.6:1 | 6300 | 200 |
| 15 | 1.5:1 | 7295 | 174 |
| 16 | 0.15:1 | 60 | 6 |
| 17 | Silica | 0 | 0 |

Notes on Table III:
The alumina to silica ratio is the weight ratio in the silica-alumina or silica-coated alumina support.
Activity based on the A-S is in units of grams of polyethylene per gram of A-S per hour.
Activity based on MET 3 is in units of kilograms of polyethylene per gram of MET 3 per hour.

Examples 18-24

Catalyst Compositions Containing MET 3 and Silica-Coated Alumina Activator-Supports with Single and Dual Anions The metallocene compound, MET 3, was used in Examples 18-24. Table IV lists the activator-supports employed in Examples 18-24, and the respective catalyst activity, CY-a parameter, and Tan Delta (at 0.1/sec) for each example. The sulfated alumina in Example 18 was prepared in the same manner as in Example 2. The fluorided alumina in Example 19 was prepared as in Example 1, except that the support was "Alumina A" from W.R. Grace Company.

The chlorided alumina in Example 20 was prepared as follows. Approximately 10 grams of "Alumina A" from W.R. Grace Company was placed in a 2-inch quartz tube suspended on a sintered glass frit. Nitrogen was passed up through the alumina bed at a rate of 0.1 ft/sec. An electric furnace around the quartz tube was turned on and the temperature was raised to about 600° C. over 1.5 hours, then about 1 mL of $CCl_4$ liquid was injected and evaporated into the nitrogen stream, and contacted with the alumina bed. The calcining step was continued for 2 hours, then the chlorided alumina was cooled and stored without exposure to the atmosphere.

The fluorided silica-alumina in Example 21 was prepared as in Example 1. The fluorided silica-coated alumina in Example 22 was prepared as in Example 3. The dual anion silica-coated aluminas in Examples 23-24 were prepared as follows. The Siral 28M silica-coated alumina of Example 3 was used for Examples 23-24, after being first calcined in air at 600° C. For the sulfated-fluorided activator-support, approximately 10 grams of calcined silica-coated alumina was slurried in methanol containing about 0.5 grams of ammonium bifluoride and about 0.8 grams of sulfuric acid. The methanol was then vaporized off, and the dried support was calcined in nitrogen at 600° C. for three hours. The phosphated-fluorided activator-support was prepared using the same procedure, except that 0.8 grams of phosphoric acid was used in place of the sulfuric acid.

Ethylene polymerizations were conducted as described in Example 7 (e.g., 100 mg A-S, 0.3 mmol TIBA), except that in this case, the loading of MET 3 was fixed at approximately 3.5 mg, and about 48 grams of 1-hexene were charged to the reactor.

As shown in Table IV, the catalyst activities of Examples 22-24 were superior to the catalyst activities of Examples 18-21. The CY-a parameter in Table IV can be an indicator of LCB content. Examples 22-24 show significant increases in the CY-a parameter as compared to Example 21.

Tan delta is the loss modulus divided by the storage modulus at a shear frequency. The data in Table IV was taken at a low shear frequency of 0.1/sec. Tan delta can be sensitive to the effects of LCB. Generally, higher tan delta means that the polymer relaxes easily, with little storage of the strain, and that the polymer has relatively lower LCB, assuming all other considerations are equal (e.g., molecular weight, molecular weight distribution, etc.).

TABLE IV

Examples 18-24 using the MET 3 metallocene compound.

| Example | Activator-Support | Alumina to Silica Ratio | Activity (based on A-S) | CY-a | Tan Delta |
|---|---|---|---|---|---|
| 18 | Sulfated Alumina | Alumina | 1270 | 0.4020 | 14.43 |
| 19 | Fluorided Alumina | Alumina | 3110 | 0.1980 | 4.12 |
| 20 | Chlorided Alumina | Alumina | 362 | 0.1334 | 1.53 |
| 21 | Fluorided Silica-Alumina | 0.15:1 | 1612 | 0.1727 | 7.05 |
| 22 | Fluorided Silica-Coated Alumina | 2.6:1 | 6349 | 0.2204 | 5.44 |
| 23 | Sulfated + Fluorided Silica-Coated Alumina | 2.6:1 | 4936 | 0.3148 | 9.99 |
| 24 | Phosphated + Fluorided Silica-Coated Alumina | 2.6:1 | 5129 | 0.2940 | 8.79 |

Notes on Table IV:
The alumina to silica ratio is the weight ratio in the silica-alumina or silica-coated alumina support.
Activity based on the A-S is in units of grams of polyethylene per gram of A-S per hour.
CY-a—Carreau-Yasuda breadth parameter.

Examples 25-32

Catalyst Compositions Containing MET 4 and Silica-Coated Alumina Activator-Supports with Single and Dual Anions The metallocene compound of Examples 25-32 was ethylene bis-indenyl zirconium dichloride (abbreviated "MET 4"), which can be prepared in accordance with any suitable method for synthesizing metallocene compounds.

Table V lists the activator-supports employed in Examples 25-32, and the respective catalyst activity, CY-a parameter, and Tan Delta (at 0.1/sec) for each example. The activator-supports of Examples 25-27 and 29-32 were prepared as listed for the respective activator-support in Examples 18-24. The phosphated-fluorided alumina of Example 28 was prepared in a manner similar to Examples 23-24, except that "Alumina A" from W.R. Grace Company was the starting material.

Ethylene polymerizations were conducted in the same manner as Examples 18-24 (e.g., 100 mg A-S, 0.3 mmol TIBA), except that in this case, the loading of MET 4 was fixed at approximately 3.5 mg, and about 48 grams of 1-hexene were charged to the reactor.

As shown in Table V, the catalyst activities of Examples 30-32 were superior to the catalyst activities of Examples 25-29. Examples 30-32 also demonstrated significant increases in tan delta (at 0.1/sec) and the CY-a parameter as compared to Example 29.

TABLE V

Examples 25-32 using the MET 4 metallocene compound.

| Example | Activator-Support | Alumina to Silica Ratio | Activity (based on A-S) | CY-a | Tan Delta |
|---|---|---|---|---|---|
| 25 | Sulfated Alumina | Alumina | 180 | 0.4734 | 2.89 |
| 26 | Fluorided Alumina | Alumina | 21 | 0.3741 | 1.34 |
| 27 | Chlorided Alumina | Alumina | 71 | 0.3827 | 1.88 |
| 28 | Phosphated + Fluorided Alumina | Alumina | 455 | 0.5192 | 2.56 |
| 29 | Fluorided Silica-Alumina | 0.15:1 | 151 | 0.3581 | 1.17 |
| 30 | Fluorided Silica-Coated Alumina | 2.6:1 | 9101 | 0.4759 | 5.78 |
| 31 | Sulfated + Fluorided Silica-Coated Alumina | 2.6:1 | 6694 | 0.5588 | 3.69 |
| 32 | Phosphated + Fluorided Silica-Coated Alumina | 2.6:1 | 6410 | 0.4017 | 5.00 |

Notes on Table V:
The alumina to silica ratio is the weight ratio in the silica-alumina or silica-coated alumina support.
Activity based on the A-S is in units of grams of polyethylene per gram of A-S per hour.
CY-a—Carreau-Yasuda breadth parameter.

Examples 33-39

Synthesis of Fluorided Silica-Coated Alumina Activator-Supports Having Varying Weight Ratios of Alumina to Silica The fluorided activator-supports of Examples 33-39 were prepared as follows. Example 33 was prepared as in Example 26. For Examples 34-39, "Alumina A" from W.R. Grace, having a surface area of about 300 m²/g and a pore volume of 1.3 mL/g, was used as the starting material. The alumina was first calcined at 600° C. Then, 10 gram samples of the calcined alumina were treated with varying amounts of silicon (ortho) tetraethoxide, as follows. Each respective 10-gram alumina sample was slurried in 50 mL of methanol, which contained a targeted amount of Si(OEt)$_4$. The methanol was evaporated, and then 1 gram of ammonium bifluoride dissolved in 30 mL of methanol was added to create a wet sand consistency. The methanol was again evaporated and the chemically-treated solid oxide was calcined at 600° C. for 3 hours in nitrogen. After cooling, the fluorided silica-coated alumina was cooled, and stored without exposure to the atmosphere.

These fluorided alumina or fluorided silica-coated alumina activator-supports were tested for polymerization activity with 3 mg of MET 3 and 1 mL of 1 M TIBA in heptane (Example 35 utilized 1.8 mg of MET 3). Activator-support quantities were in the 25 mg to 55 mg range. Polymerizations in 1 L of isobutane were conducted for about 30 minutes at 80° C., 450 psig reactor pressure, and a charge of 40 mL of 1-hexene.

The alumina to silica weight ratios of the fluorided activator-supports used in Examples 33-39, and the resultant polymerization catalyst activity, are shown in Table VI. Due to the excess of MET 3 that was used, the activities based on the amount of MET 3 that was employed, in units of kilograms of polyethylene per gram of MET 3 per hour, are low—compare Example 35 (1.8 mg MET 3) with Example 36 (3 mg MET 3).

TABLE VI

Examples 33-39 using the MET 3 metallocene compound.

| Example | Alumina to Silica Ratio | Activity (based on A-S) | Activity (based on MET 3) |
|---|---|---|---|
| 33 | Alumina | 21 | 0.3 |
| 34 | 19:1 | 4027 | 52 |
| 35 | 7.3:1 | 4042 | 108 |
| 36 | 7.3:1 | 6280 | 69 |
| 37 | 3.6:1 | 6277 | 31 |
| 38 | 1.8:1 | 5612 | 78 |
| 39 | 1.2:1 | 5760 | 120 |

Notes on Table VI:
The alumina to silica ratio is the weight ratio in the silica-coated alumina support.
Activity based on the A-S is in units of grams of polyethylene per gram of A-S per hour.
Activity based on MET 3 is in units of kilograms of polyethylene per gram of MET 3 per hour.

We claim:

1. An activator-support comprising a silica-coated alumina treated with a source of fluoride ion, wherein:
the silica-coated alumina has a weight ratio of alumina to silica in a range from about 1:1 to about 15:1 and a surface area in a range from about 200 to about 600 m²/g.

2. The activator-support of claim 1, wherein the source of fluoride ion comprises fluorosulfate, fluoroborate, fluorophosphate, trifluoroacetate, triflate, fluorozirconate, fluorotitanate, or any combination thereof.

3. The activator-support of claim 1, wherein the source of fluoride ion comprises hydrofluoric acid, ammonium fluoride, ammonium bifluoride, ammonium tetrafluoroborate, ammonium hexafluorosilicate, ammonium hexafluorophosphate, hexafluorotitanic acid, ammonium hexafluorotitanic acid, hexafluorozirconic acid, aluminum fluoride, ammonium aluminum fluoride, triflic acid, ammonium triflate, or any combination thereof.

4. The activator-support of claim 1, wherein the source of fluoride ion comprises perfluorohexane, perfluorobenzene, fluoromethane, trifluoroethanol, hydrogen fluoride, fluorine, silicon tetrafluoride, tetrafluoroborate, or any combination thereof.

5. The activator-support of claim 1, wherein:
the silica-coated alumina is further characterized by a pore volume in a range from about 0.5 to about 1.8 mL/g; and
the silica-coated alumina is treated with a combination of the source of fluoride ion and a source of chloride ion and/or a source of sulfate.

6. A catalyst composition comprising the activator-support of claim 1 and a metallocene compound.

7. The catalyst composition of claim 6, wherein the catalyst composition further comprises a co-catalyst.

8. The catalyst composition of claim 7, wherein the co-catalyst comprises an organoaluminum compound, an aluminoxane compound, an organoboron or organoborate compound, an ionizing ionic compound, or any combination thereof.

9. An activator-support comprising a silica-coated alumina treated with an electron-withdrawing anion, wherein:
the silica-coated alumina has a weight ratio of alumina to silica in a range from about 1.5:1 to about 15:1 and a surface area in a range from about 200 to about 600 m²/g; and
the electron-withdrawing anion comprises fluoride, fluorosulfate, fluoroborate, fluorophosphate, trifluoroacetate, triflate, fluorozirconate, fluorotitanate, hexafluorosilicate, or any combination thereof.

10. The activator-support of claim 9, wherein the activator-support is characterized by:
a pore volume in a range from about 0.8 to about 1.8 mL/g; and
an average particle size in a range from about 5 microns to about 150 microns.

11. The activator-support of claim 10, wherein the electron-withdrawing anion comprises fluoride.

12. The activator-support of claim 9, wherein the electron-withdrawing anion comprises fluoroborate.

13. The activator-support of claim 9, wherein the electron-withdrawing anion comprises hexafluorosilicate.

14. A catalyst composition comprising the activator-support of claim 9 and a metallocene compound.

15. The catalyst composition of claim 14, wherein the catalyst composition further comprises a co-catalyst.

16. The catalyst composition of claim 15, wherein the co-catalyst comprises an organoaluminum compound, an aluminoxane compound, an organoboron or organoborate compound, an ionizing ionic compound, or any combination thereof.

17. An activator-support comprising a silica-coated alumina treated with a source of fluoride ion, wherein:
the silica-coated alumina has a weight ratio of alumina to silica in a range from about 2:1 to about 10:1 and a surface area in a range from about 200 to about 600 m²/g.

18. The activator-support of claim 17, wherein the silica-coated alumina is further characterized by a pore volume in a range from about 0.5 to about 1.8 mL/g.

19. The activator-support of claim 17, wherein the source of fluoride ion comprises fluorosulfate, fluoroborate, fluorophosphate, trifluoroacetate, triflate, fluorozirconate, fluorotitanate, or any combination thereof.

20. The activator support of claim 17, wherein the source of fluoride ion comprises hydrofluoric acid, ammonium fluoride, ammonium bifluoride, ammonium tetrafluoroborate, ammonium hexafluorosilicate, ammonium hexafluorophosphate, hexafluorotitanic acid, ammonium hexafluorotitanic acid, hexafluorozirconic acid, aluminum fluoride, ammonium aluminum fluoride, triflic acid, ammonium triflate, or any combination thereof.

21. The activator-support of claim 17, wherein the source of fluoride ion comprises perfluorohexane, perfluorobenzene, fluoromethane, trifluoroethanol, hydrogen fluoride, fluorine, silicon tetrafluoride, tetrafluoroborate, or any combination thereof.

22. A catalyst composition comprising the activator-support of claim 17, a metallocene compound, and a co-catalyst.

23. The activator-support of claim 17, wherein the activator-support is characterized by:
   a surface area in a range from about 200 to about 600 $m^2/g$; and
   a pore volume in a range from about 0.8 to about 1.8 mL/g.

24. A catalyst composition comprising the activator-support of claim 23, a metallocene compound, and a co-catalyst.

* * * * *